(12) United States Patent
Ozawa et al.

(10) Patent No.: US 6,618,738 B2
(45) Date of Patent: Sep. 9, 2003

(54) DEVICE AND METHOD FOR MANAGING MEMORY RESOURCES BY USING PARALLEL-TYPE GARBAGE COLLECTION

(75) Inventors: Toshihiro Ozawa, Kawasaki (JP); Munenori Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/752,466

(22) Filed: Jan. 3, 2001

(65) Prior Publication Data
US 2001/0023478 A1 Sep. 20, 2001

(30) Foreign Application Priority Data
Mar. 17, 2000 (JP) ......................................... 2000-075126

(51) Int. Cl.[7] .............................................. G06F 17/30
(52) U.S. Cl. ....................................................... 707/206
(58) Field of Search ................................. 711/170, 154, 711/6; 707/206, 200; 714/20; 717/5

(56) References Cited

U.S. PATENT DOCUMENTS

| 5,953,736 | A | * | 9/1999 | O'Connor ........................ 711/6 |
| 6,052,699 | A | * | 4/2000 | Huelsbergen et al. ........ 707/206 |
| 6,065,020 | A | * | 5/2000 | Dussud ......................... 707/206 |
| 6,308,319 | B1 | * | 10/2001 | Bush et al. ....................... 717/5 |
| 6,393,440 | B1 | * | 5/2002 | Salant et al. ................. 707/206 |
| 6,427,154 | B1 | * | 7/2002 | Kolodner et al. ............ 707/206 |
| 2001/0000821 | A1 | * | 5/2001 | Kolodner ..................... 711/170 |
| 2002/0120823 | A1 | * | 8/2002 | Kolodner ..................... 711/170 |

OTHER PUBLICATIONS

Edsger W. Dijkstra, et al. "On–the–Fly Garbage Collection: An Exercise in Cooperation", *Communications of the ACM*. vol. 21, No. 11, Nov. 1978. Pages 966–975.

Yoshio Tanaka, et al. "Parallel GC using Partial Marking and its Performance Analysis", *IEICE*. vol. J78–D–I, No. 12, Dec. 1995. Pages 926–935.

Taichi Yuasa. "Algorithms for Realtime Garbage Collection" *Information Processing Society Japan*. vol. 35, No. 11, Nov. 1994. Pages 1006, 1010, 1011 and 1013.

* cited by examiner

*Primary Examiner*—Kimberly N. McLean-Mayo
(74) *Attorney, Agent, or Firm*—Staas & Halsey LLP

(57) ABSTRACT

A heap is a memory resource managed in units of cells and it is used in units of cells by the execution of an application program. A full garbage collection unit collects free cells based on the check result of the state of use of cells. A partial garbage collection unit collects free cells from cells that are used after the check of the state of use of cells recently made by the full garbage collection unit, based on the check result of the state of use of cells. A full/partial control unit improves the process efficiency of parallel type garbage collection by making either the full garbage collection unit or the partial garbage collection unit perform a subsequent collection of free cells based on the state of collections made in the past.

30 Claims, 39 Drawing Sheets

(A)
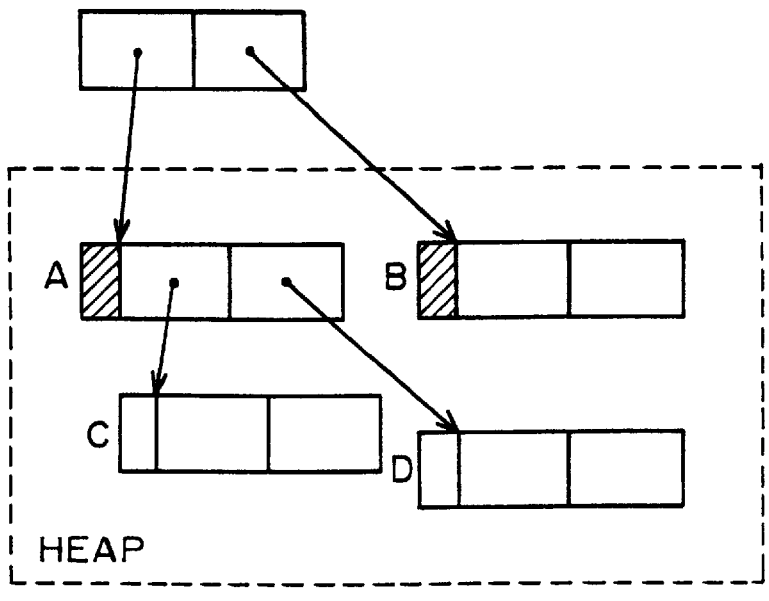
⇓ MARKED BY A MUTATOR
(B)
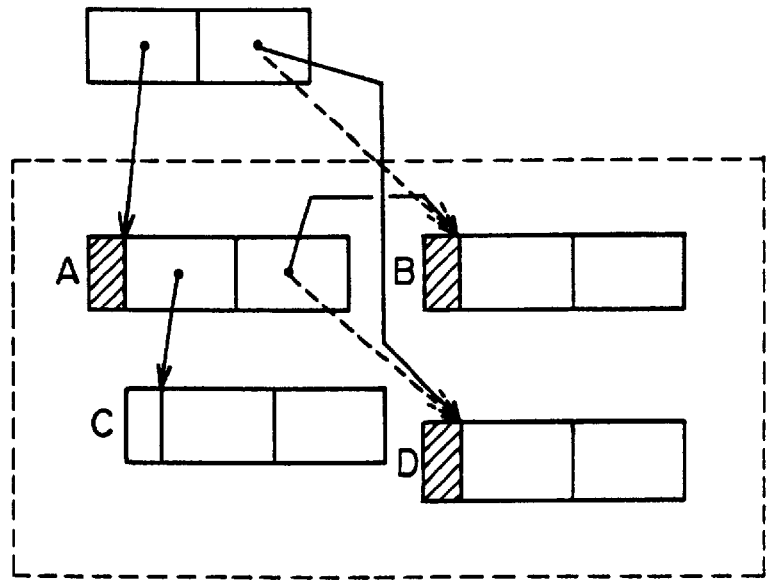
FIG. 2  PRIOR ART

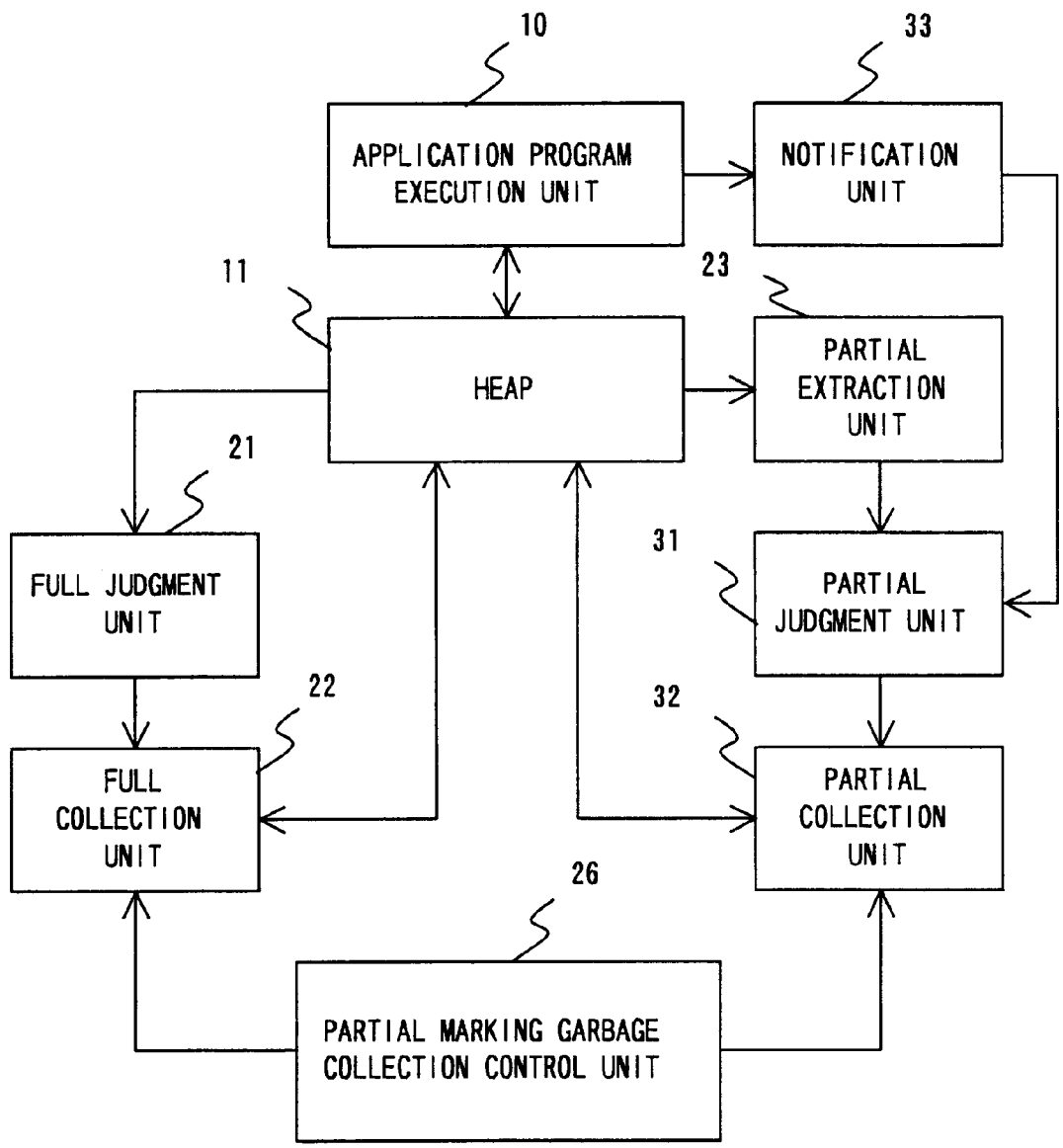
F I G. 5

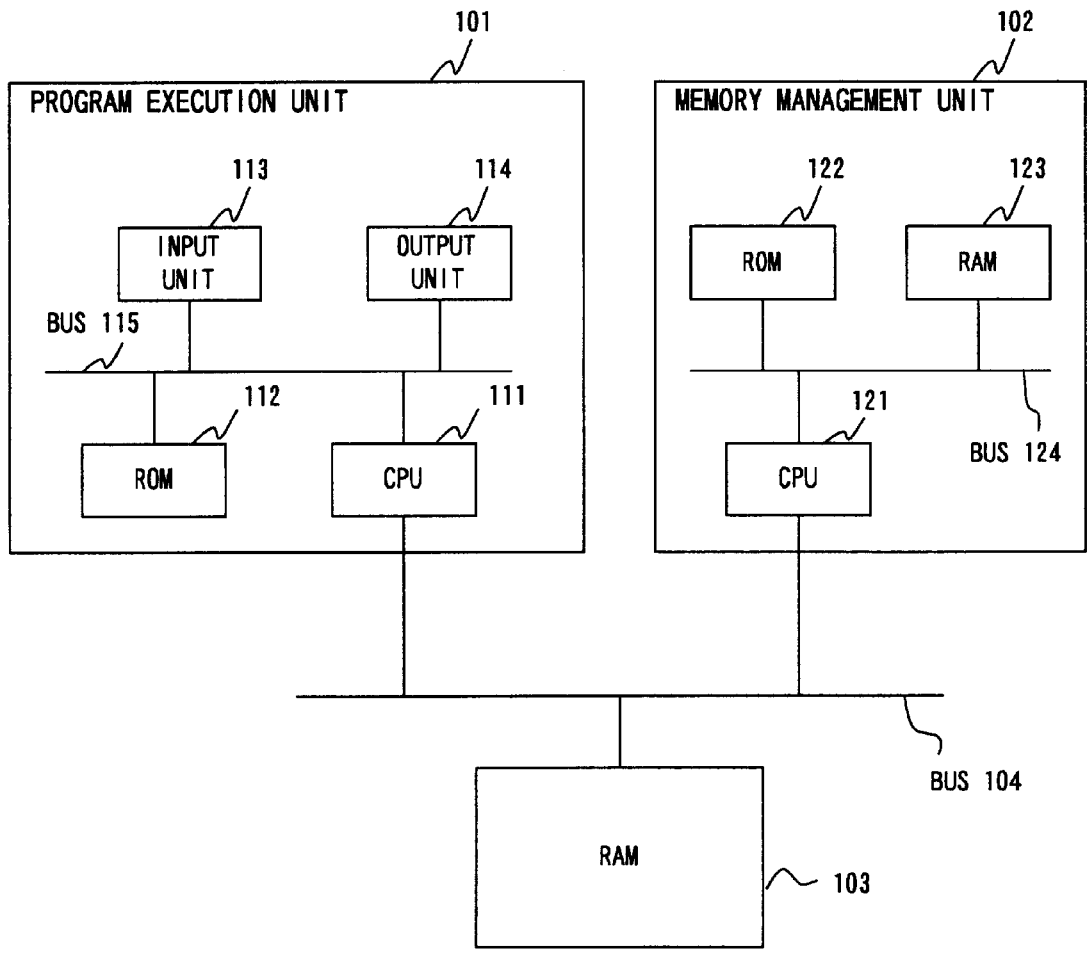
F I G. 6

```
GP_partial_marking_gc ()
{
    while (1) {
        CYCLE = FULL;
        PHASE = ROOTINS; GP_root_insert();
        PHASE = MARKING; GP_mark();
        PHASE = SWEEP; GP_sweep_leave_mark();
        CYCLE = PARTIAL;
        PHASE = ROOTINS; GP_root_insert();
        PHASE = MARKING; GP_mark();
        PHASE = SWEEP; GP_sweep_clear_mark();
    }
}
```

```
GP_root_insert ()
{
    PUSH ALL ROOTS ONTO THE STACK
}
```
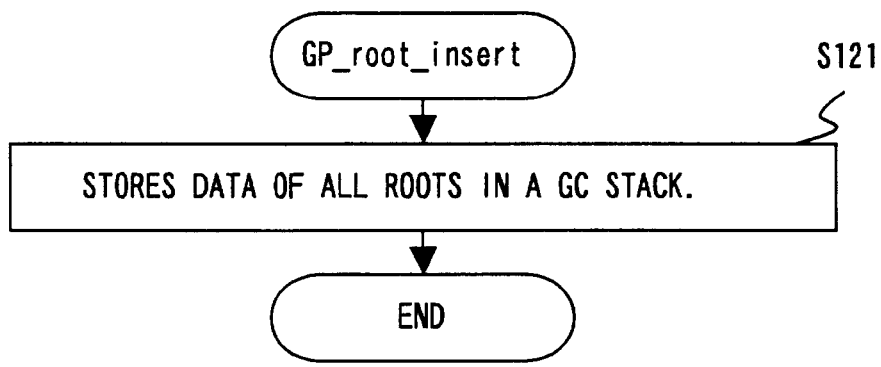
F I G. 9

```
GP_mark ()
{
    while (THE STACK IS NOT EMPTY){
        n = pop_stack();
        while ( (n != NIL) &&
                (n.car != F) &&
                (n.color != BLACK)){
            n.color = BLACK;
            push_stack(n.cdr);
            n = n.car;
        }
    }
}
```

```
GP_sweep_leave_mark ()
{
    for (ALL HEAP CELLS i) {
        if (i.color == WHITE)
            GP_append(i);
        else if ((i.color == OFF_WHITE) &&
                 (i.car != F))
            i.color = WHITE;
    }
}
```

```
GP_append (i)
{
    i.color = OFF_WHITE;
    i.car = F;
    i.cdr=NIL;
    FREE.right.cdr = i;
    FREE.right = i;
}
```
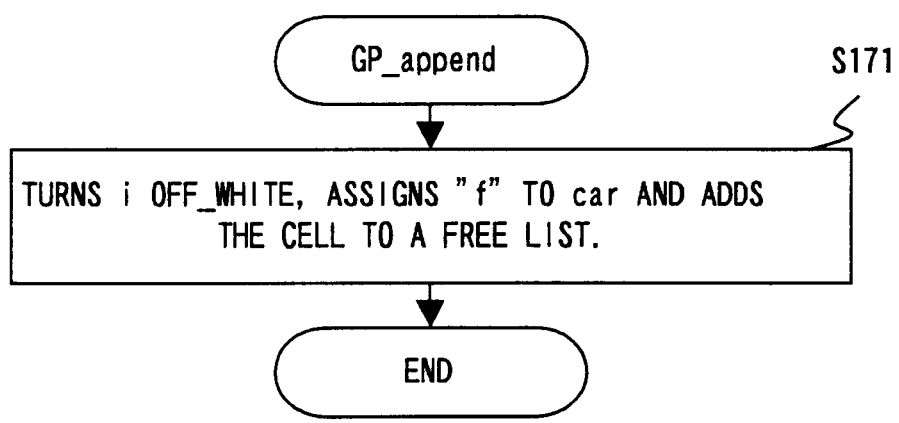
F I G.  1 2

```
GP_sweep_clear_mark ()
{
    for (ALL HEAP CELLS i) {
        if (i.color == WHITE)
            GP_append(i);
        else if ((i.car != F))
            i.color = WHITE;
    }
}
```

```
LP_replace_pointer(m, n)
{
    /* for Snapshot GC */
    if (PHASE == MARKING)
        push_stack(*m);
    /* for PM GC */
    if ((PHASE == MARKING) && (n.color == OFF_WHITE))
        push_stack(n);
    else if ((PHASE == SWEEP) && (n.color != BLACK))
        push_stack(n);
    *m = n;
}
```
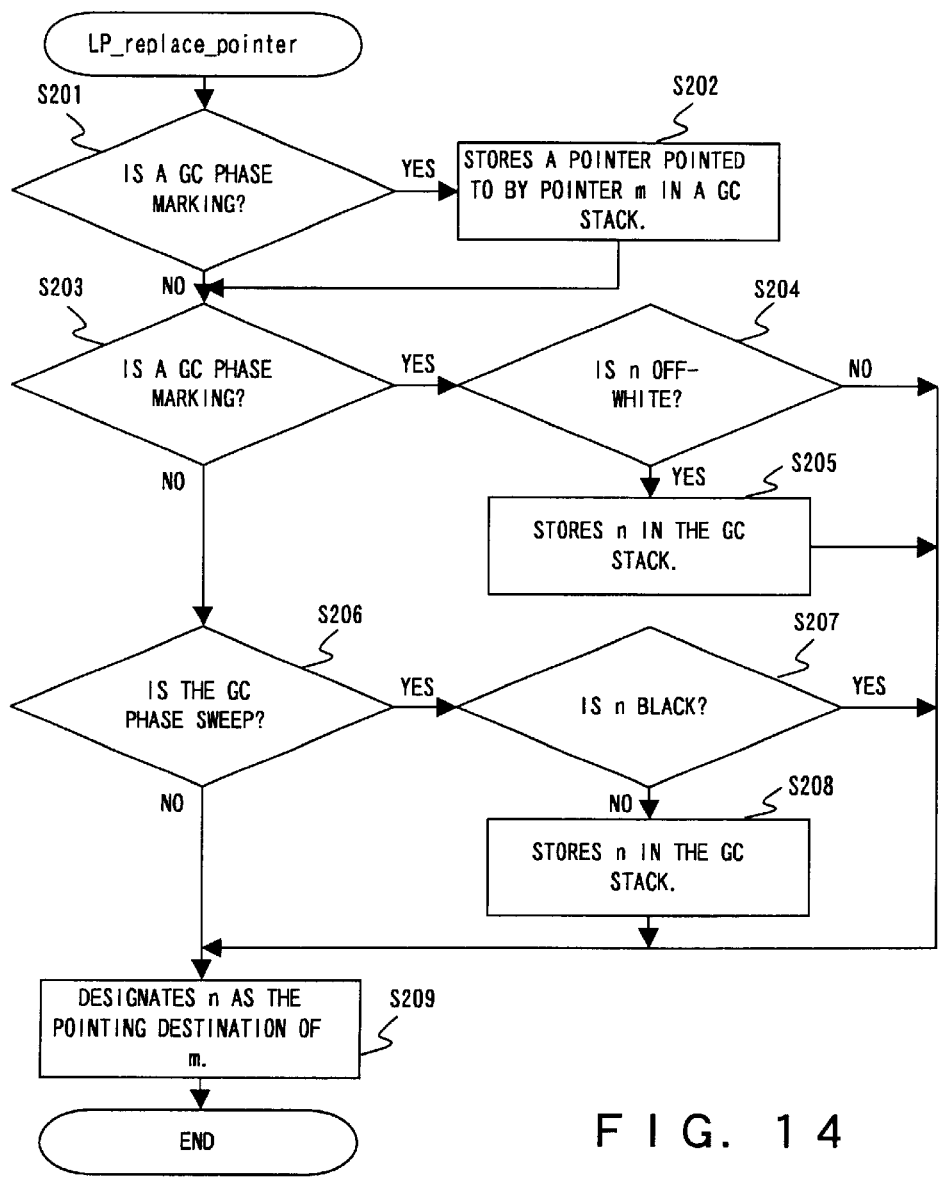
F I G. 1 4

```
GP_append(i){
    i.color = OFF_WHITE;
    i.car = F;
    i.cdr = NIL;
    FREE.right.cdr = i;
    FREE.right = i;
    NO_FREE = NO_FREE + 1;
}
```
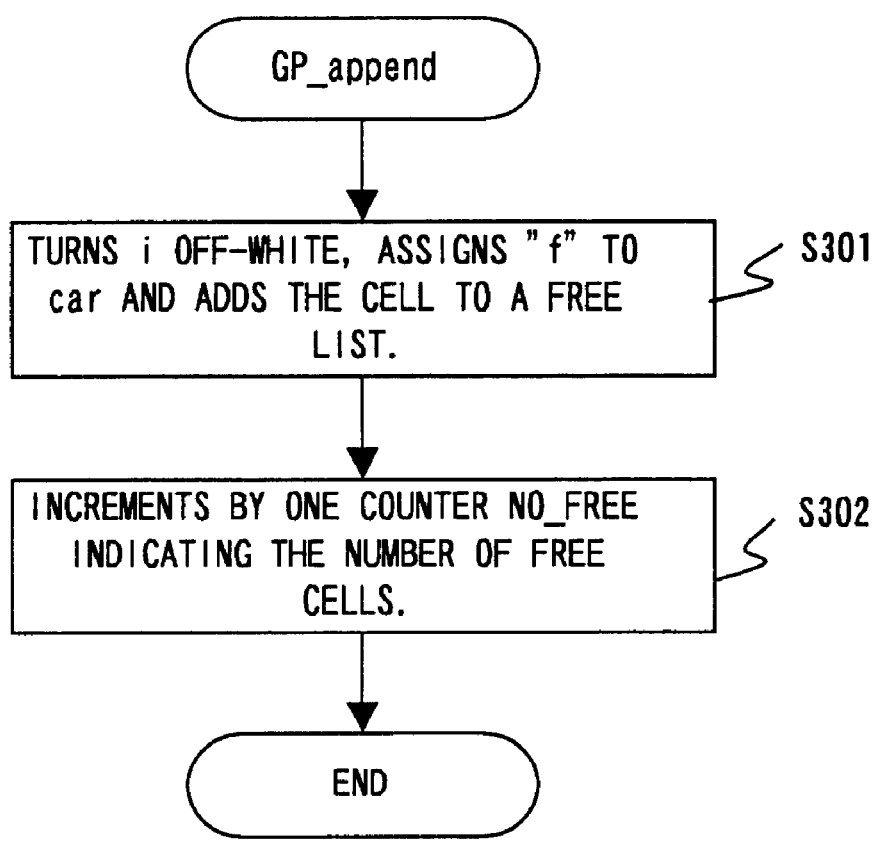
F I G. 1 6

```
partial_GC(){
    CYCLE := PARTIAL;
    PHASE := ROOTINS; GC_root_insert();
    PHASE := MARKING; GP_mark();
    PHASE := SWEEP; GP_sweep_leave_mark();
}
```

```
full_GC(){
    CYCLE = FULL;
    PHASE = ROOTINS; clear_mark(); GC_root_insert();
    PHASE = MARKING; GP_mark();
    PHASE = SWEEP; GP_sweep_leave_mark();
}
```

```
LP_cons(m,n){
   do { SLEEP} while (FREE.left == FREE.right);
   NEW = FREE.left;
   FREE.left = FREE.left.cdr;
   NEW.car = m;
   NEW.cdr = n;
   if (CYCLE == PARTIAL)
      NO_PARTIAL_ALLOCATE += 1;
   return NEW;
}
```

```
GP_sweep_leave_mark(){
    for (i = 0; i< N; i++){
        if (i.color == WHITE){
            GP_append(i);
            NO_PARTIAL_RECLAIM += 1;
        } else if (i.color = OFF_WHITE && i.car != F){
            i.color = WHITE;
        }
    }
}
```

```
LP_pointer_replace(m, n){
    if (CYCLE == MARKING)
        push(*m);
    if (PHASE == MARKING && n.color == OFF_WHITE){
        push(n);
        NO_REMEMBER += 1;
    } else if (PHASE == SWEEP && n.color != BLACK){
        if (NO_REMEMBER <= THRESHOLD_REMEBER) push(n);
        NO_REMEMBER += 1;
    }
    *m = n;
}
```

```
full_partial_control(){
    if (NO_REMEMBER > THRESHOLD_REMEBER){
        NO_REMEMBER = 0;
        full_GC();
    } else {
        NO_REMBER = 0;
        partial_GC();
    }
}
```

```
GP_sweep_leave_mark(){
    for (i = 0; i< N; i++){
        if (i.color == WHITE){
            GP_append(i);
        } else if (i.color = OFF_WHITE && i.car != F){
            i.color = WHITE;
        } else NO_BLACK += 1;
    }
}
```

```
LP_request_full_gc()
{
    NEXT_GC = FULL;
}
```

|  | 1st bit | 2nd bit |
|---:|:---:|:---:|
| WHITE : | 0 | 0 |
| BLACK : | 0 | 1 |
| OFF_WHITE_UV : | 1 | 0 |
| OFF_WHITE_V : | 1 | 1 |

FIG. 30

```
GC_mark(){
    while (the stack is not empty) {
        n = pop();
        while ( n != NIL && n.car != F)
            if (n.color == WHITE){
                n.color = BLACK;
                push(n.cdr);
                n = n.car;
            } else if (n.color == OFF_WHITE_UV){
                n.color = OFF_WHITE_V;
                push(n.cdr);
                n = n.car;
            }
    }
}
```
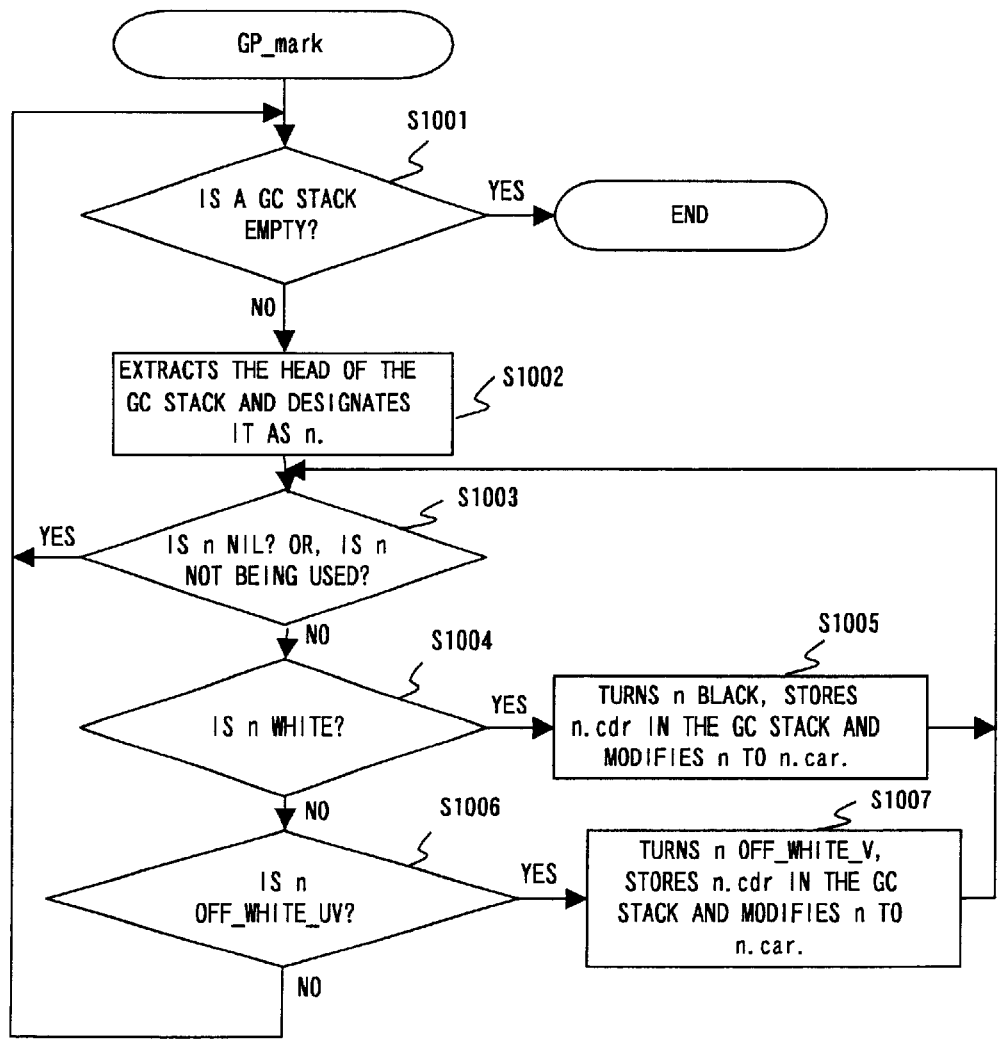
F I G. 3 1

```
GP_sweep_leave_mark ()
{
    for (ALL HEAP CELLS i) {
        if (i.color == WHITE)
            GP_append(i);
        else if ((i.color == OFF_WHITE_UV || i.color == OFF_WHITE_V) &&
                (i.car != F))
            i.color = WHITE;
    }
}
```

```
GP_append (i)
{
    i.color = OFF_WHITE_UV;
    i.car = F;
    i.cdr NIL;
    FREE.right.cdr = i;
    FREE.right = i;
}
```
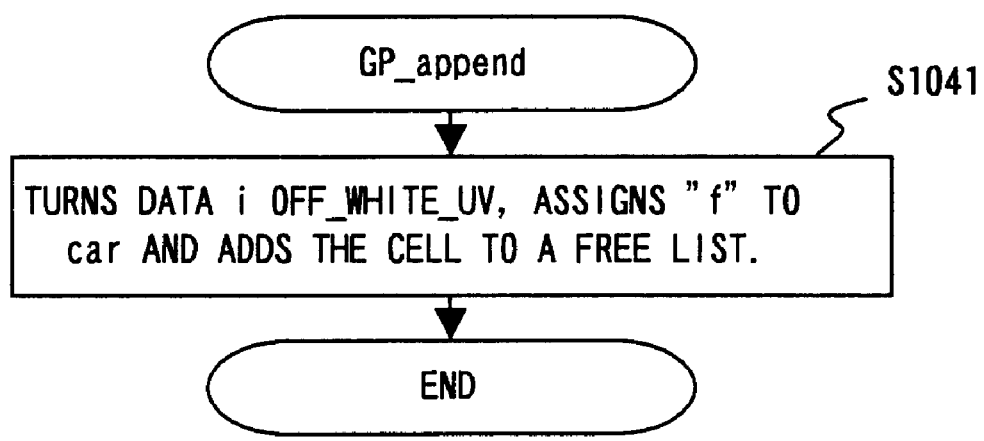
F I G. 3 3

```
LP_replace_pointer(m, n)
{
    if (PHASE == MARKING)
        push_stack(*m);
    if ((PHASE == MARKING) && (n.color == OFF_WHITE_UV || n.color == OFF_WHITE_V ))
        push_stack(n);
    else if ((PHASE == SWEEP) && (n.color != BLACK))
        push_stack(n);

*m = n;
}
```

```
LP-pointer-replace(m, n){
    if (PHASE == MARKING) push(*m);
    if (PHASE == MARKING && n.color == OFF_WHITE){
        push(m);
    } else if (PHASE == SWEEP && n.color != BLACK){
        push(m);
    }
    *m = n;
}
```

```
GP_mark ()
{
    while (THE STACK IS NOT EMPTY){
        n = pop_stack();
        if (n != NIL && n.color == BLACK){
            if (n.cdr != NIL && n.cdr->color != BLACK)
                push_stack(n.cdr);
            if (n.car != NIL && n.car->color != BLACK)
                push_stack(n.car);
        }
        while ( (n != NIL) && (n.car != F)){
            if (n.color != BLACK)){
                n.color = BLACK;
                push_stack(n.cdr);
                n = n.car;
            } else {

}
        }
    }
}
```

```
LP-pointer-replace(m, n){
    if (PHASE == MARKING)
        if(*m != NIL && (*m).color == WHITE) push(*m);
    if (PAHSE == MARKING && n.color == OFF_WHITE){
        push(n);
    } else if (PHASE == SWEEP && n.color != BLACK){
        push(n);
    }
    *m = n;
}
```

```
LP-pointer-replace(m, n){
    if (PHASE == MARKING) push(*m);
    if (PAHSE == MARKING && n.color == OFF_WHITE){
        if (m.color == BLACK) push(n);
    } else if (PHASE == SWEEP && n.color != BLACK){
        if (m.color == BLACK) push(n);
    }
    *m = n;
}
```

DEVICE AND METHOD FOR MANAGING MEMORY RESOURCES BY USING PARALLEL-TYPE GARBAGE COLLECTION

BACKGROUND OF THE INVENTION

1. Field of the Invention

The present invention relates to a technology for managing memory resources, and in particular, it relates to a technology for managing memory resources used by the execution of an application program and executing a garbage collection process for collecting free memory areas of the memory resources.

2. Description of the Related Art

As a method for efficiently managing limited memory resources without increasing a programmer's load in a processing system, there is a method called "garbage collection" (hereinafter called "GC"). The GC process specifies free data in a memory and collects a memory area used by the data to use the area for another piece of data.

In the description of GC, a memory resource to be managed is called a "heap". The heap is composed of units of data strings called cells (or objects). Each cell can include pointers pointing to another cell and other data, but excluding pointers.

Outside the heap there is an aggregate of the pointers, such as a register, a stack, etc., to which an application program executed on the processing system can directly refer, and this aggregate is called a root. In the heap, there are both a cell that can be directly or indirectly accessed by a pointer reference from this root and a cell that cannot be accessed in such a way. The former cell can be accessed by the execution of an application program and is called a "live cell", "surviving cell", etc. The latter cell cannot be accessed by the execution of an application program and is called a "dead cell", etc.

The GC judges whether each cell is live or dead in a heap, regards dead cells as "garbage" and collects the "garbage" as an area that can be used by another piece of data.

The GC can be classified into several categories based on the principle of an adopted algorithm. A variety of GC methods are described in detail in "Feature: The Basics of Garbage Collection and its Recent Trend", Information Processing, Vol.35, No.11, Information Processing Society of Japan (1994). Here, a parallel type GC, which is one of the methods, is described.

Processes in which GC is performed in the processing system are largely classified into two categories: a process executed by an application program and a process executed by GC. The former is called a mutator and the latter is called a collector.

According to the basic algorithm of GC, in order to prevent the change in the life/death status of a cell by a mutator, the mutator is temporarily stopped while a collector is executed by the processing system, and the collectors are collectively executed. However, basically the collector must extract all cells that can be reached by sequentially tracing pointers from a root as live cells. In this case, the process load becomes fairly large depending on the amount of live cells. Therefore, the interruption time of a process on the mutator side cannot be neglected.

In order to reduce the execution interruption time of a mutator due to GC, a variety of GC algorithms have been proposed.

Conventionally, a classic GC called collective type GC was used in which the execution of processes by mutators is stopped and a collector collectively collects memories. Since this method stopped a mutator for a long time, the response performance of an application program was degraded, which is a problem.

Then, a method that prevents the interruption for a long time of a mutator by distributing processes by collectors among processes by mutators in terms of time instead of collectively executing GCs and by executing both the processes in parallel one part at a time, was proposed. This is called parallel type GC.

Here, The summaries of both an on-the-fly GC proposed by Mr. Dijikstra et al and a snapshot GC proposed by Mr. Yuasa of the parallel type GCs are described. For detailed information about these GCs, see E. W. Dijkstra, L. Lamport, A. J. Martin, C. S. Scholten, and E. F. M. Steffens, "On-the-Fly Garbage Collection: An Exercise in Cooperation", Communications of the ACM, Vol.21, No.11, pp.966–975 (1978); T. Yuasa, "Real-Time Garbage Collection on General-Purpose Machine", Journal of Systems and Software, Vol.11, pp.181–198 (1990); and T. Yuasa, "Feature: The Basics of Garbage Collection and its Recent Trend, 3. Real-Time Garbage Collection", Information Processing, Vol.35, No.11, pp.1066–1013, Information Processing Society of Japan (1994).

The on-the-fly GC is obtained by improving a mark and sweep method, which is one of the collective type GC basic algorithms. According to the mark and sweep method, one cycle of GC is divided into two phases, a mark phase and a sweep phase, and is executed.

In the mark phase, first, a root is secured (this process is often specifically called a "root-insertion phase"). Then, a process for marking all reached cells while sequentially tracing pointers from the root, is executed.

Then, as a sweep phase, the entire heap is scanned and unmarked cells are collected. Simultaneously, the marks of marked cells are erased in preparation for a subsequent GC. After that, a mark phase (including a root-insertion phase) and a sweep phase are alternately repeated. This is a mark and sweep type GC.

According to the on-the-fly GC, a collector executes a mark and sweep type GC in parallel with a mutator process. In this case, the replacement of pointers by a mutator often occurs in the midst of a mark phase of GC by a collector. In this case, although a dead cell is made a live cell by the replacement of pointers, the live cell is often not marked in a mark phase. Then, this live cell is collected as "garbage" in a subsequent sweep phase, which is another problem. Therefore, according to the on-the-fly GC, each cell in the heap is marked with one of three colors: black, dark black and white. The cell-marking procedure by the on-the-fly GC is described with reference to FIG. 1.

Before the collector starts on-the-fly GC, all cells in a heap are marked white. The collector, first, refers to a root and turns a cell mark directly pointed to by a pointer of this root dark black. (A) in FIG. 1 shows that the marks of cells A and B directly pointed to by the pointer of the root are turned dark black. In FIG. 1 and FIG. 2 referred to later, dark black marks attached to cells are indicated with diagonal lines.

A dark black cell mark indicates that a cell must be marked black again later. Actually, a cell is not marked dark black, but the collector pushes a pointer pointing to the cell to a stack provided for GC (GC stack) (this process is called a "root insertion process", etc.).

Then, the collector turns the dark black cell mark black. In other words, the pointer is popped from the GC stack and the mark of the cell pointed to by the pointer is turned black.

Furthermore, if the black-marked cell stores another pointer pointing to another cell, the collector turns the marks of all cells pointed to by all pointers stored in the cell dark black. In this way, all pointers pointing to other cells stored in the black-marked cell are pushed to the GC stack.(B) in FIG. 1 shows that the dark black mark of cell A shown in (A) is turned black and further the white marks of cells C and D pointed to by the pointers stored in cell A are turned dark black.

According to the on-the-fly GC, a collector process performs the marking described above and in addition, a mutator process performs another marking. If either the root or one of cells in the heap stores a pointer and if a cell pointed to by a stored pointer is marked white, a mutator turn the white mark of the cell pointed to by the pointer dark black. (C) in FIG. 1 shows that as a result of a mutator process, the pointer of the root that points to cell B in (A) is modified to point to cell D and the pointer stored in cell A that points to cell D is modified to point to cell B. (C) in FIG. 1 shows that as a result of these modifications, of the marks of cells B and D that are pointed to by the pointer of the root and the new pointer stored in cell A, respectively, the white mark of cell D is turned dark black.

Then, the collector process performs the marking described above. (D) in FIG. 1 shows that the dark black mark of cell A shown in (A) is turned black and that of cells pointed to by the pointers stored in cell A, the white mark of cell C is turned dark black. If this collector marking continues to proceed, there will be no dark black-marked cell in the future (the GC stack will be empty), and the mark of each cell in the heap will become either white or black. In this way, the mark phase of the on-the-fly GC terminates.

In a succeeding sweep phase, white-marked cells are judged as "garbage" and are collected. Simultaneously, black-marked cells are turned white in preparation for a subsequent GC cycle. After that, a mark phase and a sweep phase are alternately repeated. This is the on-the-fly GC.

In this way, according to GC, even if pointer replacement is generated by the mutator process, dark black marks are turned black in the future by turning the marks of cells pointed to by replaced pointers dark black. Therefore, the problem that the live cells are collected by mistake can be solved.

Next, snapshot GC is described. The snapshot GC is also obtained by improving the mark and sweep method described earlier as in the on-the-fly GC.

According to the snapshot GC, cells that are being used at the time of the start of one specific GC cycle cannot be collected in the sweep phase of the cycle even if the cells might become "garbage" later. Cells the use of which starts by the mutator in one GC cycle cannot be collected in the sweep phase of the cycle even if the cells might become "garbage" later. In other words, according to the snapshot GC, only cells that are already "garbage" at the time of the start of one GC cycle are collected. This is as if the snapshot of the state of use of the heap at the time of the start of one GC cycle was taken and only "garbage" cells included in the snapshot were collected. Cells that become "garbage" in the midst of one GC cycle are collected in the sweep phase after the mark phase of a subsequent cycle.

In the mark phase of the on-the-fly GC, if pointer replacement is generated in either the root or a cell in the heap by the mutator process, the white marks of cells pointed to by replaced pointers are turned dark black. In other words, the replaced pointers are pushed onto the GC stack. However, in the mark phase of the snapshot GC, if a pointer is stored in one cell of the heap by the mutator process and if the mark of a cell pointed to by the pointer stored in the cell before the cell storing the pointer stores the pointer is white, the white mark is turned dark black. That is, if a new pointer is stored in a cell, a pointer stored in the cell before the pointer is stored is pushed onto the GC stack. However, the collector process of the snapshot GC is the same as the collector process of the on-the-fly GC.

The cell marking procedure of the snapshot GC is described with reference to FIG. 2.

(A) in FIG. 2 shows that the marks of cells A and B directly pointed to by the pointer of a root are turned dark black as in the collector process of the on-the-fly GC shown at (A) in FIG. 1.

For example, if the pointer of the root and a pointer stored in cell A are modified to point to cell D and cell B, respectively, by the mutator process, the white mark of cell D that the pointer stored in cell A has pointed to before the modification is turned dark black, as is shown at (B) in FIG. 2.

Furthermore, according to the snapshot GC, the white marks of cells the use of which is started by the mutator process are turned black. The marks of both cells that were live at the time of the start of one GC cycle and cells that were newly used in the midst of the mark phase of the cycle will be turned black in the future by these mark replacement operations. In the subsequent sweep phase, white-marked cells are judged as "garbage" and are collected.

The advantage of the snapshot GC over the on-the-fly GC is that no process for GC is required at the time of the assignment of a pointer pointing to a cell to the root that is performed by the mutator process. In the normal mutator process, pointers pointing to cells are often assigned to the root. Therefore, by removing a GC process load from this assignment, the improvement of the execution performance of an application program can be expected.

In this way, according to the snapshot GC, cells that become "garbage" in the midst of one GC cycle are collected in the sweep phase after the mark phase of a subsequent cycle instead of the sweep phase of the cycle. However, a time period required by the sweep phase of the snapshot GC is the same as a time period required by the sweep phase of the mark and sweep method described earlier. Therefore, although the snapshot GC is of a parallel type, it is considered that the collection efficiency of "garbage" cells has been degraded, since cells that become "garbage" in the midst of one GC cycle are not collected in the sweep phase of the cycle compared with the mark and sweep method. In this way, in a parallel type GC, the improvement of the collection efficiency of "garbage" cells is a big problem.

SUMMARY OF THE INVENTION

It is an object of the present invention to improve the process efficiency of parallel type GC.

In one aspect of the present invention, it is judged that higher process efficiency of the entire GC can be obtained if the subsequent collection of free cells in a partial marking GC, which is a kind of parallel type GC, should be executed in either a full GC cycle or a partial GC cycle, based on the state of the collection of free cells that is performed in a full GC cycle or partial GC cycle in the past, and a subsequent GC cycle to be executed is selected based on this judgment result.

In another aspect of the present invention, if a cell judged to be free in a mark phase is processed in the first place, the cell is not collected only based on the judgment result, but is processed again in a mark phase and the free cell is collected from a heap based on the result. In this way, even a cell, the period of use of which is short, such as a cell, the use of which is started by the execution of an application program and is terminated immediately after, can be securely collected.

In another aspect of the present invention, if the first pointer that is stored in a cell being used in a heap and that points to another cell in the heap, is modified to the second pointer by the execution of an application program, the pointer pointing to the cell in which the first pointer is stored is reported. A memory management unit newly judges whether a cell that is pointed to by the second pointer stored in a cell pointed to by the reported pointer is being used in the heap by the execution of an application program. In this way, even a cell, the period of use of which is short, such as a cell, the use of which starts at the time of the execution of an application program and is terminated immediately after, can be securely checked and the cell can be securely collected, if the cell is judged to be free.

In another aspect of the present invention, if the first pointer that is stored in a cell being used in a heap and that points to another cell in the heap, is modified to the second pointer by the execution of an application program and if a cell pointed to by the first pointer has never been processed in a mark phase after the judgment of the state of use of cells recently performed in a full GC cycle, the first pointer is reported. The memory management unit newly judges whether a cell pointed to by the first pointer that is stored in a cell pointed to by the reported pointer is being used in the heap by the execution of an application program. In this way, the number of pointers to be reported to the memory management unit can be reduced, and a process load can be reduced accordingly.

In another aspect of the present invention, if the first pointer that is stored in a cell being used in a heap and that points to another cell in the heap, is modified to the second pointer by the execution of an application program and if only a cell pointed to by the first pointer has never been processed in a mark phase after the judgment of the state of use of cells recently performed in a full GC cycle, the second pointer is reported. A memory management unit newly judges whether a cell that is pointed to by the second pointer stored in a cell pointed to by the reported pointer is being used in the heap by the execution of an application program. In this way, the number of pointers to be reported to the memory management unit can be reduced, and a process load can be reduced accordingly.

In this way, by any aspect of the present invention, the process efficiency of a parallel type GC can be improved.

BRIEF DESCRIPTIONS OF THE DRAWINGS

The present invention will be more apparent from the following detailed description when the accompanying drawings are referenced.

FIG. 2 shows the marking procedure of the snapshot GC.

FIG. 5 shows the basic configuration of the third, fourth and fifth aspects of the present invention.

FIG. 6 shows the configuration of a device for implementing the present invention.

FIG. 9 shows the algorithm of a root-insertion phase process.

FIG. 12 shows the algorithm of a free-list addition process.

FIG. 14 shows the algorithm of pointer replacement.

FIG. 16 shows the algorithm of a free list addition process in the first preferred embodiment of PMGC, the process efficiency of which is improved.

FIG. 30 shows an example of the bit allocation of color marked on a cell.

FIG. 31 shows the algorithm of a mark phase process in the sixth preferred embodiment of a PMGC, the process efficiency of which is improved.

FIG. 33 shows the algorithm of a free list addition process in the sixth preferred embodiment of a PMGC, the process efficiency of which is improved.

DESCRIPTION OF THE PREFERRED EMBODIMENTS

First, the basic configuration of the present invention is described.

Figure 1:
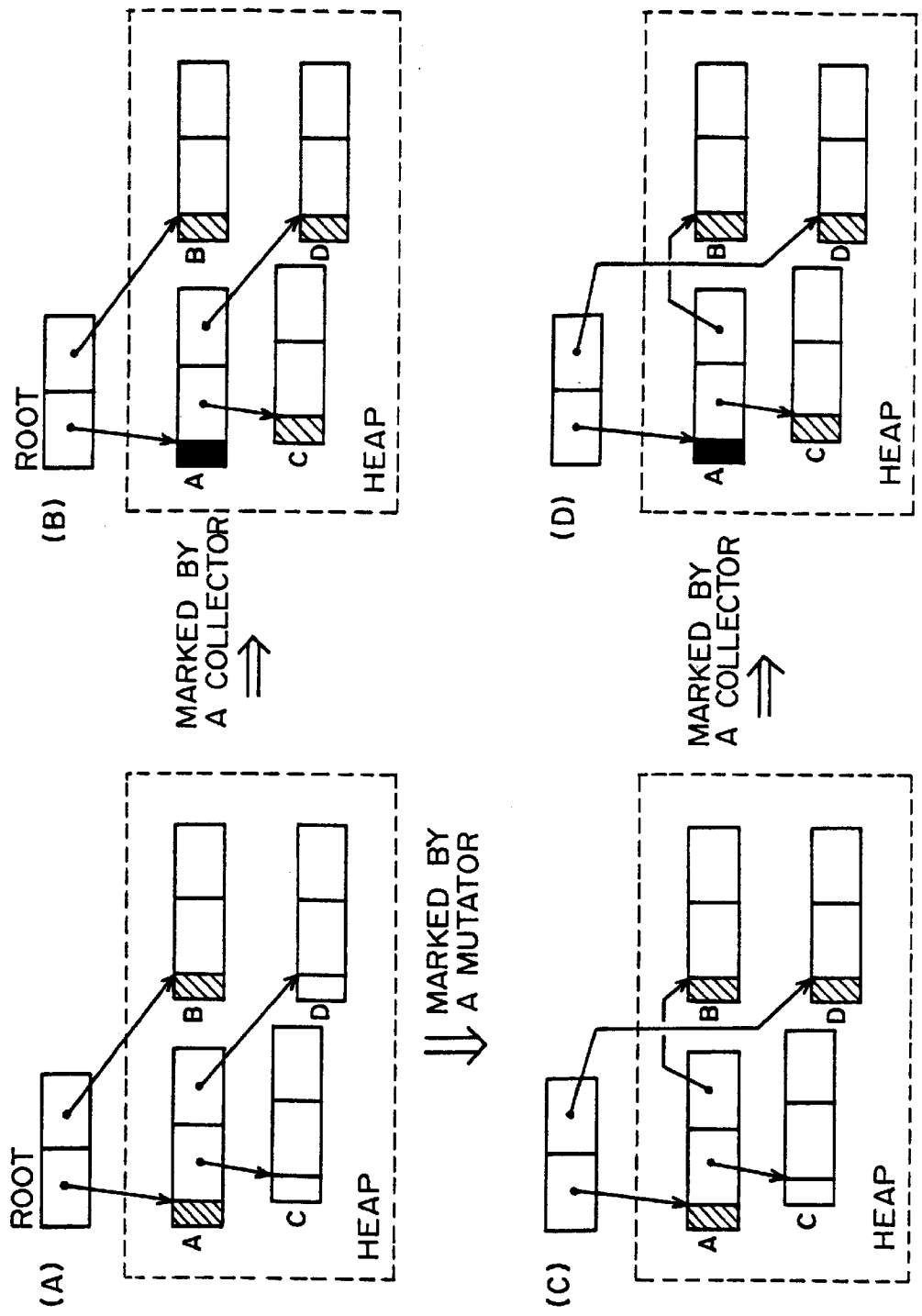
FIG. 1 shows the marking procedure of the on-the-fly GC.
Figure 3:
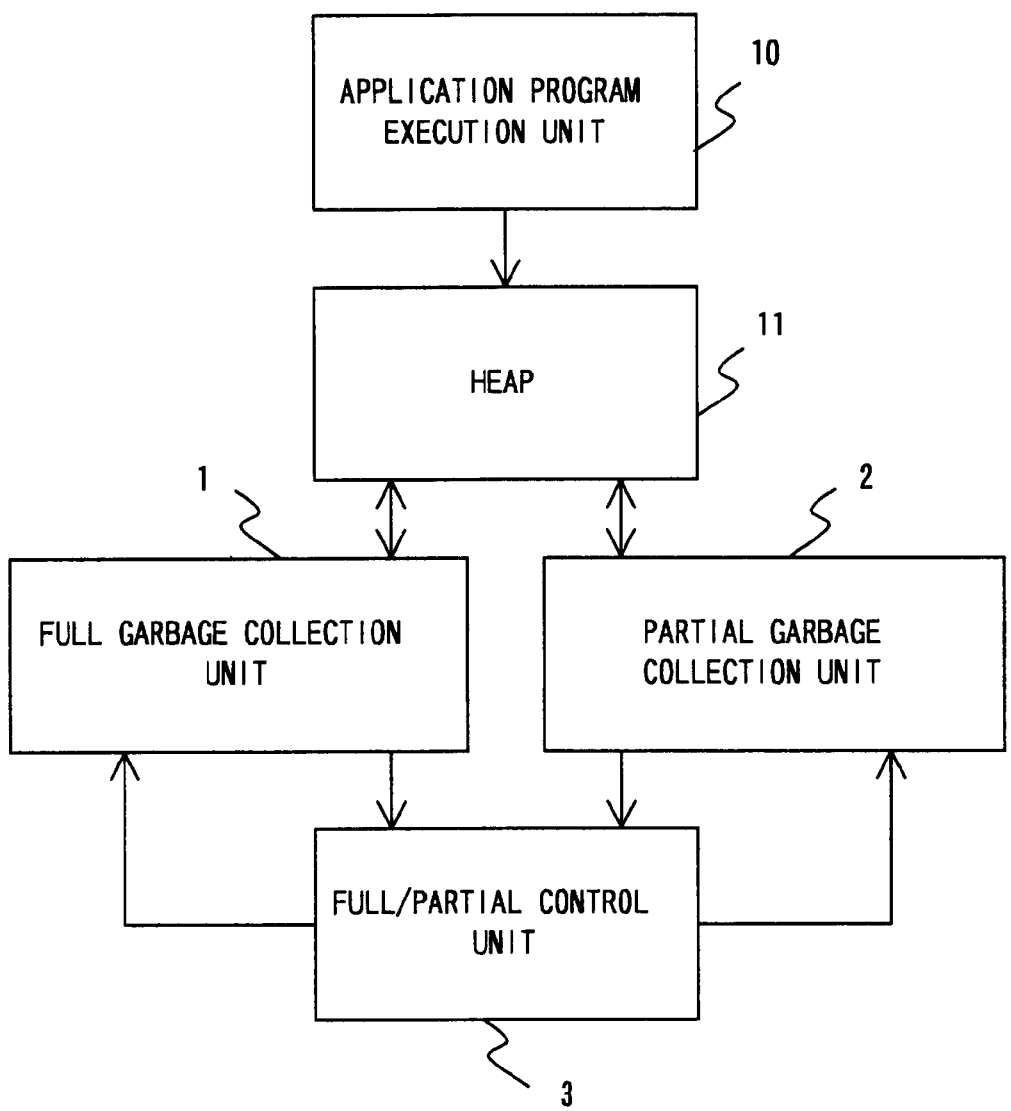
FIG. 3 shows the basic configuration of the first aspect of the present invention.

FIG. 3 shows the basic configuration of the first aspect of the present invention. The first aspect of the present invention comprises a full garbage collection unit 1, a partial garbage collection unit 2 and a full/partial control unit 3.

In FIG. 3, an application program execution unit 10 executes application programs.

A heap 11 is a memory resource managed in units of cells, which are data strings. The heap 11 is used in units of cells when an application program is executed by the application program execution unit 10.

The full garbage collection unit 1 checks the state of use of all cells in the heap 11 by the execution of the application program and collects free cells from the heap 11 based on the judgment result. That is, the full garbage collection unit 1 collects free cells by the full cycle garbage collection process of a partial marking garbage collection method, which is one of the parallel type GCs.

The partial garbage collection unit 2 extracts cells that have been used by the execution of the application program from cells in the heap 11 after the judgment of the state of use of cells recently performed by the full garbage collection unit 1 or the partial garbage collection unit 2, checks the state of use of the extracted cells by the execution of the application program and collects free cells from the heap 11 based on the judgment result. That is, the partial garbage collection unit 2 collects free cells from the heap 11 by the partial cycle garbage collection process of the partial marking garbage collection method.

The full/partial control unit 3 determines whether a subsequent collection of free cells should be performed by either the full garbage collection unit 1 or the partial garbage collection unit 2, based on the collection state of free cells performed in the past by the full garbage collection unit 1 or the partial garbage collection unit 2.

Since the configuration shown in FIG. 3 can perform the execution of an application program and cell collection can be performed in parallel, the configuration can be called a parallel type GC.

In this case, for example, the full/partial control unit 3 can also be designed to exercise the control described above based on the collection number of free cells in the previous collection performed by the full garbage collection unit 1 or partial garbage collection unit 2.

Alternatively, the full/partial control unit 3 can exercise control based on the ratio of the collection number of free cells in the previous collection performed by the partial garbage collection unit 2 to the amount of cells in the heap 11 at the time of the start of use by the execution of the application program during the judgment or collection of free cells performed by either the full garbage collection unit 1 or partial garbage collection unit 2 two times before.

Alternatively, the full/partial control unit 3 can exercise control based on the number of cells in the heap 11 the data of which are modified by the execution of the application program during the previous judgment or collection of free cells performed by either the full garbage collection unit 1 or partial garbage collection unit 2.

Alternatively, the full/partial control unit 3 can exercise control based on the ratio between the number of cells in the heap 11 the data of which are modified by the execution of the application program during the previous judgment or collection of free cells performed by either the full garbage collection unit 1 or partial garbage collection unit 2 and the number of cells in the heap 11 that are being used at the time of judgment on the state of use of cells performed by the full garbage collection unit 1 or partial garbage collection unit 2 after the judgment of the state of use of cells recently performed by the full garbage collection unit 1.

Alternatively, the full/partial control unit 3 can exercise control according to the notification indicating the change of the state of use of the heap 11 in the midst of the execution of the application program.

According to the configuration of the first aspect, the full/partial control unit 3 judges whether the higher process efficiency of the entire GC can be obtained by performing a subsequent collection of free cells using either the full garbage collection unit 1 or partial garbage collection unit 2, based on the collection state of free cells performed in the past by the full garbage collection unit 1 or partial garbage collection unit 2. Then, the full/partial control unit 3 makes either the full garbage collection unit 1 or partial garbage collection unit 2 perform a subsequent collection of free cells based on this judgment result. Therefore, according to this configuration, the process efficiency of parallel type GC can be improved.

Figure 4:
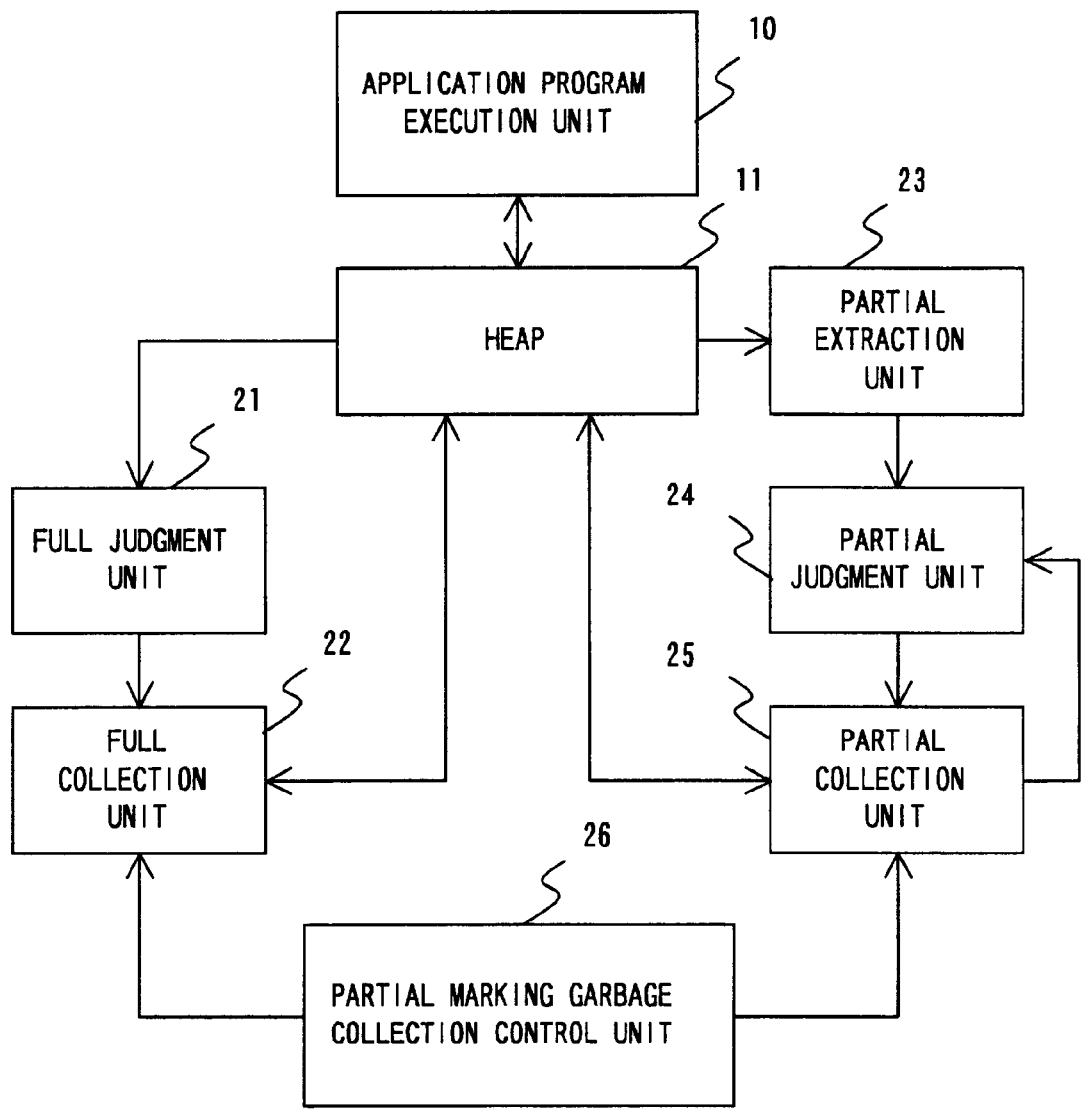
FIG. 4 shows the basic configuration of the second aspect of the present invention.

FIG. 4 shows the basic configuration of the second aspect of the present invention. The second aspect of the present invention comprises a full judgment unit 21, a full collection unit 22, a partial extraction unit 23, a partial judgment unit 24, a partial collection unit 25 and a partial marking garbage collection control unit 26.

Both the application program execution unit 10 and heap 11 shown in FIG. 4 are the same as those respective units shown in FIG. 3.

The full judgment unit 21 judges whether each of all the cells in the heap 11 is being used or not used by the execution of an application program.

The full collection unit 22 collects free cells from the heap 11 based on the judgment result of the full judgment unit 21.

The partial extraction unit 23 extracts cells that have been used by the execution of the application program from the heap 11 after the judgment of the state of use of cells recently performed by the full judgment unit 21.

The partial judgment unit 24 judges whether each of the cells extracted by the partial extraction unit 23 is being used or not used by the execution of the application program.

The partial collection unit 25 collects free cells from the heap 11 based on the judgment result of the partial judgment unit 24.

The partial marking garbage collection control unit 26 determines whether either the full collection unit 22 or partial collection unit 25 should collect free cells from the heap 11.

Since the configuration shown in FIG. 4 can perform the execution of an application program and the cell collection in parallel, the configuration can be called parallel type GC.

According to the basic configuration of this second aspect, if cells judged to be free as a judgment result of the partial judgment unit 24 are processed by either the full judgment unit 21 or partial judgment unit 24, the partial collection unit 25 collects free cells from the heap 11 based on the second judgment of the partial judgment unit 24, which is a feature of the present invention.

Thanks to this feature, even a cell the period of use of which is short, such as a cell the use of which starts at the time of the execution of the application program and is terminated immediately after, can be securely collected by the partial collection unit 25. Therefore, according to this configuration, the process efficiency of parallel type GC can be improved.

FIG. 5 shows the basic configurations of the third, fourth and fifth aspects of the present invention. Each of these aspects of the present invention comprises a full judgment unit 21, a full collection unit 22, a partial extraction unit 23, a partial judgment unit 31, a partial collection unit 32, a partial marking garbage collection control unit 26 and a notification unit 33.

The application program execution unit 10 and heap 11 shown in FIG. 5 are the same as the respective units shown in FIG. 3. The full judgment unit 21, full collection unit 22, partial extraction unit 23 and partial marking garbage collection control unit 26 are the same as the respective units shown in FIG. 4. Since the configuration shown in FIG. 5 can perform the execution of an application program and the cell collection in parallel, the configuration can also be called parallel type GC.

The partial judgment unit 31 judges whether each of the cells extracted by the partial extraction unit 23 is being used or is not used by the execution of the application program.

The partial collection unit 32 collects free cells from the heap 11 based on the judgment result of the partial judgment unit 31.

In the third aspect of the present invention, the notification unit 33 notifies the partial judgment unit 31 of a pointer pointing to a cell storing the first pointer if the first pointer that is stored in the cell being used in the heap 11 and that points to another cell in the heap 11 is modified to the second pointer by the execution of the application program.

In this case, the partial judgment unit 31 newly judges whether a cell that is pointed to by the second pointer stored in a cell that is pointed to by the pointer reported by the notification unit 33 is being used by the execution of the application program, which is a feature of the third aspect of the present invention.

Thanks to this feature, even a cell the period of use of which is short, such as a cell the use of which is started by the execution of the application program and is terminated immediately after, can be securely checked by the partial judgment unit 31 and can be securely collected by the partial collection unit 32 if the cell is judged to be free. Therefore, according to this configuration, the process efficiency of parallel type GC can be improved.

In the fourth aspect of the present invention, the notification unit 33 notifies the partial judgment unit 31 of the first pointer if the first pointer that is stored in a cell being used in the heap 11 and that points to another cell in the heap 11 is modified to the second pointer by the execution of the application program and if a cell pointed to by the first pointer has never been processed by either the full judgment unit 21 or partial judgment unit 31 after the judgment of the state of use of cells recently performed by the full judgment unit 21.

In this case, the partial judgment unit 31 newly judges whether a cell that is pointed to by the first pointer stored in a cell that is pointed to by the pointer reported by the notification unit 33 is being used by the execution of the application program, which is a feature of the fourth aspect of the present invention.

Thanks to this feature, the information amount that is reported from the application program execution unit 10 to the partial judgment unit 31 can be reduced and the process load of the notification unit 33 can be reduced accordingly. Therefore, by adopting this configuration, the process efficiency of parallel type GC can be improved.

In the fifth aspect of the present invention, the notification unit 33 notifies the partial judgment unit 31 of the second pointer if the first pointer that is stored in a cell being used in the heap 11 and that points to another cell in the heap 11 is modified to the second pointer by the execution of the application program and if a cell pointed to by the first pointer has never been processed by either the full judgment unit 21 or partial judgment unit 31 after the judgment of the state of use of cells recently performed by the full judgment unit 21.

In this case, the partial judgment unit 31 newly judges whether a cell that is pointed to by the second pointer stored in a cell that is pointed to by the pointer reported by the notification unit 33 is being used by the execution of the application program, which is a feature of the fifth aspect of the present invention.

Thanks to this feature, the information amount that is reported from the application program execution unit 10 to the partial judgment unit 31 can also be reduced and the process load of the notification unit 33 can be reduced accordingly. Therefore, by adopting this configuration, the process efficiency of parallel type GC can be improved.

In this way, by adopting any of the aspects of the present invention, process efficiency of parallel type GC can be improved.

The process efficiency of the parallel type GC can also be improved by making a computer read a memory resource management program for enabling the computer to execute the same control as performed by the configuration of each aspect of the present invention described above, from a computer-readable medium recording the program, and execute the program.

Furthermore, the objective of the present invention can also be achieved by demodulating the memory resource management program described above from computer data signals embodied in carrier waves, including the program and making a computer execute the program.

The preferred embodiments of the present invention are described below with reference to the drawings.

FIG. 6 shows the configuration of a device for implementing the present invention (hereinafter called "main device"). In FIG. 6, each of a program execution unit 101, a memory management unit 102 and a RAM 103 is connected to a bus 104, and data can be transmitted to/received from one another via the bus 104.

The program execution unit 101 executes an application program inputted from outside the main device and this corresponds to a mutator in the description of GC given earlier.

The memory management unit 102 manages the used state of the RAM 103 used for the program execution unit 101 to execute an application program, and executes a GC process. This unit 102 corresponds to a collector in the description of GC given earlier.

The RAM (random-access memory) 103 is used as a work memory in order for the program execution unit 101 to execute an application program. The memory management unit 102 manages the RAM 103. A GC process is executed for the RAM 103.

The program execution unit 101 includes a CPU 111, a ROM 112, an input unit 113 and an output 114. Each of them is connected to a bus 115 and data can be transmitted to/received from them via a bus 115.

The CPU (central processing unit) 111 exercises control of the program execution unit 101 and executes an application program inputted to the input unit 113 while using the RAM 103 as a work area.

The ROM (read-only memory) 112 stores a basic control program for the CPU 111 exercising control of the program execution unit 101.

The input unit 113 is composed of a reading device for reading data from a portable storage medium, such as a keyboard, a mouse, a floppy disk, a CR-ROM, etc., an interface device for transmitting/receiving data to/from another computer, etc. The input unit 113 is used to input an application program.

The output device 114 is composed of a display device, a printing device, an interface device for transmitting/receiving data to/from another computer, etc. This output unit 114 is used to output the execution results of the application program.

The memory management unit 102 includes a CPU 121, a ROM 122 and a RAM 123, and each of them is connected to a bus 124. Data can be transmitted to/received from one another via a bus 124.

The CPU 121 performs GC for the memory area of the RAM 103 by managing the RAM 103 used by the program execution unit 101 and executing a GC program stored in the ROM 122.

The ROM 122 stores a GC program for the CPU 121 performing GC for the RAM 103.

The RAM 123 is a work memory used for the CPU 121 to execute a GC program.

Figure 7:
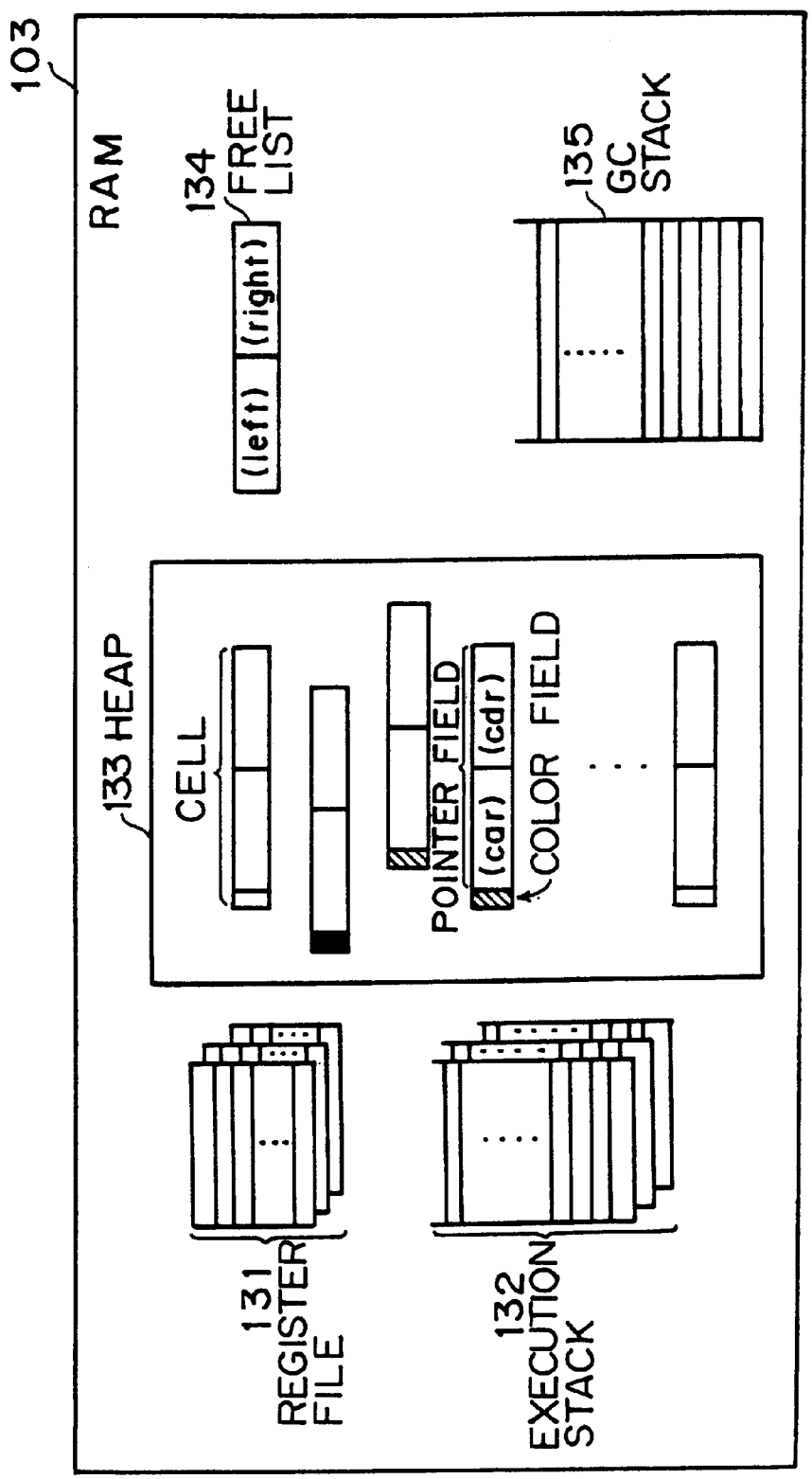
FIG. 7 shows the configuration of the memory area of a RAM 103.

Next, the configuration of the memory area of the RAM 103 is shown in FIG. 7.

A register file 131 stores the value of a pointer pointing to a heap 133 that is stored in a register used by the CPU 111 of the program execution unit 101.

An execution stack 132 is used by the CPU 111 of the program execution unit 101 and stores the value of the pointer pointing to the heap 133.

In the main device, pointers pointing to the heap 133 stored in both the register file 131 and execution stack 132 are roots in GC.

The heap 133 is used by the program execution unit 101 and it is a memory area for which the memory management unit 102 performs GC. The heap 133 is composed of a plurality of cells.

The structure of a cell in the heap 133 is described below. A cell usually has one or more pointer fields. In this example, it is assumed that a cell has two fields (car and cdr). This cell also has a color field. The pointer field stores a pointer pointing to a cell connected to the cell. The color field displays the color of a mark attached to the cell. In this preferred embodiment, as a rule, three colors of white, black and off-white are used for the color attached to a color field.

A free list 134 indicates cells that are not used (free cells) of all the cells in the heap 133.

In the RAM 103, free cells constitute a piece of a list using pointer cdr. Each of all the free cells stores a special value of "f" in the pointer field car, and further, the color field of the cell is turned off-white. The off-white marking is further described later.

In the free list 134, a pointer pointing to the leading cell of a list of free cells and a pointer pointing to the last cell are indicated in fields FREE.left and FREE.right, respectively.

A GC stack 135 stores a pointer pointing to a cell to be marked of all the cells in the mark phase process of a GC process. It is judged later without fail whether the cell pointed to by the pointer stored in this GC stack 135 should be marked. Such a cell is turned dark black in the on-the-fly GC or snapshot GC described earlier.

Next, GC that is performed in the main device shown in FIG. 6 is described.

This preferred embodiment adopts a partial marking GC (hereinafter called "PMGC"), which is one of multiple parallel type GCs. Therefore, first, the summary of PMGC is described. For detailed information, see Messrs. T. Tanaka, S. Matsui, A. Maeda and M. Nakanishi, "Parallel GC using Partial Marking and its Performance Analysis ", Journal of The Institute of Electronics, Information and Communication Engineers (D-I), Vol. J78-D-I, No.12, pp.926–935 (December 1995).

If in the study of GC, a time period elapsing since a cell is allocated in a heap (called "cell age", etc.) is observed, there is a tendency that the younger a cell is, the shorter the life of the cell and the sooner the cell becomes "garbage" and that the survivor cell lives for a long time. In other words, most of cells that can be collected as "garbage" are cells very recently allocated in the heap.

Then, it is considered that the fact that a cell with a short life that has become "garbage" in the midst of one GC cycle of the snapshot GC cycle described earlier is not immediately collected leads to the degradation of the GC collection efficiency.

In PMGC, attention is focused on this point. According to PMGC, a full GC cycle for performing a cell collection process for an entire heap and a partial GC cycle for performing a cell collection process only for cells allocated in a heap in the immediately previous GC cycle are alternately performed. In the partial GC cycle, since cells to be marked in the cycle are a part of cells in the heap, the process amount is small compared with that in the mark phase of the snapshot GC. Therefore, according to PMGC, a higher GC process efficiency than the snapshot GC can be expected.

As described earlier, according to PMGC, cells are marked in three colors: white, black and off-white (in this description, dark black marking for indicating the assignment of a pointer pointing to a cell to a GC stack 135 is excluded). In this case, white-marked cells can be judged to be "garbage" and black-marked cells cannot be judged to be "garbage". In the sweep phase of PMGC, only white-marked cells are collected. As described earlier, an off-white marked cell was not used at the time of the start of the GC cycle, and if the program execution unit 101 uses this cell, a special process described later must be performed.

Figure 8:
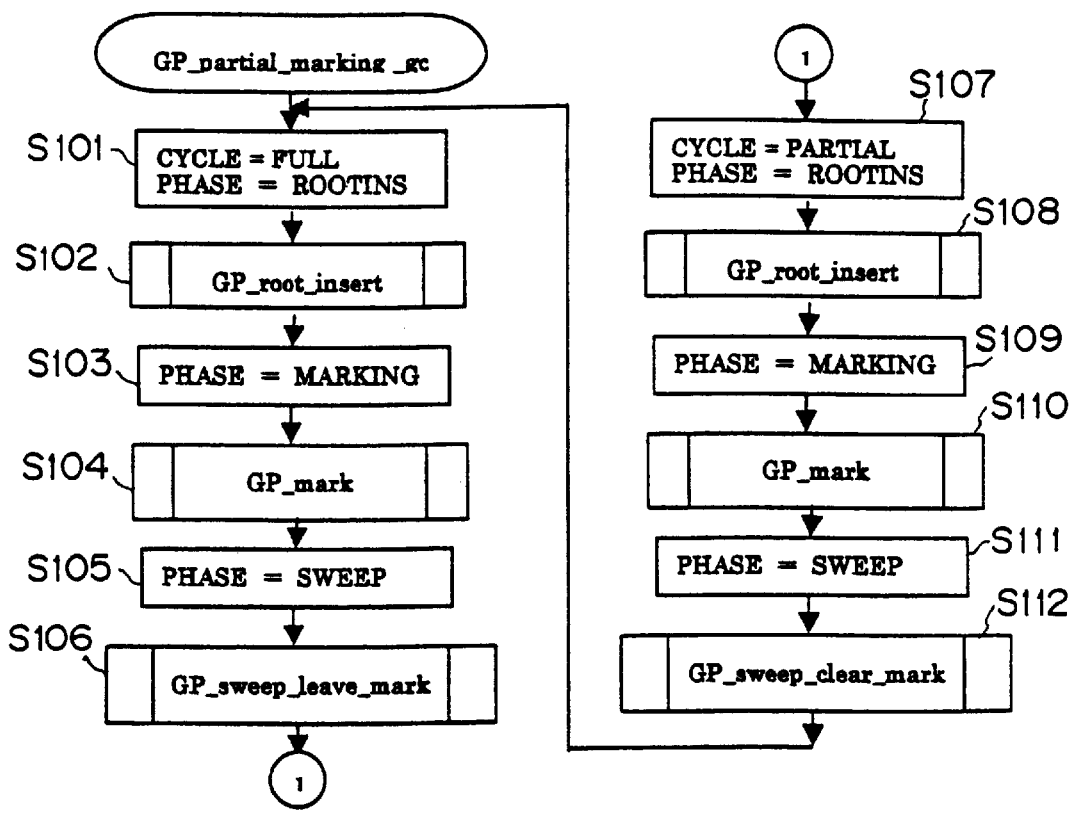
FIG. 8 shows the algorithm of the basic process of a PMGC.

FIG. 8 shows the basic process algorithm of PMGC that is performed by the CPU 121 executing a GC program stored in the ROM 122. Each of FIG. 8 and after is a flowchart showing each algorithm and a C-language-like program is also given with the flowcharts to help understand the algorithm.

In FIG. 8, a process ranging from S101 to S106 and a process ranging from S106 to S112 are a full GC cycle and a partial GC cycle, respectively.

In S101, "FULL" is set in flag CYCLE, and it is indicated that a process after this step is a full GC cycle process. Furthermore, "ROOTINS" is set in flag PHASE, and it is indicated that a process after this step is a root insertion phase.

In S102, a root insertion phase process is executed. The details of this process are given below.

In S103, "MARKING" is set in flag PHASE, and it is indicated that a process after this step is a mark phase. In S104, a mark phase process is executed. The details of the mark phase process are also given later.

In S105, "SWEEP" is set in flag PHASE, and it is indicated that a process after this step is a sweep phase. In S106, a sweep leave mark process is executed. The details of the sweep leave mark are also given later.

In S107, "PARTIAL" is set in flag CYCLE, and it is indicated that a process after this step is a partial GC cycle. Furthermore, "ROOTINS" is set in flag PHASE, and it is indicated that a process after this step is a root insertion phase.

In S108, a root insertion phase process is executed.

In S109, "MARKING" is set in flag PHASE, and it is indicated that a process after this step is a mark phase. In S110, a mark phase process is executed.

In S111, "SWEEP" is set in flag PHASE, and it is indicated that a process after this step is a sweep phase. In S112, a sweep clear mark process is executed. The details of the sweep clear mark process are also given later.

After the completion of the process in S112, the flow returns to S101 and the process described above is repeated.

The CPU 121 of the memory management unit 102 performs the process described above, and GC is performed for the heap 133 of the RAM 103.

Next, the details of a process executed in each process step of the algorithm shown in FIG. 8 are given.

FIG. 9 shows the algorithm of a root insertion phase process in S102 and S108 shown in FIG. 8.

In S121 shown in FIG. 9, data in all roots, that is, pointers pointing to cells stored in both the register file 131 and execution stack 132 are stored in the GC stack 135. After this process, the root insertion phase process terminates and the flow returns to the home process.

Next, the mark phase process in S104 and S110 shown in FIG. 8 is described with reference to FIG. 10 where the algorithm is shown.

First, in S141 it is judged whether the GC stack 135 is empty. If this judgment result is Yes, the mark phase process terminates. If this judgment result is No, the flow proceeds to S142.

In S142, one pointer stored at the head of the GC stack 135 is extracted from the GC stack 135 and it is assigned to variable n.

In S143, it is judged whether (1) the content of the variable n is NIL (no value), (2) a cell which is pointed by n is not used and (3) the color field of the cell is marked black. If at least one of the results of (1) to (3) is satisfied, the flow returns to S141 and then the process described above is repeated.

If all the judgment results in S143 are not satisfied, in S144 the color field of a cell pointed to by variable n is turned black and it is indicated that this cell is being used. Then, a pointer stored in pointer field cdr of this cell is stored in the GC stack 135 so that a marking process is made ready to be performed later for a cell pointed to by the pointer. Furthermore, a pointer stored in the pointer field car of a cell pointed to by variable n is assigned to variable n. Then, the flow returns to S143 and the process described above is repeated.

So far a mark phase process has been described.

Next, the sweep leave mark process in S106 shown in FIG. 8 is described with reference to FIG. 11 where the algorithm is shown. This process is executed as the sweep phase of the full GC cycle of PMGC.

First, in S161, a pointer pointing to a cell at the head of the heap 133 of all cells is set in variable i.

In S162, it is judged whether the color field of a cell pointed to by variable i is white, that is, it is judged whether the cell can be collected. If the judgment result is Yes, the flow proceeds to S163. If the judgment result is No, the flow proceeds to S164.

In S163, a free list addition process is executed. FIG. 12 shows the details of the free list addition process. In this process, since in S171 a cell pointed to by variable i is managed as a free cell, the color field of the cell is turned off-white and pointer "f" is stored in the pointer field car of the cell. Furthermore, a free list 134 is updated and this cell is connected to a list of free cells.

After the completion of the process in S163, the flow proceeds to S166.

In S164, it is judged whether the cell pointed to by variable i does not correspond to a free cell and simultaneously it is judged whether the color field of the cell is off-white. In S165, only the color fields of cells, the judgment results of which are Yes, are turned white. Taking into consideration the combination of this judgment process in S164 and the judgment process in S162 described earlier, in this case, cells, the color fields of which are marked black, remain black. Since the cells, the marks of which remain black, are excluded from the targets of the mark phase process, the number of the cells to be marked decreases, when the mark process shown in FIG. 10 is executed in S110 shown in FIG. 8.

In S166, it is judged whether there is a cell succeeding the cell pointed to by variable i in the heap 133. If the judgment result is Yes, the flow proceeds to S167, a pointer pointing to the succeeding cell is assigned to variable i, the flow returns to S162 and the process described above is repeated. If the judgment result in S166 is No, the sweep leave mark process terminates.

Next, the sweep clear mark process in S112 shown in FIG. 8 is described with reference to FIG. 13 where the algorithm is shown. This process is executed as the sweep phase of the partial GC cycle of PMGC.

Figure 11:
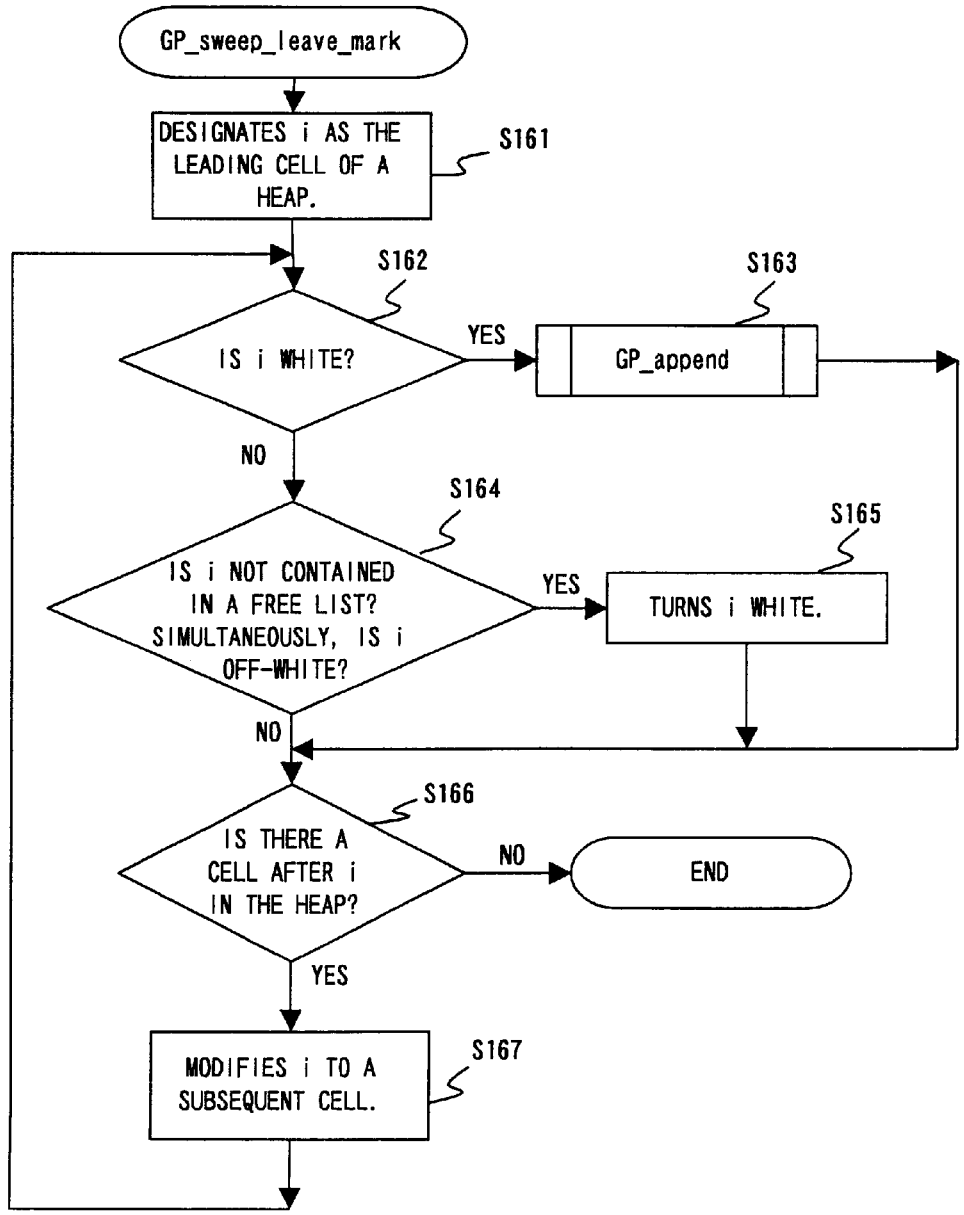
FIG. 11 shows the algorithm of a sweep leave mark process.
Figure 13:
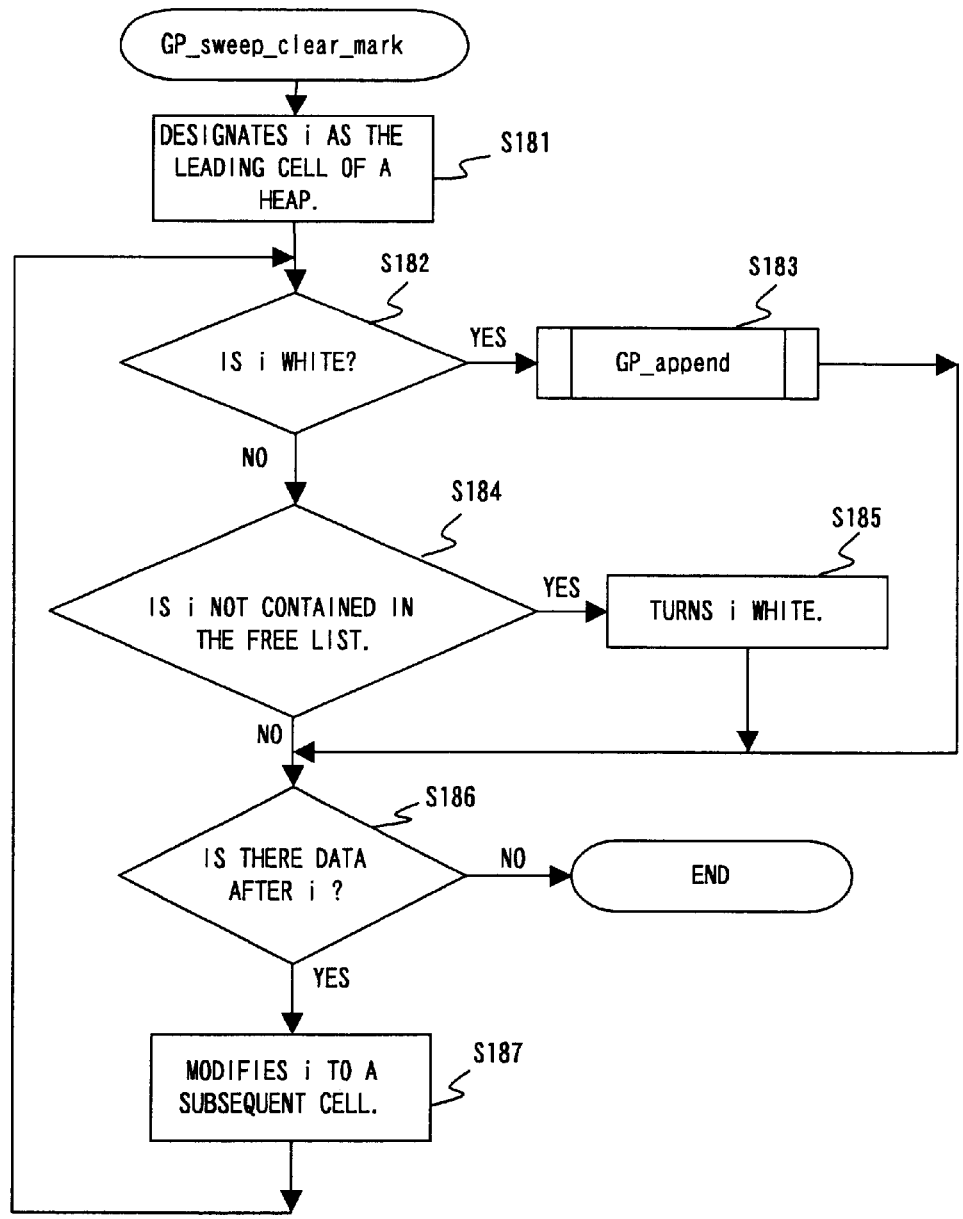
FIG. 13 shows the algorithm of a sweep clear mark process.

As is well known, when the flowcharts shown in FIG. 13 and FIG. 11 are compared, the process ranging from S181 to S187 of the sweep clear mark process differs in only a process in S184 from the process ranging from S161 to S167. Therefore, as to the sweep clear mark process, only a process in S184 is described.

In S184, if a cell pointed to by variable i is not contained in the free list 134, in S185, the color field of the cell is turned white. As is well known when this process in S184 and the process in S164 (FIG. 11) of the sweep leave mark process described earlier are compared, in S184 both the color of a cell with an off-white color field and the color of a cell with a black color field are turned white. Therefore, if the mark phase process shown in FIG. 8 is sequentially executed in S104 shown in FIG. 8, as to all cells, including cells marked black prior to the process in S185, it is judged whether cell marking is required.

In PMGC, in addition to the process executed by the CPU 121 of the memory management unit 102 that is described above, both the pointer replacement process and cell new use process by the CPU 111 of the program execution unit 101 that are described below are executed.

FIG. 14 shows the algorithm of the pointer replacement process. The pointer replacement process is executed when the program execution unit 101 executes an application program and the pointer of a heap 133 pointed to by pointer m is replaced with a pointer n.

First, in S201, it is judged whether "MARKING" is set in flag PHASE, in other words, whether the current process phase of GC is a mark phase. Only when the judgment result is Yes, in S202 a pointer that is currently stored in the heap 133 pointed to by pointer m is stored in a GC stack 135. This process is also a process required in the snapshot GC described earlier.

In S203, it is judged again whether "MARKING" is set in flag PHASE. If the judgment result is Yes, the flows proceeds to S204, and if it is No, it proceeds to S206.

In S204, it is judged whether the color field of a cell pointed to by pointer n is off-white, in other words, whether a cell pointed to by pointer n has not been experienced GC. If the judgment result is Yes, in S205 pointer n is stored in the GC stack 135 so that the cell pointed to by pointer n is made ready to be marked in the future without fail by the memory management unit 102. After this process is completed, the flow proceeds to S209. If in S204 the judgment result is No, the flow proceeds to S209 without any process.

In S206, it is judged whether flag PHASE is set to "SWEEP", in other words, whether the current phase of GC is a sweep phase. If the judgment result is Yes, the flow proceeds to S207 and if it is No, it proceeds to S209.

In S207, it is judged whether the color field of a cell pointed to by pointer n is black, in other words, whether it is already checked in a previous mark phase that the cell pointed to by pointer n cannot be regarded as "garbage". If the judgment result is Yes, the flow proceeds to S209 without any process. If in S207 the judgment result is No, in S208 pointer n is stored in the GC stack 135 so that the cell pointed to by pointer n is made ready to be marked in the future without fail by the memory management unit 102.

In S209, the pointer of the heap 133 pointed to by pointer m is replaced with pointer n and the pointer replacement process terminates.

Figure 15:
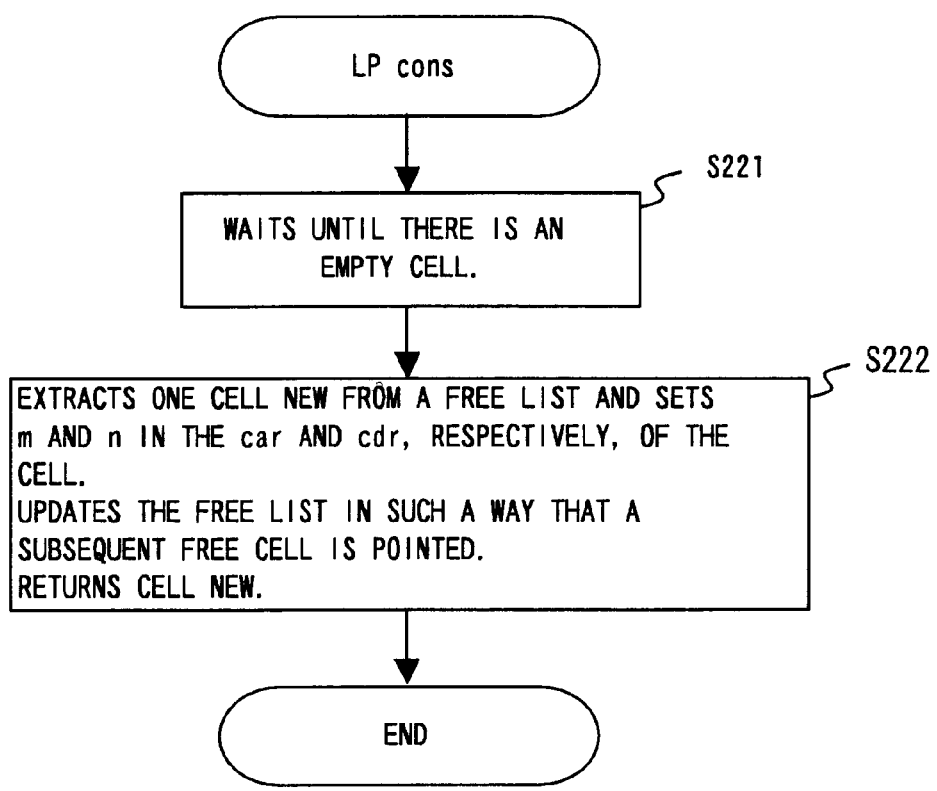
FIG. 15 shows the algorithm of a cell new use process.

FIG. 15 shows the algorithm of a cell new use process. The cell new use process is executed when the program execution unit 101 executes an application program and a cell storing both pointer m pointing to the cell of the heap 133 and pointer n is newly used.

First, in S221, a free list 134 is referenced and the flow waits until a free cell is obtained.

In S222, one cell is extracted from a list of free cells, a name of "NEW" is attached to the cell, pointers m and n are assigned to the pointer fields car and cdr, respectively, of cell NEW, and the pointer pointing to cell NEW is returned to the application program. Furthermore, the free list 134 is updated and cell NEW is removed from the list of free cells. Since the color field of cell NEW that has not been used is off-white, in the subsequent mark phase, the marking of cell NEW will be performed in the later mark phase without fail.

If the CPU 111 of the program execution unit 101 executes the processes shown in FIGS. 14 and 15, the change of the state of use of the heap 133 due to the execution of an application program is reported to the memory management unit 102. In this way, the main device with the configuration shown in FIG. 6, can perform correct and accurate PMGC in which a cell being used cannot be wrongly judged to be "garbage".

So far a basic PMGC has been described.

Now, the improvement of PMGC, which is the subject matter of the present invention, is described below.

As is known when FIG. 8 is referenced, in the basic PMGC described earlier, a full GC cycle and a partial GC cycle are alternatively executed once each. Although the reference described above, "Parallel GC using Partial Marking and its Performance Analysis " only discloses that one sequence is composed of one full GC cycle and several partial GC cycles, and a GC process is executed by repeating this sequence, the appropriate repetition frequency of partial GC cycles in one sequence is not referred to.

However, according to this preferred embodiment, which cycle should be executed, either a full GC cycle or a partial GC cycle, is controlled and selected for a subsequent GC cycle, based on the state of collection of cells made in the past. Since under this control, an appropriate GC cycle is selected in relation to the current GC state, the process efficiency of the entire PMGC can be further improved. In this preferred embodiment, this control is assumed to be called "full/partial control".

Here, several preferred embodiments of PMGC are shown, in which process efficiency is improved by adopting the full/partial control, that are different in information used to control and select a subsequent GC cycle. The main device shown in FIG. 6 implements each of these preferred embodiments of PMGC.

First, the first preferred embodiment of PMGC with improved process efficiency is described. In the first preferred embodiment, the collection amount of free cells collected from a heap 133 by previous GC is calculated, and the current GC cycle is selected based on this collection amount. If the collection amount is less than a prescribed amount, it is judged that only a small collection amount of free cells can be expected by executing a partial GC cycle and that a subsequent GC cycle must be executed again, and a full GC cycle is executed this time. If the collection amount is equal to or more than a prescribed amount, it is judged that a certain collection amount of free cells can be expected by executing a partial GC cycle, and a partial GC cycle is executed this time.

In this first preferred embodiment, when the CPU 111 of the memory management unit 102 executes a partial GC cycle or a full GC cycle, as described later, each of the algorithms of the root insertion process shown in FIG. 9, the mark phase process shown in FIG. 10 and the sweep leave mark process shown in FIG. 11 is executed depending on the process content. However, if the sweep leave mark process is executed, the algorithm shown in FIG. 12 of a free list addition process executed in S163 is modified and executed. FIG. 16 shows the algorithm of the modified free list addition process.

The process in S301 shown in FIG. 16 is the same as the process in S171 shown in FIG. 12.

In S302, the value of variable NO_FREE is incremented by one. Variable NO_FREE is used as a counter for calculating the number of the lists of free cells collected in one GC cycle. In other words, in a process in S302, the value of variable NO_FREE is incremented by one in order to correspond to the fact that a cell free in a previous step has been added to the list of free cells. After this process is completed, a free list addition process terminates.

Figure 17:
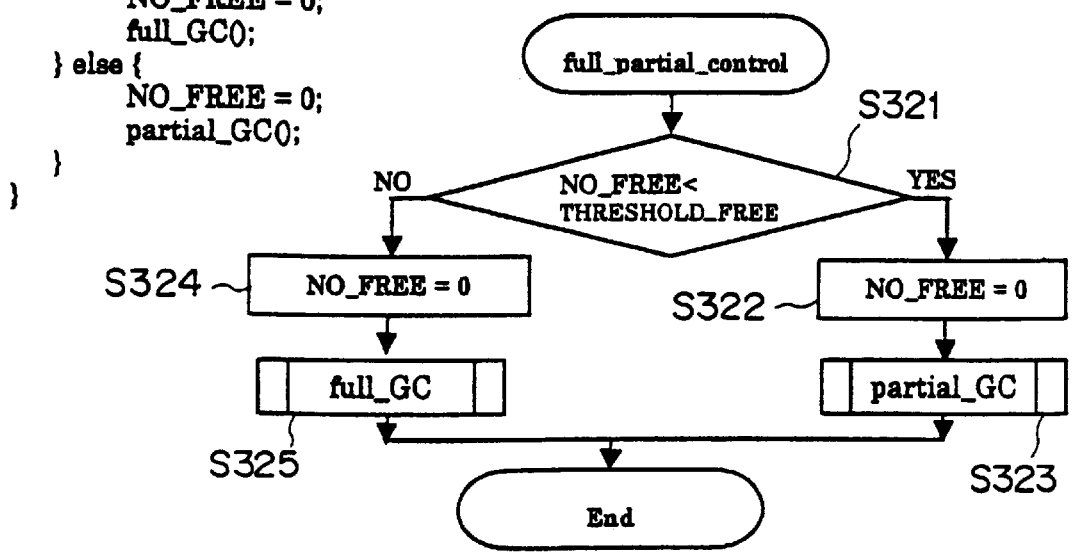
FIG. 17 shows the algorithm of a full/partial control process in the first preferred embodiment of PMGC, the process efficiency of which is improved.

Next, FIG. 17 is described. FIG. 17 shows the algorithm of a full/partial control process in this first preferred embodiment.

First, in S321 it is judged whether the value of variable NO_FREE is smaller than the value of constant THRESHOLD_FREE. The value of constant THRESHOLD_FREE is determined taking into consideration the size of a heap 133, the amount of heap 133 consumed by an application program, the process speed of the main device shown in FIG. 6, etc. If this judgment result is Yes, the flow proceeds to S322; and if it is No, it proceeds to S324.

In S322, 0 is assigned to variable NO_FREE and in S323 a partial GC cycle process is executed. After this process is completed, the full/partial control process terminates.

Figure 18:
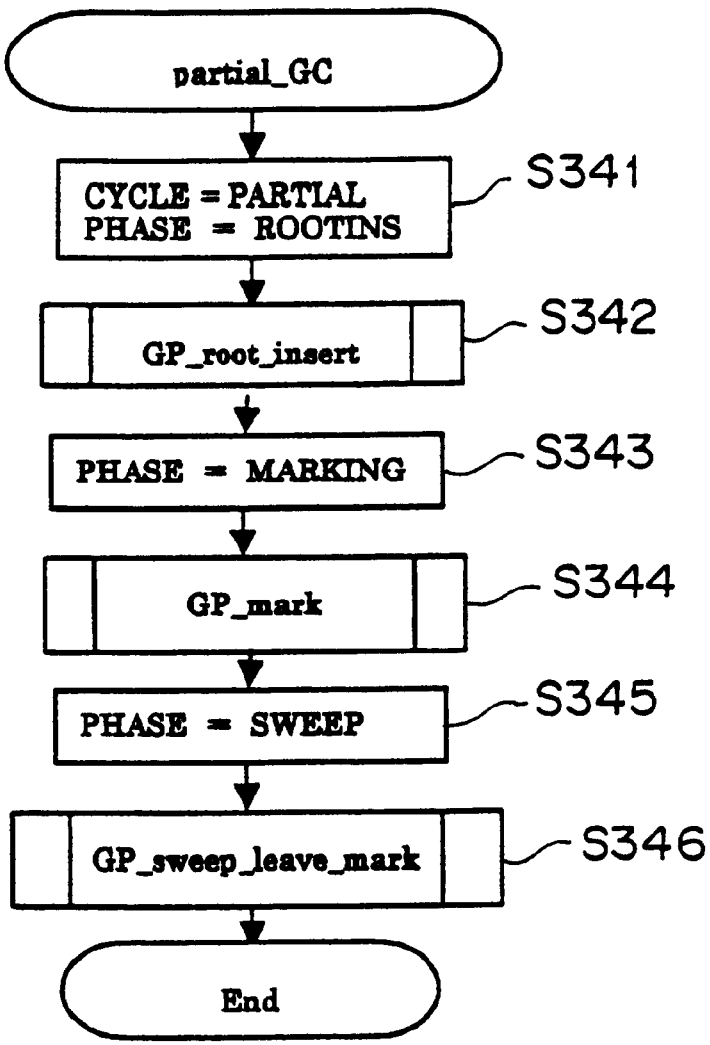
FIG. 18 shows the algorithm of a partial GC cycle process.

FIG. 18 shows the algorithm of a partial GC cycle process. A process ranging from S341 to S345 shown in FIG. 18 is the same as the process ranging from S107 to S111 shown in FIG. 8. In S346 shown in FIG. 18, the sweep leave mark process, the algorithm of which is shown in FIG. 11, is executed unlike S112 shown in FIG. 8. Then, a partial GC cycle process terminates and the flow returns to the home process.

Returning to the description on FIG. 17, in S324, 0 is assigned to variable NO_FREE and in S325 a full GC cycle process is executed. After this process is completed, the full/partial control process terminates.

Figure 19:
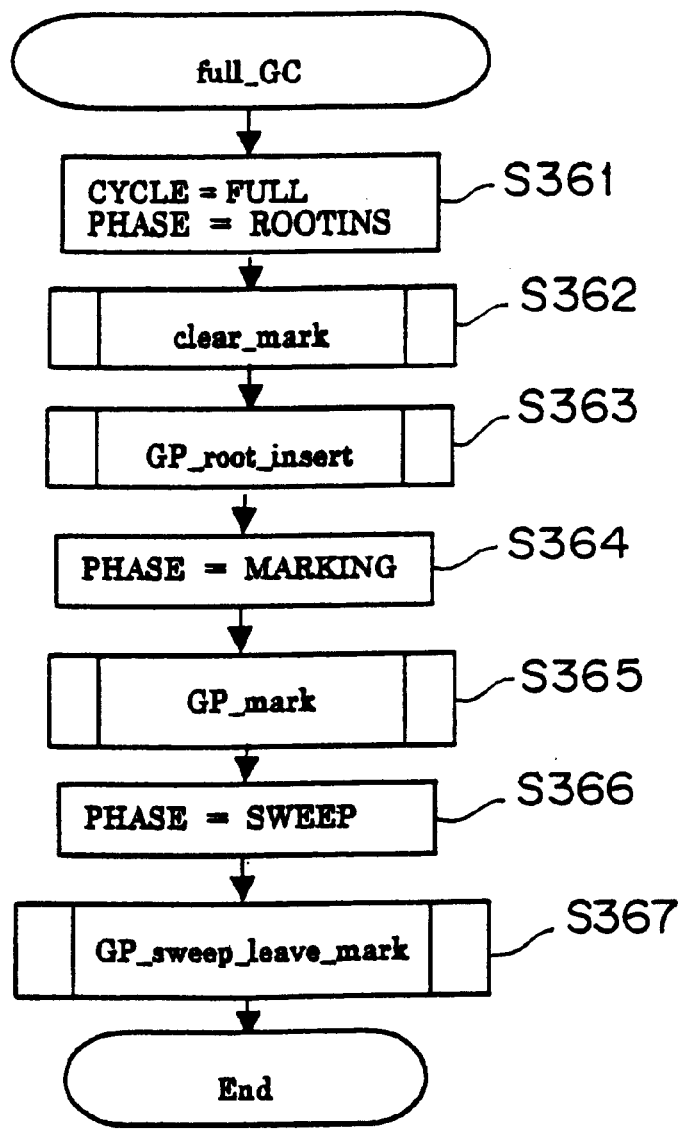
FIG. 19 shows the algorithm of a full GC cycle process.

FIG. 19 shows the algorithm of a full GC cycle process. A process ranging from S361 to S367 is the same as that process ranging from S101 to S106 except for the fact that S362 for executing a clear mark process is inserted between S361 and S363.

Figure 20:
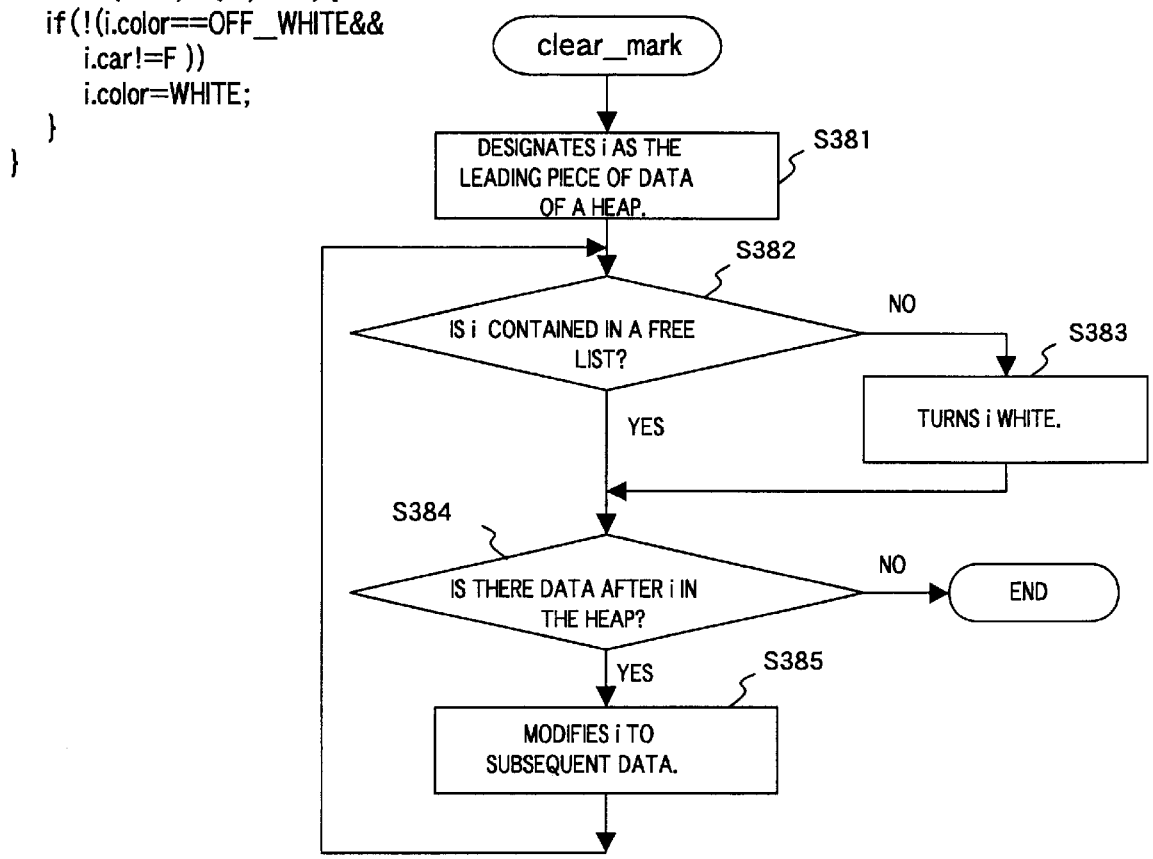
FIG. 20 shows the algorithm of a clear mark process.

FIG. 20 shows the algorithm of a clear mark process. The clear mark process turns the color field of all cells in the heap 133 white.

First, in S381, a pointer pointing to a cell at the head of the heap 133 is set to variable i.

In S382, it is judged whether the cell pointing variable i is in the free list. Only when the judgment result is No, is the color field of the cell in S383 turned white.

In S384 it is judged whether a cell succeeding the cell pointed to by variable i is in the heap 133. If the judgment result is Yes, the flow proceeds to S385 and a pointer pointing to the succeeding cell is assigned to variable i. Then, the flow returns to S382 and the process described above is repeated. If in S384 the judgment result is No, the clear mark process terminates and the flow returns to the home process.

When the CPU 112 of the memory management unit 102 executes the process shown in FIG. 17, one sequence of the full/partial control process is completed. In this first preferred embodiment, this full/partial control process sequence is repeated by the CPU 112, and an appropriate GC cycle is selected and executed for each sequence.

In this first preferred embodiment, the CPU 111 of the program execution unit 101 executes both the pointer replacement process shown in FIG. 14 and the cell new use process shown in FIG. 15 as in the case where the basic PMGC described earlier is executed.

Next, the second preferred embodiment of PMGC with improved process efficiency is described.

As described above, a partial GC cycle collects only cells the use of which is started in the immediately previous GC cycle. Therefore, in the second preferred embodiment, if the number of cells collected in a partial GC cycle is smaller than the number of cells, the use of which is started in the immediately previous GC cycle and if the number is less than a prescribed number, it is judged that the heap utility of an application program executed by the program execution unit 101 is not suited for the collection of cells by a partial GC cycle and that there is a tendency to make cells survive for a long time, and a full GC cycle is selected for a subsequent GC cycle. Otherwise, a partial GC cycle is selected.

Figure 21:
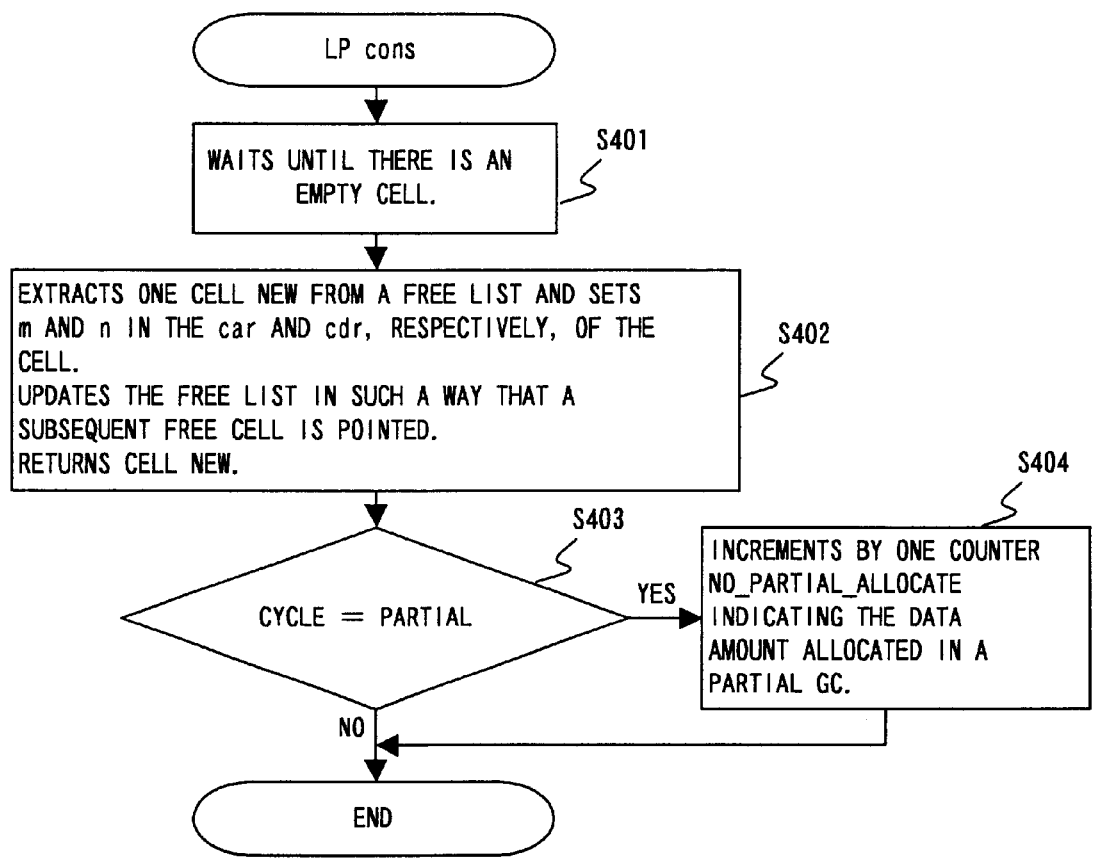
FIG. 21 shows the algorithm of a cell new use process in the second preferred embodiment of PMGC, the process efficiency of which is improved.

In this second preferred embodiment, although the pointer replacement process shown in FIG. 14 is executed as in the case where the basic PMGC described earlier is executed, a process according to the algorithm shown in FIG. 21 is executed instead of the cell new use process according to the algorithm shown in FIG. 15.

A process in S401 and S402 is the same as the process in S221 and S222, respectively, shown in FIG. 15.

In S403 it is judged whether "PARTIAL" is set in i flag CYCLE, in other words, it is judged whether the CG cycle currently executed by the memory management unit 102 is a partial GC cycle. Only when the judgment result is Yes, is the value of variable NO_PARTIAL_ALLOCATE incremented by one in S404. Variable NO_PARTIAL_ALLOCATE is used as a counter for counting the number of cells in the heap 133 the new use of which is started by the program execution unit 101.

After the process is completed, this cell new use process terminates. If in S403 the judgment result is No, this cell new use process also terminates.

Figure 22:
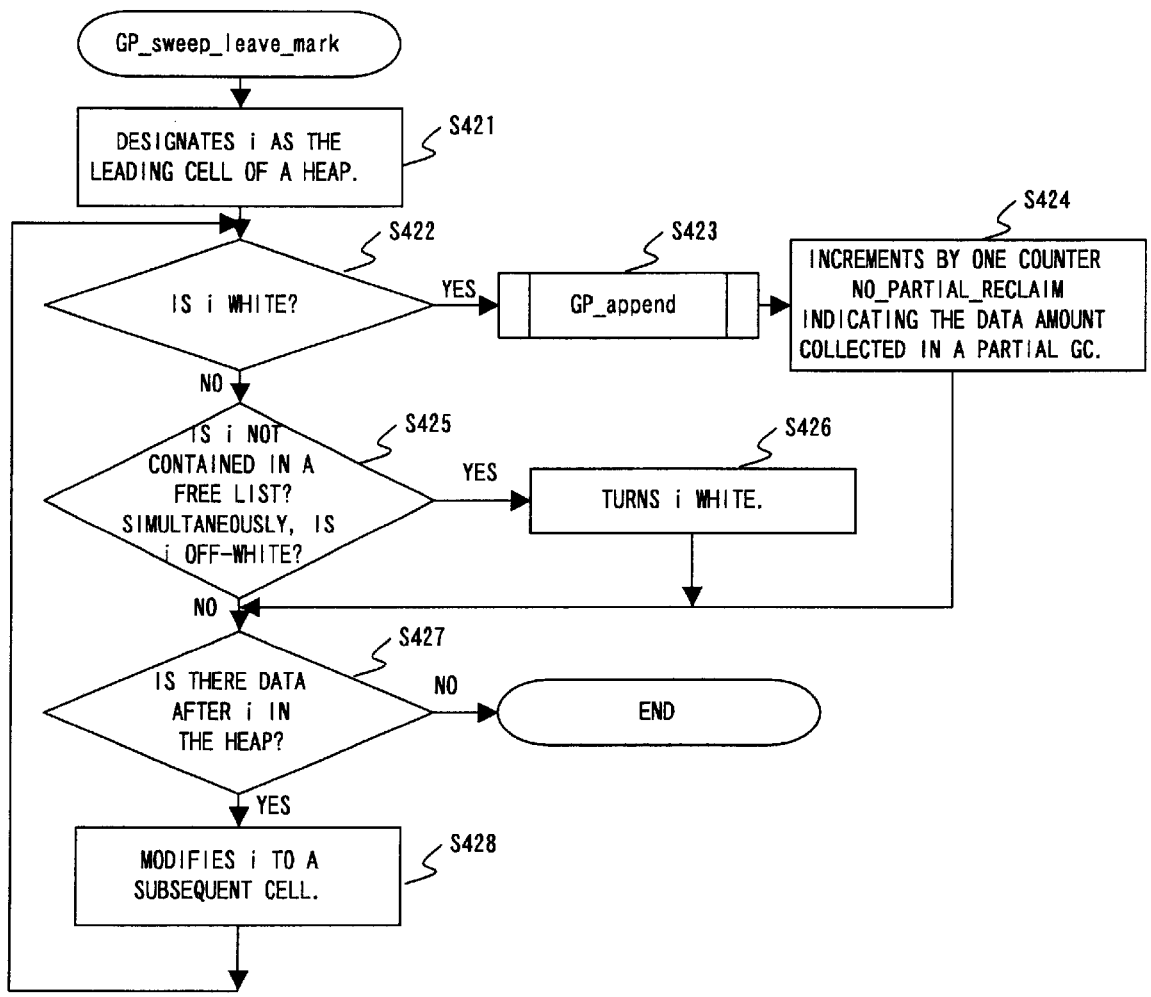
FIG. 22 shows the algorithm of a sweep leave mark process in the second preferred embodiment of PMGC, the process efficiency of which is improved.

In this second preferred embodiment, when the CPU 121 of the memory management unit 102 executes a process according to the algorithm of a full/partial control process in this second preferred embodiment described later, both the partial GC cycle process shown in FIG. 18 and the full GC cycle process shown in FIG. 19 are executed according to the algorithm. However, in this case, the algorithms of the sweep leave mark process shown in FIG. 11 executed both in S346 for the partial GC cycle process shown in FIG. 18 and in S367 for the full GC cycle process shown in FIG. 19 are modified and executed. FIG. 22 shows the algorithm of the modified sweep leave mark process.

A process ranging from S421 to S428 shown in FIG. 22 is the same as the process ranging from S161 to S167 shown in FIG. 11 except for the fact that S242 is inserted between S423 and S427.

In FIG. 22, in S424 the value of variable NO_PARTIAL_RECLAIM is incremented by one and then the flow proceeds to S427. Although the number of free cells in the heap 133 collected in one partial GC cycle is usually set in variable NO_PARTIAL_RECLAIM, in this case, variable NO_PARTIAL_RECLAIM is used as a counter for counting the number of free cells collected by the this execution of the sweep leave mark process.

Figure 23:
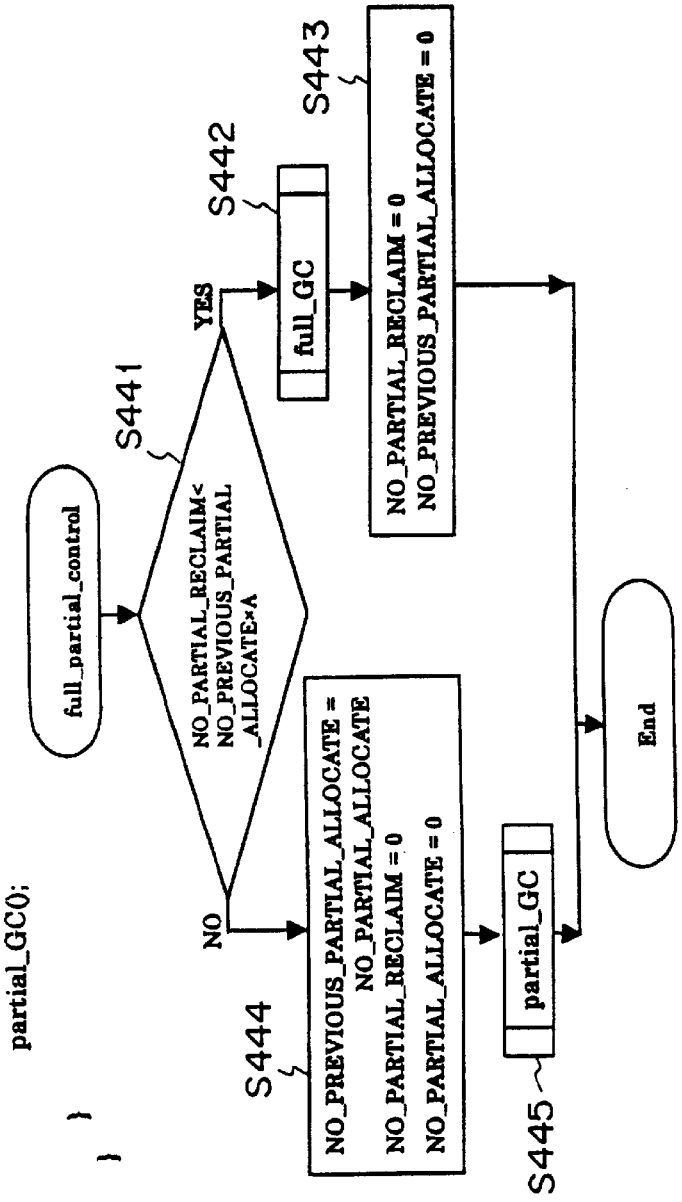
FIG. 23 shows the algorithm of a full/partial control process in the second preferred embodiment of PMGC, the process efficiency of which is improved.

Next, FIG. 23 is described. FIG. 23 shows the algorithm of a full/partial control process in this second preferred embodiment.

In FIG. 23, in S441 it is judged whether the value of variable NO_PARTIAL_RECLAIM is smaller than the product of the value of variable NO_PREVIOUS_PARTIAL_RECLAIM and constant A. If the judgment result is Yes, the flow proceeds to S442, and if it is No, it proceeds to S444. If the previous GC cycle is a partial GC cycle in S444 described later, the number of cells in the heap 133, the new use of which is started by the program execution unit 101 during the execution of the partial GC cycle is set in variable NO_PREVIOUS_PARTIAL_ALLOCATE. Constant A is a standard for determining a subsequent GC cycle based on the ratio between a newly-used number of cells in a heap 133 and the collection amount of free cells obtained by a partial GC cycle, and it is determined taking into consideration the size of the heap, the process speed of the main device shown in FIG. 6, etc.

In S442, the full GC cycle process shown in FIG. 19 is executed.

In S443, since a full GC cycle is executed immediately before, 0 is assigned to both variable NO_PARTIAL_RECLAIM and variable NO_PREVIOUS_PARTIAL_ALLOCATE. Then, this full/partial control process terminates.

In S444, the current value of variable NO_PARTIAL_ALLOCATE is assigned to variable NO_PREVIOUS_PARTIAL_ALLOCATE. Then, 0 is assigned to both variable NO_PARTIAL_RECLAIM and variable NO_PREVIOUS_PARTIAL_ALLOCATE.

In S445, the partial GC cycle process shown in FIG. 18 is executed. Then, this full/partial control process terminates.

If the CPU 112 of the memory management unit 102 executes the process shown in FIG. 23, one full/partial control process sequence terminates. In this second preferred embodiment, the CPU repeatedly executes this full/partial control process, and an appropriate GC cycle is selected and executed for each sequence.

Next, the third preferred embodiment of PMGC with improved process efficiency is described. Here, the pointer replacement process shown in FIG. 14 that the CPU 111 of the program execution unit 101 executes in the basic PMGC is studied.

Both S205 and S208 shown in FIG. 14 are executed to store pointer n in a GC stack 135 in order to ensure the marking of a cell pointed to by a replaced pointer n if a pointer contained in the cell of a heap 133 is replaced when an application program is executed by the program execution unit 101. However, some application programs cause a lot of this pointer replacement. In this case, many of the memory areas of a RAM 103 are used for GC stacks 135 and fewer memory resources remain. In such a case, the process amount will be fairly large even if a partial GC cycle is executed. Therefore, in such a case, it is judged that a partial GC cycle has few advantages and a full GC cycle is subsequently executed. Specifically, a subsequent GC cycle is selected by an application program depending on a pointer replacement amount, which is intended by the full/partial control process in this third preferred embodiment.

Figure 24:
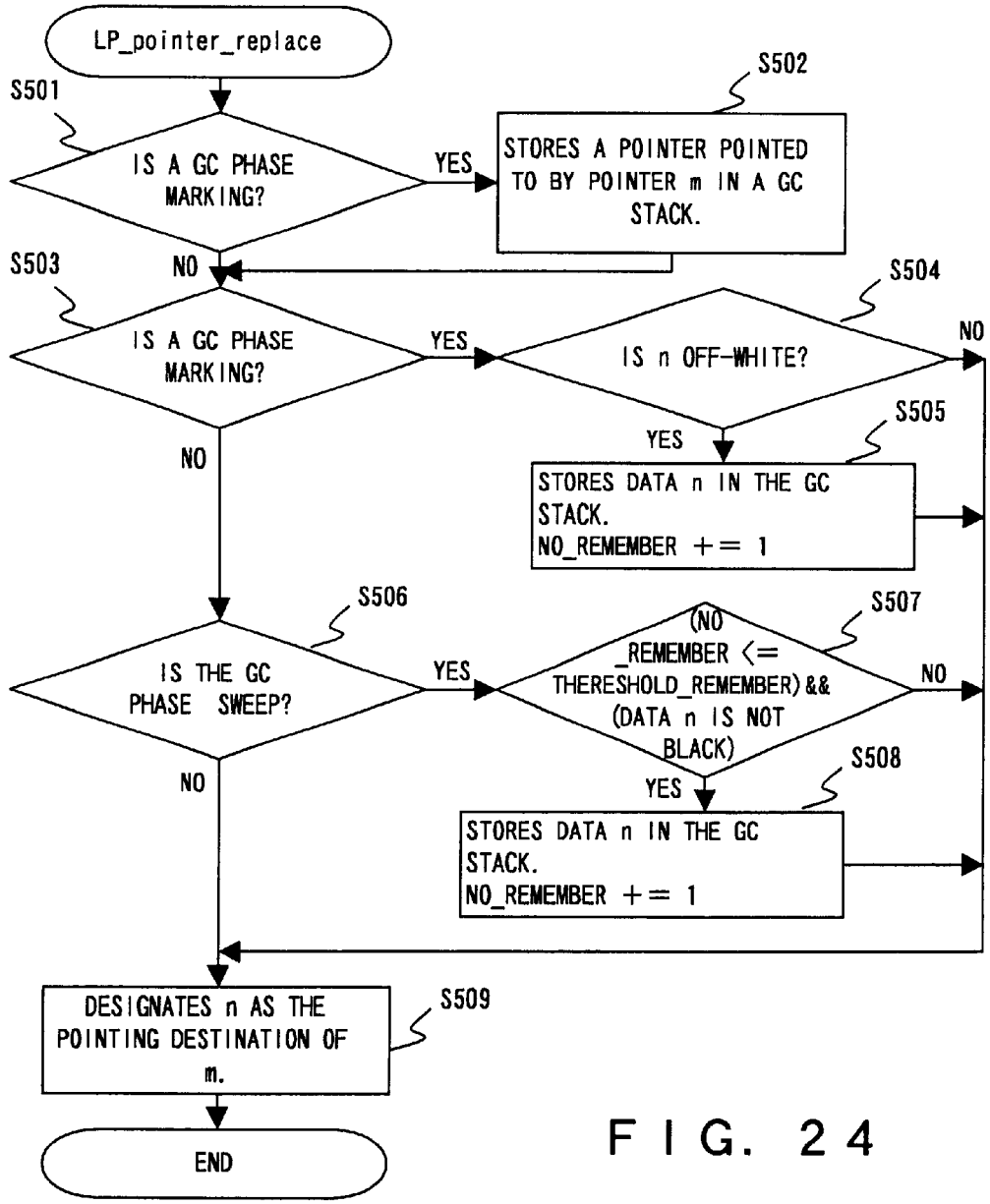
FIG. 24 shows the algorithm of a pointer replacement process in the third preferred embodiment of PMGC, the process efficiency of which is improved.

In this third preferred embodiment, although the CPU 111 of the program execution unit 101 executes the cell new use process shown in FIG. 15 as in the case where the basic PMGC described earlier is executed, the pointer replacement process is executed by the algorithm shown in FIG. 24 instead of the algorithm shown in FIG. 14.

In FIG. 24, in S501 it is judged whether "MARKING" is set in flag PHASE, in other words, it is judged whether the current GC process phase is a mark phase. Only when the judgment result is Yes, is, in S502, a pointer that is currently stored in the heap 133 pointed to by pointer m stored in a GC stack 135.

In S503 it is judged again whether "MARKING" is set in flag PHASE. If the judgment result is Yes, the flow proceeds to S504, and if it is No, it proceeds to S506.

In S504 it is judged whether the color field of a cell pointed to by pointer n is off-white, in other words, it is judged whether the cell pointed to by pointer n has not been experienced GC. If the judgment result is Yes, in S505 pointer n is stored in the GC stack 135, and further the value of variable NO_REMEMBER is incremented by one. After this process is completed, the flow proceeds to S509. If in S504 the judgment result is No, the flow proceeds to S509 without any process being performed. In this case, variable NO_REMEMBER is used as a counter for counting the number of pointers that are replaced when an application program is executed by the program execution unit 101 and that are stored in the GC stack 135.

In S506 it is judged whether "SWEEP" is set in flag PHASE, in other words, it is judged whether the current GC process phase is a sweep phase. If the judgment result is Yes, the flow proceeds to S507, and if it is No, it proceeds to S509.

In S507 it is simultaneously judged whether the value of variable NO_REMEMBER is equal to or less than constant THRESHOLD_REMEMBER and whether the color field of a cell pointed to by pointer n is a color other than black. Constant THRESHOLD_REMEMBER indicates the allowance number of pointers n that a GC stack 135 can store, and it is set taking into consideration the capacity of a memory 103, the allowance number of a GC stack 135, etc. In this step it is judged which is larger, the value of variable NO_REMEMBER or the value of constant THRESHOLD_REMEDMBER, and the execution of S507 is controlled based on the judgment result. This is because if it is known that a full GC cycle is subsequently executed, a process for storing pointer n in a GC stack 135 can be omitted (in the succeeding full GC cycle, all cells are newly marked again), by which memory resources can be saved and the GC process amount of the program execution unit 101 can be reduced accordingly.

If in S507 the judgment result is No, the flow proceeds to S509 without any process being performed, and if it is Yes, in S508 pointer n is stored in a GC stack 135 and, further, the value of variable NO_REMEMBER is incremented by one.

In S509, a pointer in the heap 133 pointed to by pointer m is replaced with pointer n, and the pointer replacement process terminates.

Figure 25:
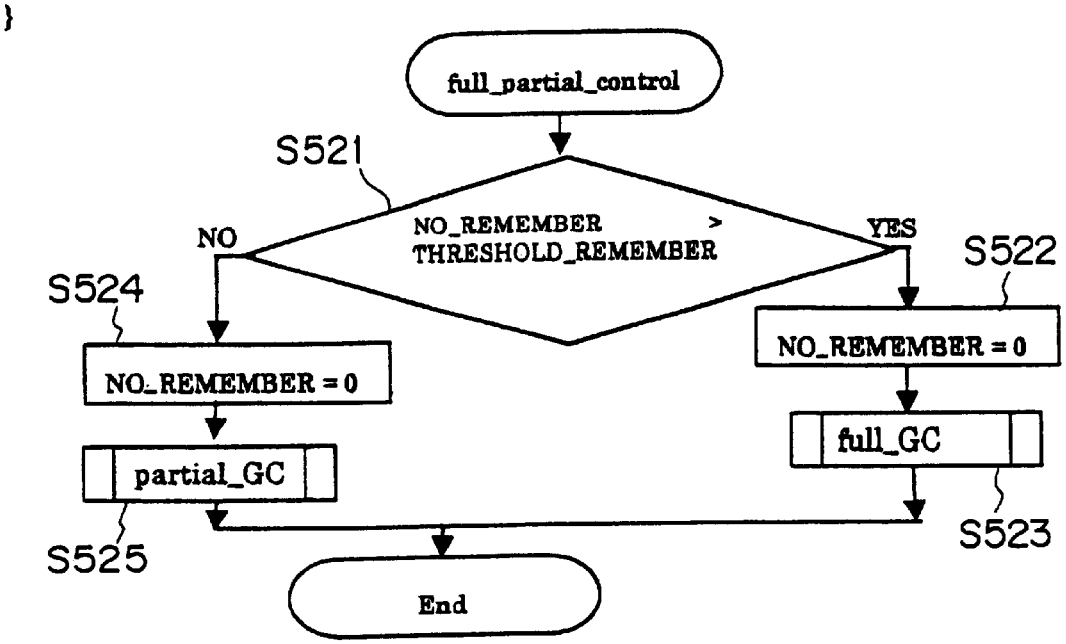
FIG. 25 shows the algorithm of a full/partial control process in the third preferred embodiment of PMGC, the process efficiency of which is improved.

Next, FIG. 25 is described. FIG. 25 shows the algorithm of a full/partial control process in this third preferred embodiment.

In FIG. 25, in S521 it is judged whether the value of variable NO_REMEMBER is greater than the value of constant THRESHOLD_REMEMBER. If the judgment result is Yes, the flow proceeds to S522, and if it is No, it proceeds to S524.

In S522, 0 is assigned to variable NO_REMEMBER.

In S523, the full GC cycle shown in FIG. 19 is executed. Then, this full/partial control process terminates.

In S524, 0 is assigned to variable NO_REMEMBER.

In S525, the partial GC cycle shown in FIG. 18 is executed. Then, this full/partial control process terminates.

If the CPU 112 of the memory management unit 102 executes this process shown in FIG. 25, one full/partial control process sequence terminates. In this third preferred embodiment, the CPU 112 repeats this full/partial control process sequence and an appropriate GC cycle is selected and executed for each sequence.

Next, the fourth preferred embodiment of PMGC with improved process efficiency is described. In this fourth preferred embodiment, both the value of variable NO_REMEMBER also calculated in the third preferred embodiment described earlier, and specifically the number of pointers that pointer n replaced by an application program that is executed by the program execution unit 101 and that are stored in the GC stack 135 and the number of cells with black color fields in the heap 133, are calculated. Since a partial GC cycle targets the collection of cells with non-black color fields, the fewer the number of cells with black color fields, the greater the process amount of the cell collection. The greater the number of pointers n stored in the GC stack 135, the more the process amount of the cell collection in a partial GC cycle. In this case, if the ratio between both the numbers is not near a prescribed value, the process amount of the partial GC cycle becomes abnormally large. Therefore, in this case, it should be judged that the execution of a partial GC cycle has little merit and a full GC cycle should be executed, the implementation of which is this fourth preferred embodiment.

In this fourth preferred embodiment, the CPU 111 of the program execution unit 101 executes the algorithm shown in FIG. 15 as to the cell new use process, and executes the algorithm of the third preferred embodiment shown in FIG. 24 as to the pointer replacement process.

Figure 26:
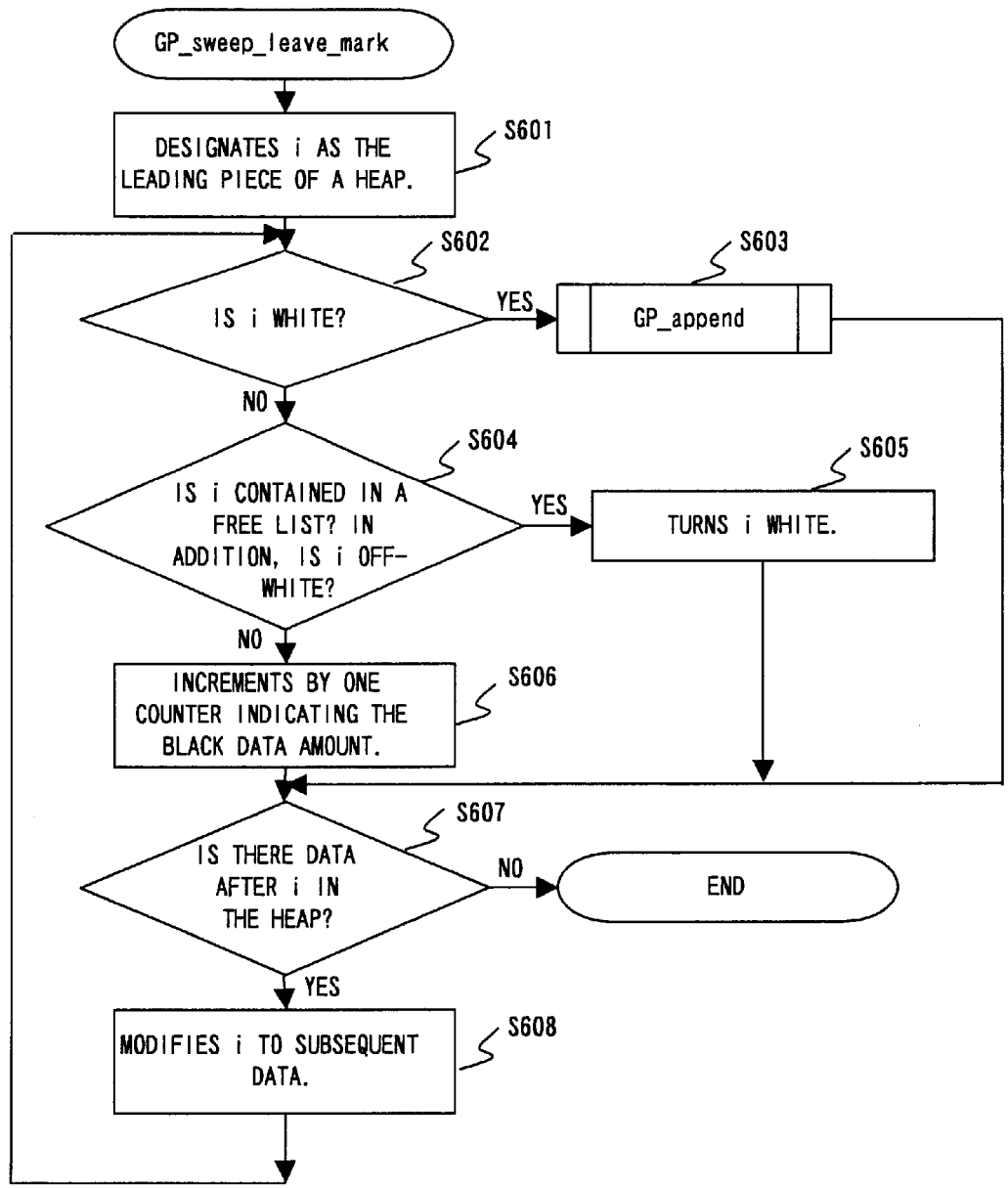
FIG. 26 shows the algorithm of a sweep leave mark process in the fourth preferred embodiment of PMGC, the process efficiency of which is improved.

In this fourth preferred embodiment, if the CPU 121 of the memory management unit 102 executes a process according to the algorithm of a full/partial control process in the fourth preferred embodiment described later, the algorithms of both the partial GC cycle process shown in FIG. 18 and the full GC cycle process shown in FIG. 19 are executed depending on the algorithm. However, in this case, the sweep leave mark process shown in FIG. 11 and executed in S346 for the partial GC cycle process shown in FIG. 18 and in S367 for the full GC cycle process shown in FIG. 19 are modified and executed. FIG. 26 shows the algorithm of the modified sweep leave mark process.

A process ranging from S601 to S608 shown in FIG. 26 is the same as the process ranging from S161 to S167 shown in FIG. 11 except for the fact that S606 is inserted between S604 and S607.

In FIG. 26, if in both S602 and S604 the judgment results are No, in S606 the value of variable NO_BLACK is incremented by one. In this way, variable NO_BLACK functions as a counter for counting the number of cells with black color fields in the heap 133.

After S606 is completed, the flow proceeds to S607.

Figure 27:
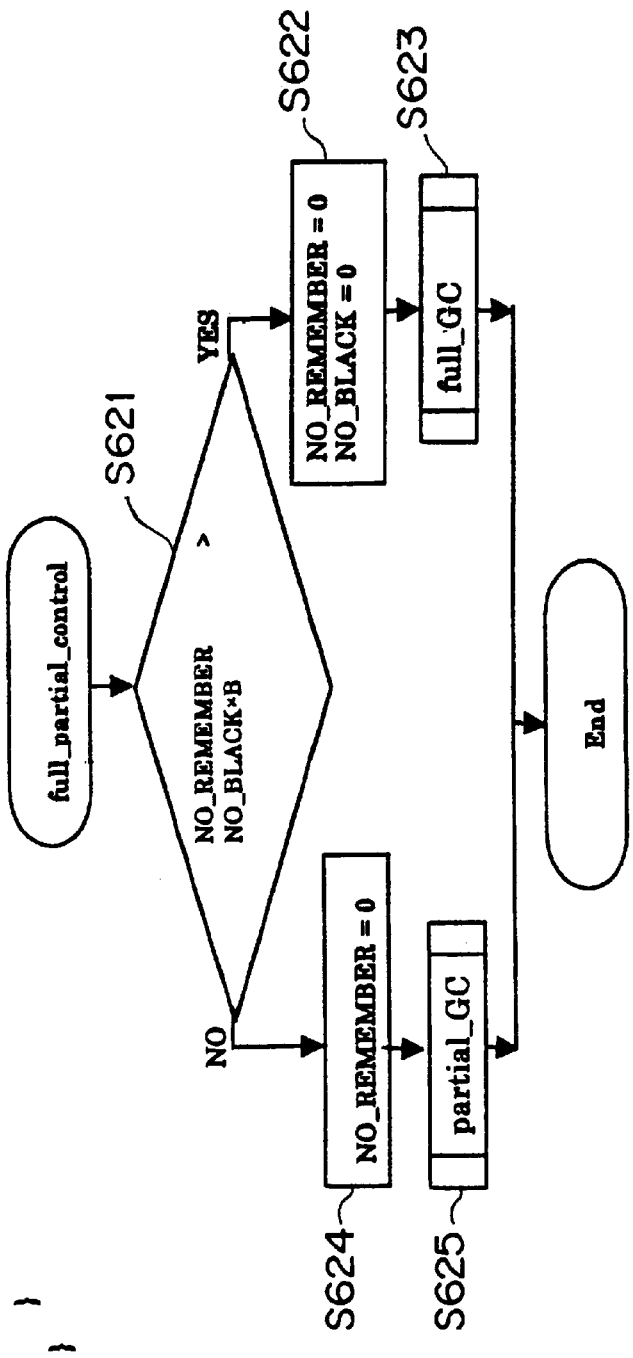
FIG. 27 shows the algorithm of a full/partial control process in the fourth preferred embodiment of a PMGC, the process efficiency of which is improved.

Next, FIG. 27 is described. FIG. 27 shows the algorithm of a full/partial control process in this fourth preferred embodiment.

In FIG. 27, in S621 it is judged whether the value of variable NO_REMENBER is greater than the product of the value of variable NO_BLACK and constant B. If the judgment result is Yes, the flow proceeds to S622, and if it is No, it proceeds to S624. Constant B is used to determine the criteria of GC cycle selection in the fourth preferred embodiment and the constant is determined taking into consideration the size of a heap 133, a GC process speed, etc.

In S622, 0 is assigned to both variable NO_REMEMBER and variable NO_BLACK.

In S623, the full GC cycle shown in FIG. 19 is executed. Then, this full/partial control process terminates.

In S624, 0 is assigned to variable NO_REMEMBER.

In S625, the partial GC cycle process shown in FIG. 18 is executed. Then, this full/partial control process terminates.

If the CPU 112 of the memory management unit 102 executes the process shown in FIG. 27, one sequence of this full/partial control process terminates. In this fourth preferred embodiment, the CPU 112 repeats this full/partial control process sequence, and an appropriate GC cycle is selected and executed for each sequence.

Next, the fifth preferred embodiment of PMGC with improved process efficiency is described.

The state of use of a heap 133 sometimes changes greatly in the midst of a process depending on an application program executed by the program execution unit 101. For example, a case where image data to be processed is replaced with another piece of data in an image data processing program corresponds to such an application program. If the state of use of the heap 133 changes, a lot of cells judged to be "garbage" are often generated and the process amount of cell collection increases accordingly. Therefore, the execution of a partial GC cycle has few advantages. However, the program execution unit 101 can detect such a change in the state of use of a heap 133. In this fifth preferred embodiment, such a change in the state of use of a heap 133 can be detected, and a full GC cycle is selected and executed based on this detection result.

Figure 28:
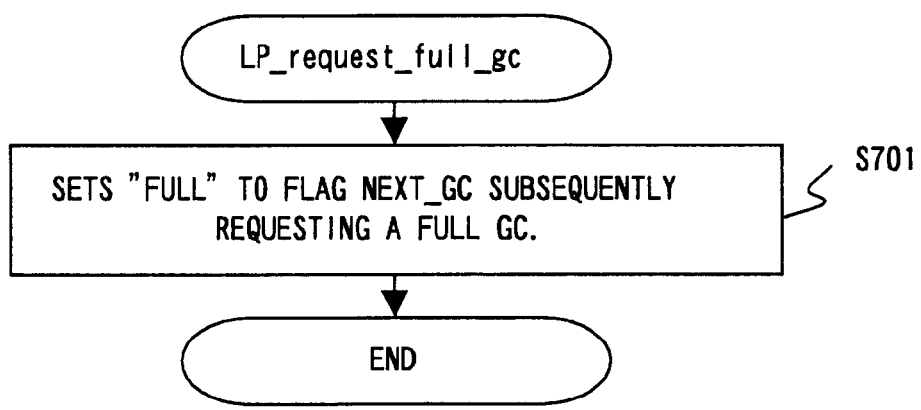
FIG. 28 shows the algorithm of a full GC cycle execution request process.

In the fifth preferred embodiment, the CPU 111 of the program execution unit 101 executes the full GC cycle execution request process according to the algorithm shown in FIG. 28 in addition to both a process according to the algorithm of a pointer replacement process shown in FIG. 14 and a process according to the algorithm of a cell new use process shown in FIG. 15. The full GC cycle execution request process is started when a process such that may change the state of use of a heap 133 is started while the CPU 111 is executing an application program. If the image processing program described earlier is used as an example, the case where the read process of another piece of image data is executed corresponds to it.

As shown in FIG. 28, i n the full GC cycle execution request process, in S701 "FULL" is set in flag NEXT_GC and only the execution of a full GC cycle is requested.

Figure 29:
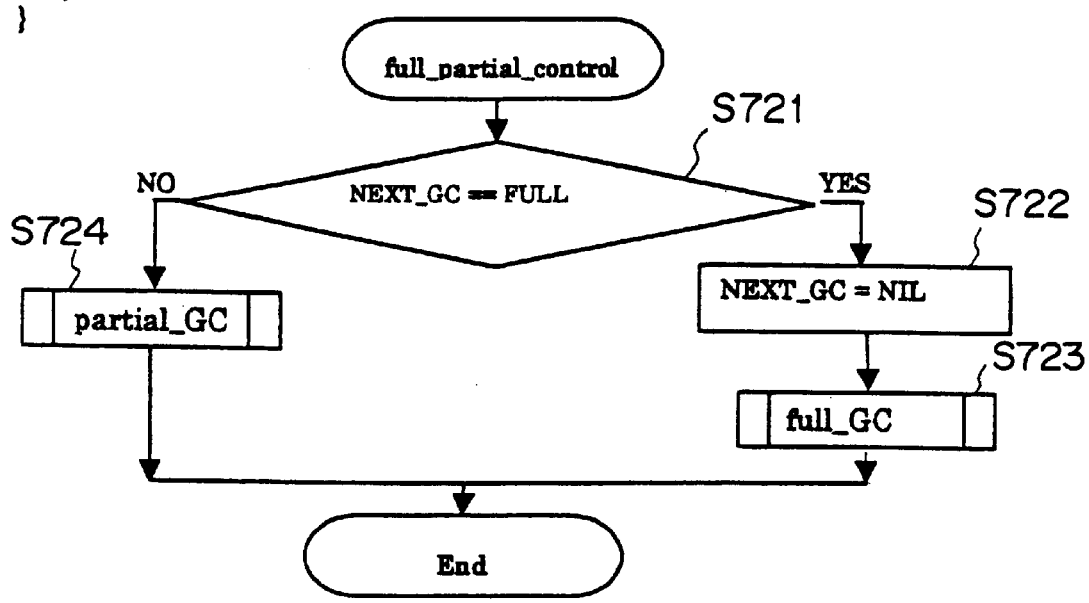
FIG. 29 shows the algorithm of a full/partial control process in the fifth preferred embodiment of a PMGC, the process efficiency of which is improved.

Next, the algorithm of a full/partial control process in the fifth preferred embodiment shown in FIG. 29 is described.

In FIG. 29, in S721 it is judged whether "FULL" is set in flag NEXT_GC. If the judgment result is Yes, the flow proceeds to S722, and if it is No, it proceeds to S724.

In S722, NIL (no value) is assigned to flag NEXT_GC.

In S723, the full GC cycle shown in FIG. 19 is executed. Then, this full/partial control process terminates.

In S724, the partial GC cycle process shown in FIG. 18 is executed. Then, this full/partial control process terminates. If the CPU 112 of the memory management unit 102 executes the process shown in FIG. 29, one sequence of this full/partial control process terminates. In this fifth preferred embodiment, the CPU 112 repeats this full/partial control process sequence, and an appropriate GC cycle is selected and executed for each sequence.

Next, as to the improvement on the basic PMGC, examples other than the full/partial control process described so far are described.

Figure 10:
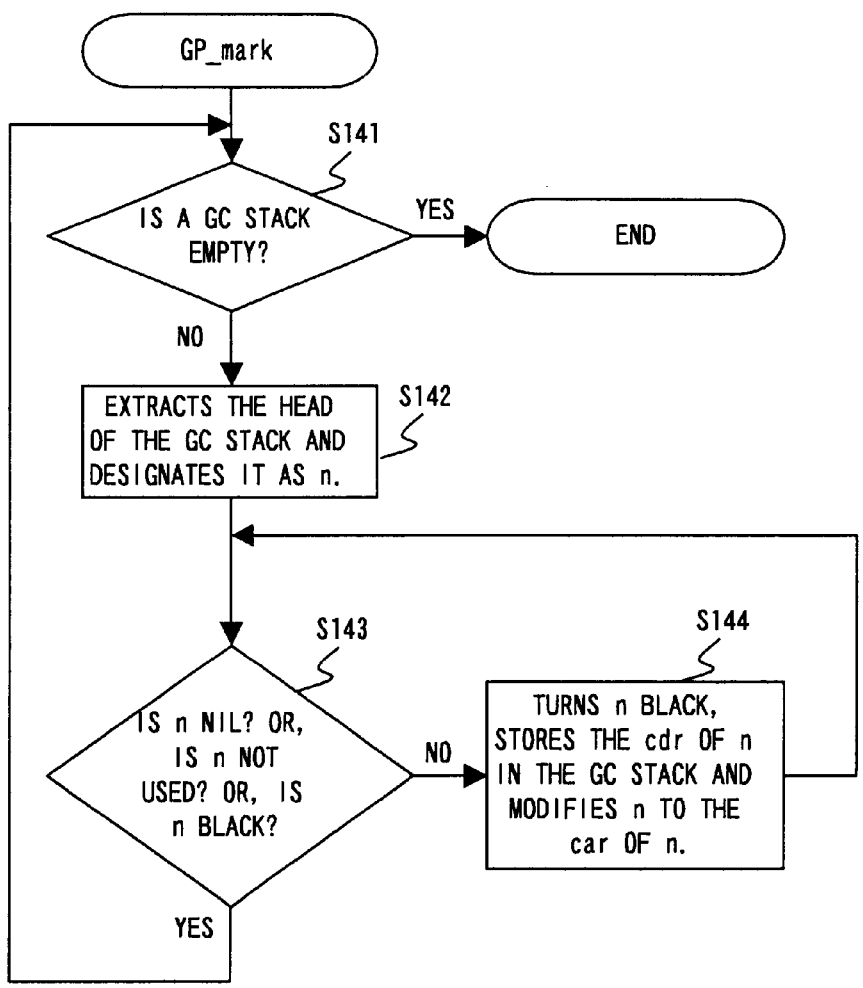
FIG. 10 shows the algorithm of a mark phase process.

A process ranging from S142 to S144 in the mark phase process shown in FIG. 10 is focused on. In this part of the process, the off-white color field of a cell that is pointed to by a pointer stored in a GC stack 135 is turned black. A cell, the color field of which is off-white and to which a pointer is pointing to is stored in a GC stack 135, is started to be newly used by an application program executed by the program execution unit 101, and the pointer pointing to the cell is stored in the GC stack 135 in S205 or S208 of the pointer replacement process shown in FIG. 14.

Of the cells described above, the new use of which is started, a cell that is released from use and judged to be "garbage" without being processed in any mark phase is studied below. It is clear that this cell can be collected as a free cell. However, since the pointer pointing to this cell is already stored in the GC stack 135 and the color field of this cell is turned off-white, S144 is executed for this cell following both S142 and S143 shown in FIG. 10, and the color field of this cell is turned black. A black-marked cell is not collected in a sweep phase until a full GC cycle is executed, as already described. A cell with a short life is also not immediately collected, and this fact leads to the gradation of GC collection efficiency, as also already described.

Therefore, cells with short lives that are not processed in a mark phase must be collected in an immediately subsequent sweep phase. This preferred embodiment is assumed to be called the sixth preferred embodiment of PMGC with improved process efficiency.

In this sixth preferred embodiment, off-white of colors attached to the color field of a cell is further divided into two categories: a color for indicating that a cell has never been processed in a mark phase (OFF_WHITE_UV) and a color for indicating that a cell has already been processed in a mark phase (OFF_WHITE_V) In this way, cells in the heap 133 are divided into four color groups in total.

If the judgment frequency of a color attached to a cell in a process described later is studied, it is clear that both a process for judging whether the color is white or black and a process for judging whether the off-white cell has ever been processed are ranked high. In this case, if two bits are allocated to each of the flags corresponding to a pair of colors to be judged in the color field of a cell, as shown in FIG. 30, a judgment process with high frequency can be judged in units of bits and it can be judged at a high speed accordingly. Therefore, the process speed of the entire GC can be improved.

In this sixth preferred embodiment, the CPU 121 of the memory management unit 102 executes each process according to the algorithm of the basic process of PMGC shown in FIG. 8 (hereinafter this process is called "PMGC control process"). However, both the mark phase process in S104 or S110 and the sweep leave mark process in S106 shown in FIG. 8 are modified from the processes shown in FIG. 10 and FIG. 11 to those shown in FIG. 31 and FIG. 32, respectively, and are executed.

First, the algorithm of a mark phase process in this sixth preferred embodiment shown in FIG. 31 is described.

In S1001 it is judged whether a GC stack 135 is empty. If this judgment result is Yes, a mark phase process terminates. If the judgment result is No, the flow proceeds to S1002.

In S1002, one pointer stored at the head of a GC stack is extracted from the GC stack 135 and is assigned to variable n.

In S1003 it is judged whether the content of a cell pointed to by the pointer assigned to variable n is NIL (no value) and simultaneously whether the cell is not used. If at least one of the judgment results is Yes, the flow returns to S1001 and the process described above is repeated. If neither of the judgment results is No, the flow proceeds to S1004.

In S1004 it is judged whether the color field of a cell pointed to by the pointer assigned to variable n is white. If the judgment result is Yes, in S1005 the color field of the cell pointed to by variable n is turned black and it is indicated that this cell is being used. Then, a pointer stored in the pointer field cdr of this cell is stored in the GC stack 135 and the cell pointed to by the pointer is made ready to be marked later. Furthermore, a pointer stored in the pointer field car of the cell pointed to by variable n is assigned to variable n. Then, the flow returns to S1003 and the process described above is repeated. The process in S1005 is the same as the process in S144 shown in FIG. 10.

In S1006 it is judged whether the cell has never been processed in a mark phase (OFF_WHITE_UV). If the judgment results are Yes, in S1007 the cell is modified to a cell, the color field of which is pointed to by variable n is OFF_WHITE_V and that has already been processed in a mark phase. Then, a pointer stored in the pointer field cdr of this cell is stored in the GC stack 135 and the cell pointed to by the pointer is made ready to be marked again later. Furthermore, a pointer stored in the pointer field car of a cell pointed to by variable n is assigned to variable n. Then, the flow returns to S1003 and the process described above is repeated. In this way, in the sixth preferred embodiment, it is twice judged whether a cell is being used. In this case, even a cell with a short period of use, such as a cell, the use of which is started being used by execution of an application program and is terminated immediately after is never judged successively twice as be being used. In this way, even a cell with a short period of use can be securely collected.

So far the mark phase process in the sixth preferred embodiment has been described.

Figure 32:
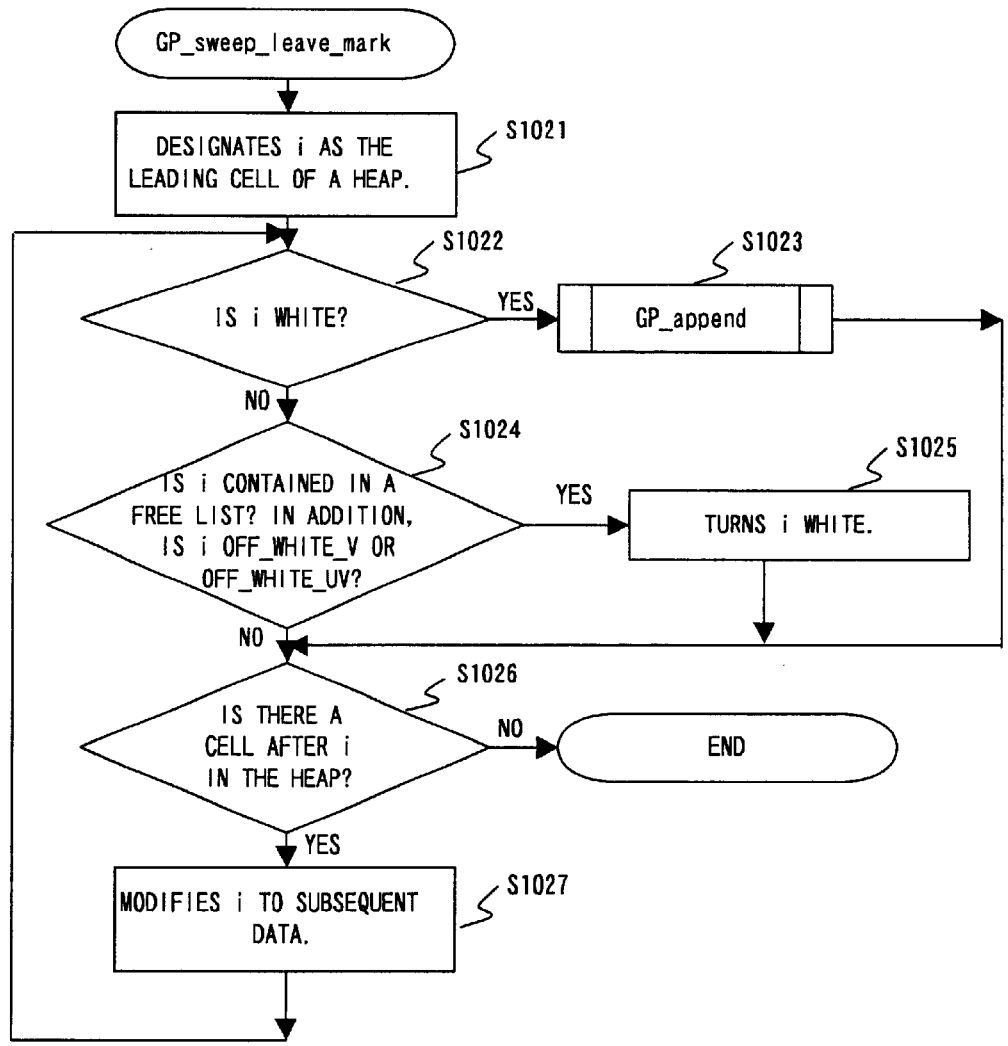
FIG. 32 shows the algorithm of a sweep leave mark process in the sixth preferred embodiment of a PMGC, the process efficiency of which is improved.

Next, the algorithm of a sweep leave mark process in this sixth preferred embodiment shown in FIG. 32 is described.

When a process ranging from S1021 to S1027 shown in FIG. 32 and a process ranging from S161 to S167 shown in FIG. 11 are compared, the only difference between them is the difference between S1024 and S164. This difference is due to the introduction of a further color marking classification to an off-white marked cell based on the execution/non-execution of a mark phase process, and both the process contents are intrinsically the same. However, the free list addition process executed in S1023 shown in FIG. 32 is modified from that shown in FIG. 12.

FIG. 33 shows the algorithm of a free list addition process in this sixth preferred embodiment. In S1041, a cell pointed to by variable i is modified to a cell, the color field of which is off-white, and which has never been processed in a mark phase (OFF_WHITE_UV), and simultaneously pointer "f" is stored in pointer field car. Furthermore, a free list 134 is updated and this cell is connected to a list of free cells.

Figure 34:
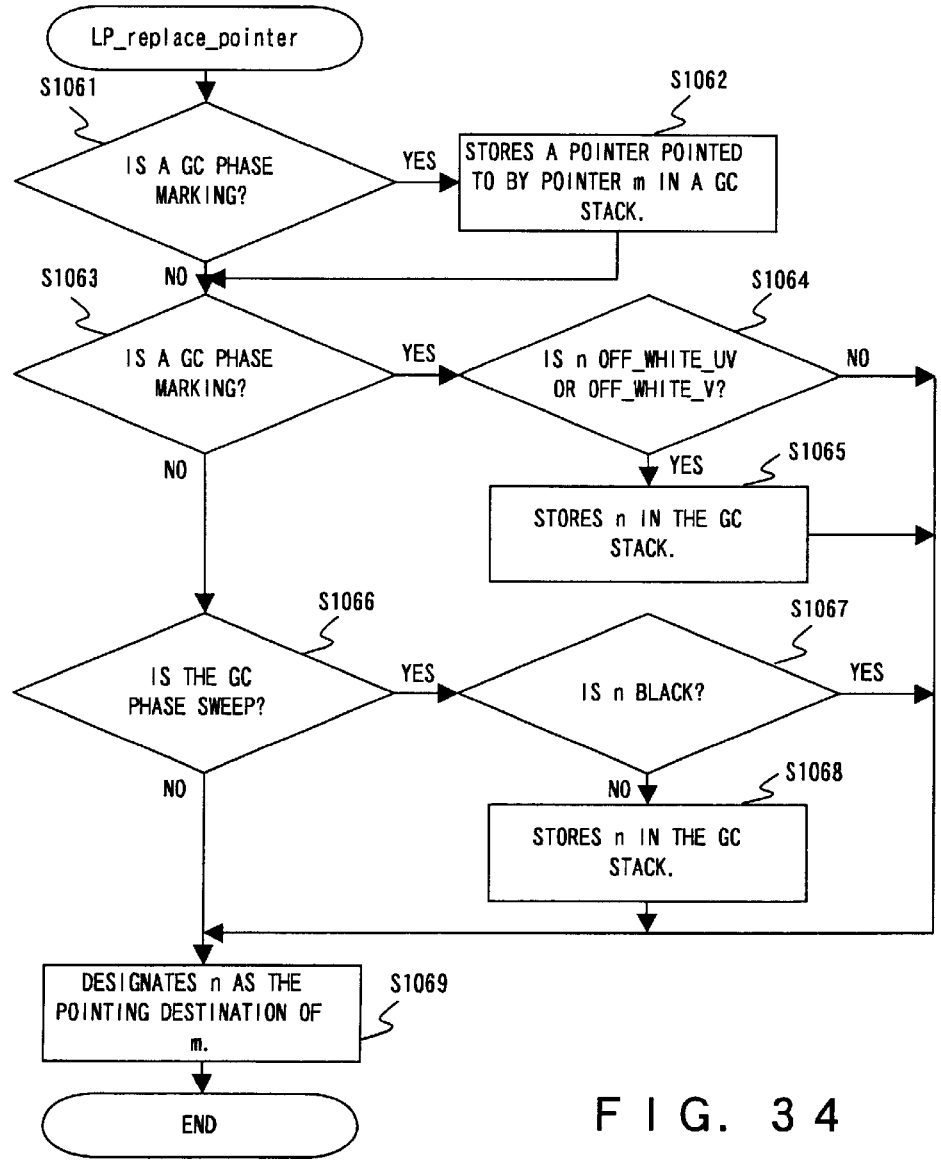
FIG. 34 shows the algorithm of a pointer replacement process in the sixth preferred embodiment of a PMGC, the process efficiency of which is improved.

In this sixth preferred embodiment, although the CPU 111 of the program execution unit 101 executes the cell new use process shown in FIG. 15 as in the case where the basic PMGC described earlier is executed, the pointer replacement process is executed according to the algorithm shown in FIG. 34 instead of the algorithm shown in FIG. 14.

When the process ranging from S1061 to S1069 shown in FIG. 34 and the process ranging from S201 to S209 shown in FIG. 14 are compared, the only difference between them is the difference in the judgment process between S1064 and S204. This difference is also due to the introduction of a further color marking classification to an off-white marked cell based on the execution/non-execution of a mark phase process like the difference between FIG. 32 and FIG. 11 described earlier, and both the process contents are intrinsically the same.

Next, the seventh preferred embodiment of PMGC with improved process efficiency is described.

In the seventh preferred embodiment, cells with short lives that have never been processed in a mark phase can be collected in an immediately subsequent sweep phase, as in the sixth preferred embodiment described earlier.

FIG. 14 that shows the algorithm of a pointer replacement process executed when the program execution unit 101 executes an application in the basic PMGC described earlier and when a pointer in a heap 133 pointed to by pointer m is modified to pointer n is described.

In FIG. 14, since the pointer n of a cell with an off-white color field is stored in a GC stack 135 in S205 or S208, the color field of the cell is turned black in the process ranging from S142 to S144 of the mark phase process shown in FIG. 10. As a result, the cell cannot be collected in a sweep phase executed immediately after, even if the cell is judged to be not used and "garbage".

Therefore, in the seventh preferred embodiment, the algorithm of a pointer replacement process described above is modified in such a way that pointer m is stored in a GC stack 135 instead of pointer n, and further the mark phase process is modified in such a way that cells, the lives of which are short and that have never been processed in a mark phase can be collected in an immediately subsequent sweep phase.

Figure 35:
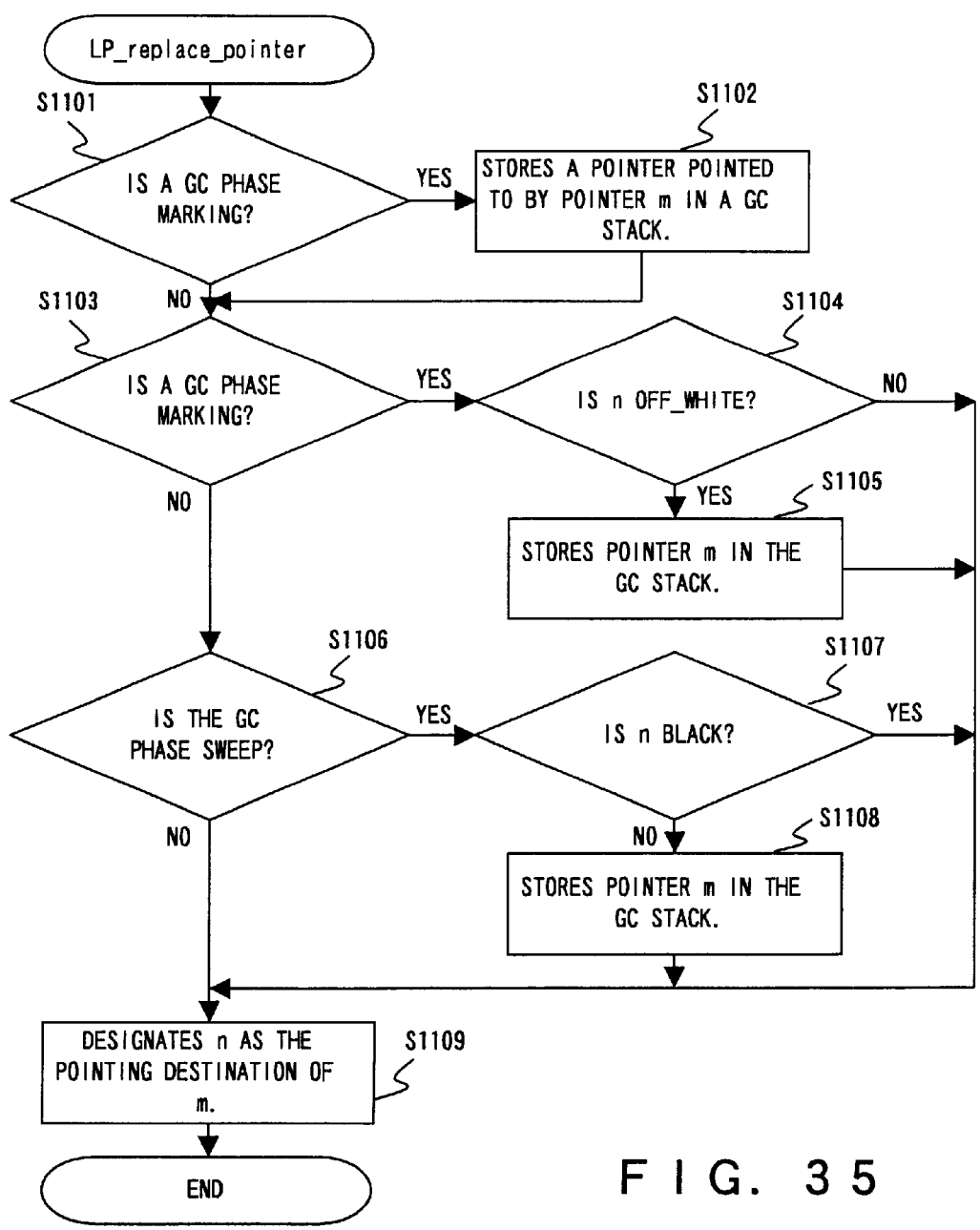
FIG. 35 shows the algorithm of a pointer replacement process in the seventh preferred embodiment of a PMGC, the process efficiency of which is improved.

In this seventh preferred embodiment, although the CPU 111 of the program execution unit 101 executes the cell new use process shown in FIG. 15, as in the case where the basic PMGC described earlier is executed, the pointer replacement process is executed according to the algorithm shown in FIG. 35 instead of the algorithm shown in FIG. 14.

As is known when the process ranging from S1101 to S1109 shown in FIG. 35 is compared with the process ranging from S201 to S209 shown in FIG. 14, in FIG. 35, in S1105 and S1108 pointer m is stored in a GC stack 135, although in FIG. 14, in S205 and S208 pointer n is stored in the GC stack 135. In this way, by storing pointer m before modification, cells are made ready to be marked later without fail. Therefore, even cells, the period of use of which is a short period and that are pointed to by pointer n can be collected.

Furthermore, in the seventh preferred embodiment, the CPU 121 of the memory management unit 102 executes each process according to the algorithm of the PMGC control process shown in FIG. 8. However, the mark phase process in S104 and S110 shown in FIG. 8 that is obtained by modifying the process shown in FIG. 10 is further modified to the process shown in FIG. 36 and is executed.

Figure 36:
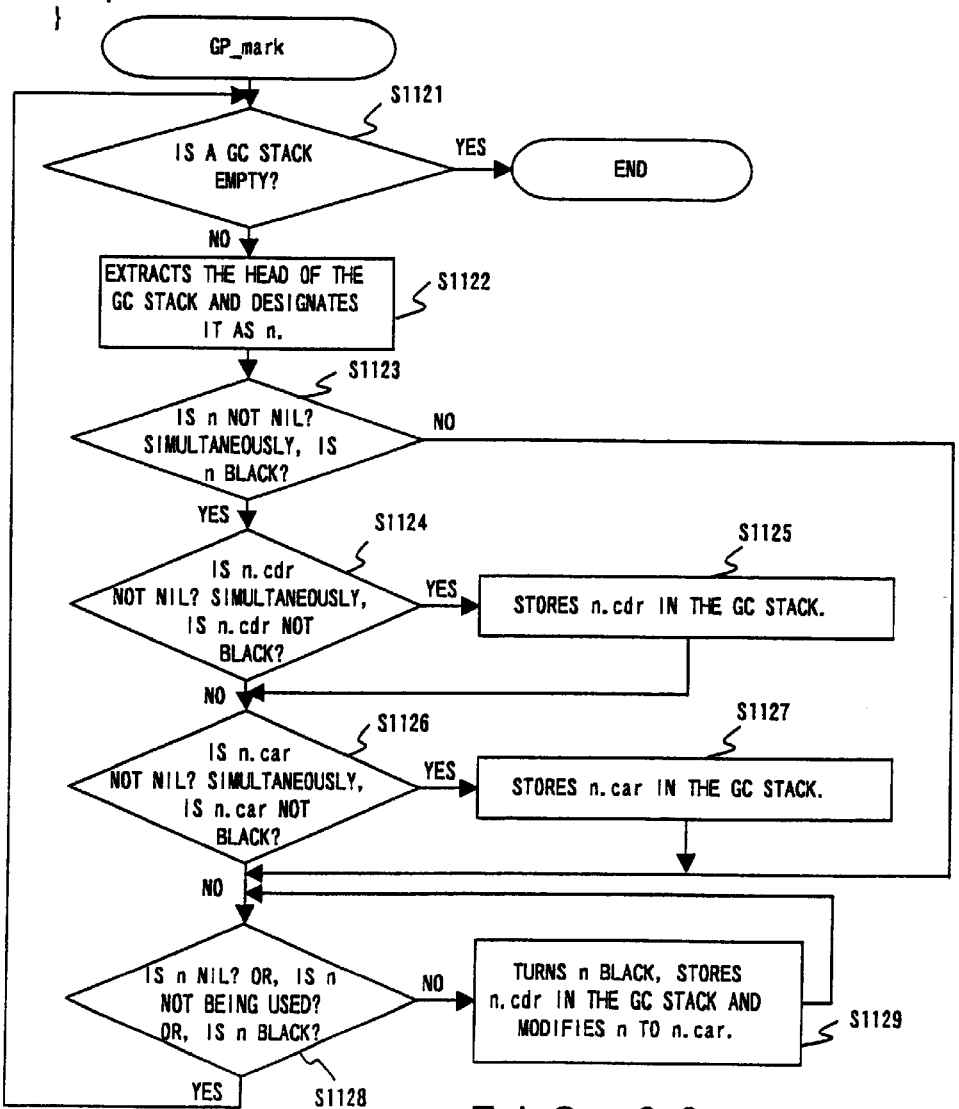
FIG. 36 shows the algorithm of a mark phase process in the seventh preferred embodiment of a PMGC, the process efficiency of which is improved.

The algorithm of a mark phase process in the seventh preferred embodiment shown in FIG. 36 is described.

First, in S1121 it is judged whether a GC stack 135 is empty. If the judgment result is Yes, the mark phase process terminates. If the judgment result is No, the flow proceeds to S1122.

In S1122, one pointer stored at the head of a GC stack is extracted from the GC stack 135 and it is assigned to variable n.

The process in S1121 and S1122 is the same as the process and S141 and S142 shown in FIG. 10.

A process ranging from S1123 to S1127 is described.

If the modified pointer replacement process shown in FIG. 35 is executed, there is the possibility that, although some of self cells pointed to by pointer m stored in the GC stack 135 may be marked, cells pointed to by a pointer stored in the pointer field of the cells may not be marked. In the process ranging from S1123 to S1127, a pointer pointing to such an unmarked cell is stored in the GC stack 135 so that this cell is also made ready to be marked at a time during this mark phase process.

In S1123 it is judged whether the content of a cell pointed to by the pointer assigned to variable n is not NIL (no value) and simultaneously whether the color field of the cell is marked black. If both of the judgment results are Yes, the flow proceeds to S1124, and if at least one of them is No, the flow proceeds to S1128.

In S1124 it is simultaneously judged whether the content of a cell pointed to by the pointer stored in the pointer field cdr of the cell is not NIL (no value) and whether the color field of the cell is marked black. Only when both of the judgment results are Yes, is, in S1125, a pointer stored in the pointer field cdr of a cell pointed to by the pointer assigned to variable n stored in the GC stack 135.

In S1126 it is simultaneously judged whether the content of a cell pointed to by the pointer stored in the pointer field car of the cell pointed to by the pointer assigned in variable n is not NIL (no value) and whether the color field of the cell is not marked black. Only when both of the judgment results are Yes, is, in S1127, a pointer stored in the pointer field car of the cell pointed to by the pointer assigned to variable n stored in the GC stack 135.

In S1128, as to a cell pointed to by the pointer assigned to variable n, it is simultaneously judged (1) whether the content of the cell is NIL (no value), (2) whether the cell is not being used and (3) whether the color field of the cell is marked black. If at least one of (1) through (3) above is Yes, the flow returns to S1121 and the process described above is repeated.

If in S1128 the judgment result is No, in S1129, the color field of a cell pointed to by variable n is turned black so that it is indicated that this cell is being used. Then, the pointer stored in the pointer field cdr of this cell is stored in the GC stack 135 and the cell pointed to by the pointer is made ready to be marked later. Furthermore, the pointer stored in the pointer field car of the cell pointed to by variable n is assigned to variable n. Then, the flow returns to S1128 and the process described above is repeated.

The process in S1128 and S1129 described above is the same as the process in S143 and S144 shown in FIG. 10.

Next, the eighth preferred embodiment of PMGC with improved process efficiency is described.

Both S201 and S202 of the pointer replacement process shown in FIG. 14 are focused on. In this process, if the current GC process phase is a mark phase and if a pointer in a heap 133 pointed to by pointer m is modified to pointer n when the program execution unit 101 executes an application program, the pointer before the modification is stored in the GC stack 135 and the cell pointed to by the pointer before the modification is made ready to be marked.

Here, the color field of a cell storing the pointer before this modification is studied. If the color field of this cell is already black, there is no need to newly mark this cell. If the color field of this cell is off-white, it is clear that a pointer pointing to this cell is already stored in the GC stack 135 by taking into consideration the fact that this cell has been pointed to by another cell before the modification.

Therefore, it is found that in the pointer replacement process, it is sufficient if of the pointers before modification described above, only the pointers stored in cells with white color fields are stored in the GC stack 135.

In the eighth preferred embodiment, by executing a pointer replacement process meeting the conditions described above, unnecessary storage of pointers in a GC stack 135 can be prevented and a marking process can be optimized. Simultaneously, the load in a notification process executed by the program execution unit 101 in order to store pointers in a GC stack 135 is reduced.

In this eighth preferred embodiment, the CPU 121 of the memory management unit 102 executes each process according to the algorithm of the PMGC control process shown in FIG. 8. Although the CPU 111 of the program execution unit 101 executes the cell new use process shown in FIG. 15 as in the case where the basic PMGC described earlier is executed, the pointer replacement process is executed according to the algorithm shown in FIG. 37 instead of the algorithm shown in FIG. 14.

Figure 37:
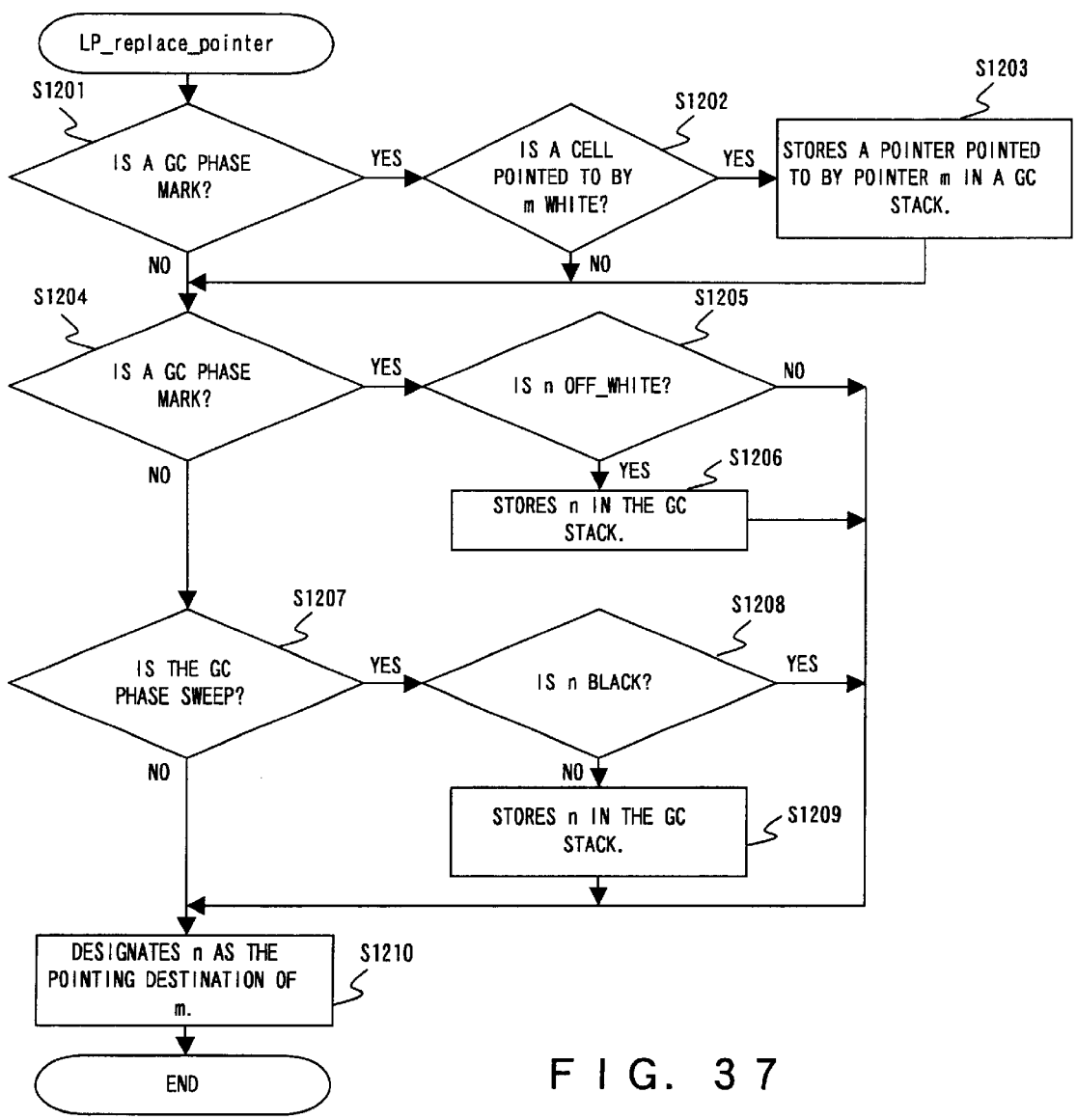
FIG. 37 shows the algorithm of a pointer replacement process in the eighth preferred embodiment of a PMGC, the process efficiency of which is improved.

As is known when the process ranging from S1201 to S1210 shown in FIG. 37 is compared with the process ranging from S201 to S209 shown in FIG. 14, in FIG. 37, S202 shown in FIG. 14 is replaced with S1202 and S1203.

In FIG. 37, in S1202 that is executed if in S1201 the judgment result is Yes, it is judged whether the color field of a cell storing a pointer that is currently stored in a heap 133 pointed to by pointer m is turned white. If the judgment result is Yes, in S1203 the pointer currently stored in the heap 133 pointed to by pointer m is stored in the GC stack 135 and then the flow proceeds to S1204. If in S1202 the judgment result id No, the flow proceeds to S1204 without any process being performed.

Next, the ninth preferred embodiment of PMGC with improved process efficiency is described.

First, the process ranging from S203 to S205 of the pointer replacement shown in FIG. 14 is focused on. In this process, if the current GC process phase is a mark phase and if a pointer in the heap 133 pointed to by pointer m is modified to pointer n when the program execution unit 101 executes an application program, pointer n is stored in the GC stack 135 and a cell pointed to by pointer n with an off-white color field is made ready to be marked.

Here, the color field of a cell storing a pointer pointed to by pointer m is studied. If the color field of this cell is not black, but white or off-white, it is clear that the cell pointed to by pointer m has not been marked yet in the mark phase by taking into consideration the fact that a cell pointed to by pointer m has been continuously used before this modification. In this case, when the cell pointed to by pointer m is marked later, pointer n contained in the cell is securely stored in the GC stack 135. In other words, in this case, pointer n is to be stored at a time in the future without the execution of S205.

Next, the process ranging from S206 to S208 shown in FIG. 14 is focused on. In this process, if the current GC process phase is a sweep phase and if a pointer in a heap 133 pointed to by pointer m is modified to pointer n when the program execution unit 101 executes an application program, pointer n is stored in a GC stack 135 and a cell with a white or off-white color field that is pointed to by pointer n is made ready to be marked.

In this case too, as described earlier, if the color field of a cell storing a pointer pointed to by pointer m is not black, but white or off-white, pointer n contained in a cell is securely stored in the GC stack 135 when the cell pointed to by pointer m is marked later. Therefore, in this case too, pointer n is stored in the GC stack at a time in the future without the execution of S208.

In the ninth preferred embodiment, by executing a pointer replacement process meeting the conditions described above, unnecessary storage of pointers in a GC stack 135 cab be prevented and a marking process can be optimized. Simultaneously, the load in a notification process executed by the program execution unit 101 to store a pointer in the GC stack can be reduced.

In the ninth preferred embodiment, the CPU 121 of the memory management unit 102 executes each process according to the algorithm of the PMGC control process shown in FIG. 8. Although the CPU 111 of the program execution unit 101 executes the cell new use process shown in FIG. 15, as in the case where the basic PMGC described earlier is executed, the pointer replacement process is executed according to the algorithm shown in FIG. 38 instead of the algorithm shown in FIG. 14.

Figure 38:
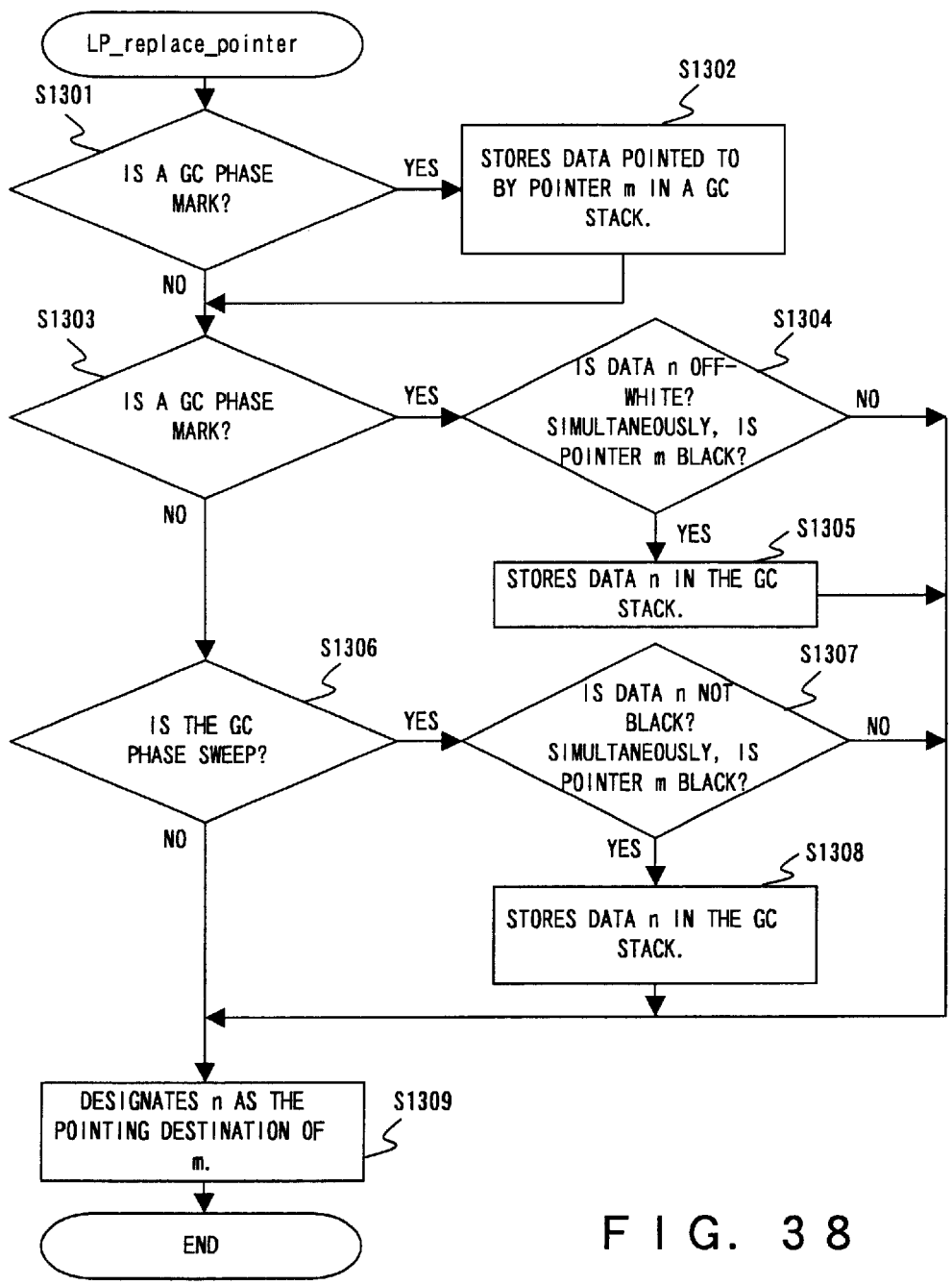
FIG. 38 shows the algorithm of a pointer replacement process in the ninth preferred embodiment of a PMGC, the process efficiency of which is improved.

As is known when the process ranging from S1301 to S1309 shown in FIG. 38 is compared with the process ranging from S201 to S209 shown in FIG. 14, in FIG. 38, the judgment process in S204 and S207 shown in FIG. 14 is replaced with the judgment process in S1304 and S1307.

In FIG. 38, in S1304 that is executed if in S1303 the judgment result is Yes, it is simultaneously judged whether the color field of a cell pointed to by pointer n is off-white and whether the color field of a cell pointed to by pointer m is black. If both of the judgment results are Yes, in S1305 pointer n is stored in the GC stack 135 and then the flow proceeds to S1309. If at least one of the judgment results is No, the flow proceeds to S1309 without any process being performed.

In S1307 that is executed if in S1306 the judgment result is Yes, it is simultaneously judged whether the color field of a cell pointed to by pointer n is not black, but white or off-white and whether the color field of a cell pointed to by pointer m is black. If both of the judgment results are Yes, in S1308 pointer n is stored in the GC stack and then the flow proceeds to S1309. If in S1307 at least one of the judgment results is No, the flow proceeds to S1309 without any process being performed.

A general-purpose computer can also execute each process described in each preferred embodiment of the present invention described above. This can be implemented by storing in advance the memory resource management program for enabling a computer to execute each process according to each algorithm shown in FIG. 8 through FIG. 38, in a computer-readable storage medium, by reading the memory resource management program from the storage medium, by temporarily storing the program in the main memory of the computer and by reading and executing the program stored in the CPU of the computer.

Figure 39:
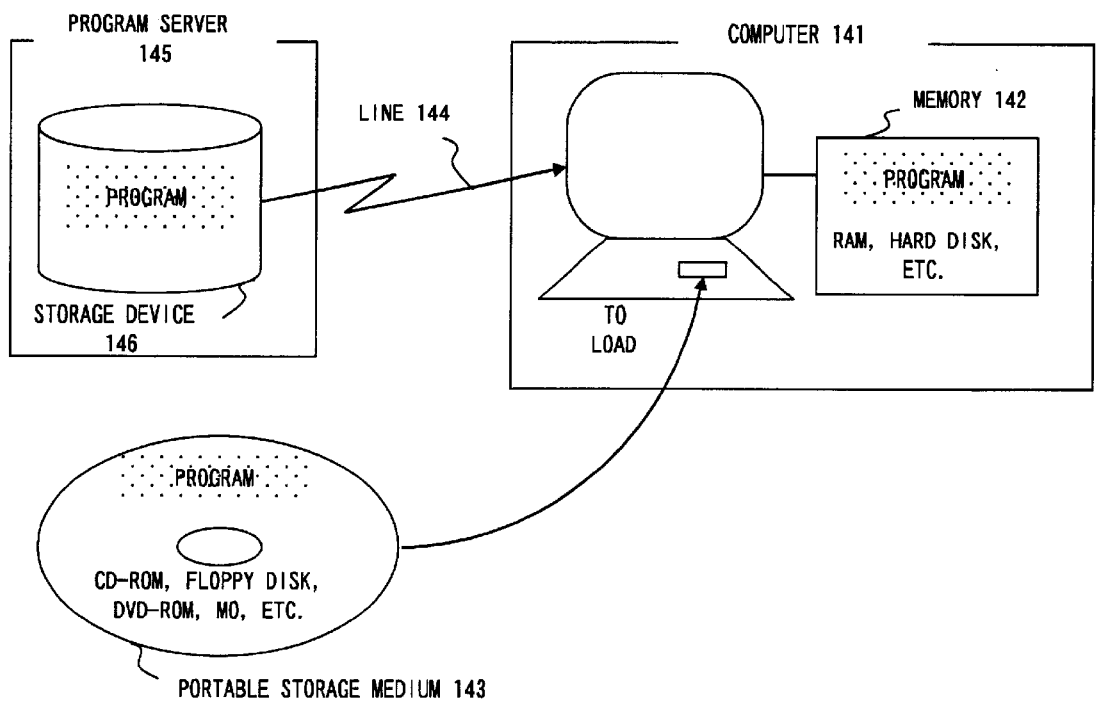
FIG. 39 shows examples of computer-readable storage media on which a memory resource management program is recorded.

FIG. 39 shows examples of the computer-readable storage media that can store the memory resource management program described above. For such a storage medium, for example, a memory 142, such as a semiconductor memory, a hard disk device, etc., built into or attached to the main body of a computer 141, a portable storage medium 143, such as a CD-ROM, a DVD-ROM, MO (magneto-optical disk), etc., can be used.

The storage medium can also be a storage device 146 provided with a program server 145, which is a computer, and can be connected to the computer 141 via a line 144. In this case, the memory resource management program can be executed if transmission signals obtained by modulating carrier waves with data signals representing the memory resource management program are transmitted from the program server 145 to the computer 141 via a line 144, which is a transmission medium, and the computer 141 demodulates the received transmission signals and reproduces the memory resource management program.

As described above in detail, according to the first aspect of the present invention, it can be judged if the process efficiency of the entire GC can be improved by executing either a full GC cycle or a partial GC cycle when performing a subsequent collection of free cells in PMGC, based on the state of the collection of free cells made in a full GC cycle or a partial GC cycle in the past, and a subsequent cycle to be executed can be selected based on this judgment result.

According to the second aspect of the present invention, if a cell judged to be made free in a mark phase has never been processed in a mark phase, the cell can be processed in a mark phase again instead of being collected only based on the judgment result and free cells can be collected from a heap based on the result. In this way, even a cell with a short period of use, such as a cell the use of which is started by the execution of an application program and is terminated immediately after, can be securely collected.

According to the third aspect of the present invention, if the first pointer that is stored in a cell being used in a heap and that points to another cell in the heap is modified to the second pointer, a pointer pointing to a cell storing the first pointer is reported. The memory management unit newly judges whether a cell that is pointed to by the second pointer stored in a cell pointed to by the notified pointer is being used by the execution of an application. In this way, even a cell with a short period of use, such as a cell the use of which is started by the execution of an application program and is terminated immediately after, can be securely judged and the cell can be securely collected if it is judged to be free.

According to the fourth aspect of the present invention, if the first pointer that is stored in a cell being used in a heap and that points to another cell in the heap is modified to the second pointer and if a cell pointed to by the first pointer has never been processed in a mark phase after the judgment of the state of use of cells recently made in a full GC cycle, the first pointer is reported. The memory management unit newly judges whether a cell that is pointed to by the first pointer stored in a cell pointed to by the notified pointer is being used by the execution of an application. In this way, the number of pointers reported to the memory management unit can be reduced and process load can be reduced by the degree accordingly.

According to the fifth aspect of the present invention, if the first pointer that is stored in a cell being used in a heap and that points to another cell in the heap is modified to the second pointer and if a cell pointed to by the first pointer has never processed in a mark phase after the judgment of the state of use of cells recently made in a full GC cycle, the second pointer is reported. The memory management unit newly judges whether a cell that is pointed to by the second pointer stored in a cell pointed to by the notified pointer is being used by the execution of an application. In this way, the number of pointers reported to the memory management unit can be reduced and process load can be reduced by a corresponding degree.

In this way, according to any aspect of the present invention, the process efficiency of parallel type GC can be improved.

What is claimed is:

1. A memory resource management device for managing a heap that is a memory resource managed in units of cells, which are data strings, and that is used in units of cells by execution of an application program, and performing a garbage collection process to collect free cells from the heap, comprising:
    a full garbage collection unit checking a state of use of all cells in the heap by the execution of the application program and collecting free cells from the heap based on a checking result;
    a partial garbage collection unit extracting a cell that has been used by the execution of the application program after judgment of the state of use of cells recently made by said full garbage collection unit, checking the state of use of cells by the execution of the application program to the extracted cell and collecting free cells from the heap based on the checking result; and
    a full/partial control unit, coupled to said full and partial garbage collection units, to determine performance of a subsequent collection of free cells by one of said full garbage collection unit and said partial garbage collection unit depending on a collection state of free cells previously made by at least one of said full garbage collection unit and said partial garbage collection unit and a ratio between a number of cells in the heap, data of which are modified by the execution of the application program while the state of use of cells is previously checked or collected by said full garbage collection unit or said partial garbage collection unit and the number of cells in the heap that are judged to be being used at time of judgment of the state of use of cells made by said full garbage collection unit or said partial garbage collection unit after judgment on the state of use of cells recently made by said full garbage collection unit.

2. A memory resource management device for managing a heap that is a memory resource managed in units of cells, which are data strings, and that is used in units of cells by execution of an application program, and performing a garbage collection process to collect free cells from the heap, comprising:
    a full garbage collection unit checking a state of use of all cells in the heap by the execution of the application program and collecting free cells from the heap based on a checking result;
    a partial garbage collection unit extracting a cell that has been used by the execution of the application program after judgment of the state of use of cells recently made by said full garbage collection unit, checking the state of use of cells by the execution of the application program to the extracted cell and collecting free cells from the heap based on the checking result; and
    a full/partial control unit, coupled to said full and partial garbage collection units, to determine performance of a subsequent collection of free cells by one of said full garbage collection unit and said partial garbage collection unit depending on a collection state of free cells previously made by at least one of said full garbage collection unit and said partial garbage collection unit and a notification indicating a change in state of use of the heap during the execution of the application program.

3. A memory resource management device for managing a heap that is a memory resource managed in units of cells, which are data strings, and that is used in units of cells by execution of an application program, and performing a garbage collection process in order to collect free cells from the heap, comprising:
    a full judgment unit judging whether, as to all cells in the heap, each cell is being used or is not being used by the execution of the application program;

a full collection unit collecting free cells from the heap based on a judgment result of the full judgment unit;

a partial extraction unit extracting a cell that has been used by the execution of the application program after judgment of a state of use of cells recently made by the full judgment unit;

a partial judgment unit judging whether each of the cells extracted by the partial extraction unit is being used by the execution of the application program;

a partial collection unit collecting free cells from the heap based on the judgment result of the partial judgment unit; and a partial marking garbage collection control unit determining to collect free cells from the heap by either the full collection unit or the partial collection unit, wherein said partial collection unit collects a free cell from the heap based on a second judgment result of the partial judgment unit if a cell judged to be free by the partial judgment unit has never been checked before.

4. A memory resource management device for managing a heap that is a memory resource managed in units of cells, which are data strings, and that is used in units of cells by execution of an application program, and performing a garbage collection process in order to collect free cells from the heap, comprising:

a full judgment unit judging whether, as to all cells in the heap, each cell is being used or is not being used by the execution of the application program;

a full collection unit collecting free cells from the heap based on a judgment result of the full judgment unit;

a partial extraction unit extracting a cell that has been used by the execution of the application program after judgment of a state of use of cells recently made by the full judgment unit;

a partial judgment unit judging whether each of the cells extracted by the partial extraction unit is being used by the execution of the application program;

a partial collection unit collecting free cells from the heap based on the judgment result of the partial judgment unit;

a partial marking garbage collection control unit determining to collect free cells from the heap by either the full collection unit or the partial collection unit; and a notification unit notifying the partial judgment unit of a pointer pointing to a cell storing a first pointer if the first pointer that is stored in a cell being used in the heap and that points to another cell in the heap is modified to a second pointer, wherein said partial judgment unit newly judges whether a cell pointed to by the second pointer stored in a cell pointed to by the pointer reported by the notification unit is being used by the execution of the application program.

5. A memory resource management device for managing a heap that is a memory resource managed in units of cells, which are data strings and that is used in units of cells by execution of an application program, and performing a garbage collection process in order to collect free cells from the heap, comprising:

a full judgment unit judging whether, as to all cells in the heap, each cell is being used or is not being used by the execution of the application program;

a full collection unit collecting free cells from the heap based on a judgment result of the full judgment unit;

a partial extraction unit extracting a cell that has been used by the execution of the application program after judgment of a state of use of cells recently made by the full judgment unit;

a partial judgment unit judging whether each of the cells extracted by the partial extraction unit is being used by the execution of the application program;

a partial collection unit collecting free cells from the heap based on the judgment result of the partial judgment unit;

a partial marking garbage collection control unit determining to collect free cells from the heap by either the full collection unit or the partial collection unit; and a notification unit notifying the partial judgment unit of a first pointer if the first pointer that is stored in a cell being used in the heap and that points to another cell in the heap is modified to a second pointer and if a cell pointed to by the first pointer has never been checked by the full judgment unit or the partial judgment unit, wherein said partial judgment unit newly judges whether a cell pointed to by the first pointer reported by the notification unit is being used by the execution of the application program.

6. A memory resource management device for managing a heap that is a memory resource managed in units of cells, which are data strings, and that is used in units of cells by execution of an application program, and performing a garbage collection process in order to collect free cells from the heap, comprising:

a full judgment unit judging whether, as to all cells in the heap, each cell is being used or is not being used by the execution of the application program;

a full collection unit collecting free cells from the heap based on a judgment result of the full judgment unit;

a partial extraction unit extracting a cell that has been used by the execution of the application program after judgment of a state of use of cells recently made by the full judgment unit;

a partial judgment unit judging whether each of the cells extracted by the partial extraction unit is being used by the execution of the application program;

a partial collection unit collecting free cells from the heap based on the judgment result of the partial judgment unit;

a partial marking garbage collection control unit determining to collect free cells from the heap by either the full collection unit or the partial collection unit; and a notification unit notifying the partial judgment unit of a second pointer if a first pointer that is stored in a cell being used in the heap and that points to another cell in the heap is modified to the second pointer and if a cell pointed to by the first pointer has been checked by the full judgment unit or the partial judgment unit, wherein said partial judgment unit newly judges whether a cell pointed to by the second pointer reported by the notification unit is being used by the execution of the application program.

7. A memory resource management device for managing a heap that is a memory resource managed in units of cells, which are data strings, and that is used in units of cells by execution of an application program, and performing a garbage collection process in order to collect free cells from the heap, comprising:

full garbage collection means for checking a state of use of all cells in the heap by the execution of the application program and collecting free cells from the heap based on the judgment result;

partial garbage collection means for extracting a cell that has been used by the execution of the application program after judgment of the state of use of cells recently made by said full garbage collection means, checking the state of use of cells by the execution of the application program to the extracted cell and collecting free cells from the heap based on the judgment result; and full/partial control means for determining to perform a subsequent collection of free cells by either said full garbage collection means or said partial garbage collection means depending on a collection state of free cells previously made by said full garbage collection means or said partial garbage collection means and a ratio between a number of cells in the heap, data of which are modified by the execution of the application program while the state of use of cells is previously checked or collected by said full garbage collection unit or said partial garbage collection unit and the number of cells in the heap that are judged to be being used at time of judgment of the state of use of cells made by said full garbage collection unit or said partial garbage collection unit after judgment on the state of use of cells recently made by said full garbage collection unit.

8. A memory resource management device for managing a heap that is a memory resource managed in units of cells, which are data strings, and that is used in units of cells by execution of an application program, and performing a garbage collection process in order to collect free cells from the heap, comprising:

full judgment means for judging whether, as to all cells in the heap, each cell is being used or is not being used by the execution of the application program;

full collection means for collecting free cells from the heap based on a judgment result of the full judgment means;

partial extraction means for extracting a cell that has been used by the execution of the application program after judgment of a state of use of cells recently made by the full judgment means;

partial judgment means for judging whether each of the cells extracted by the partial extraction means is being used by the execution of the application program;

partial collection means for collecting free cells from the heap based on the judgment result of the partial judgment means; and partial marking garbage collection control means for determining to collect free cells from the heap by either the full collection means or the partial collection means, wherein said partial collection means collects a free cell from the heap based on a second judgment result of the partial judgment means if a cell judged to be not used by the partial judgment means has never been checked before.

9. A memory resource management device for managing a heap that is a memory resource managed in units of cells, which are data strings, and that is used in units of cells by execution of an application program, and performing a garbage collection process in order to collect free cells from the heap, comprising:

full judgment means for judging whether, as to all cells in the heap, each cell is being used or is not being used by the execution of the application program;

full collection means for collecting free cells from the heap based on a judgment result of the full judgment means;

partial extraction means for extracting a cell that has been used by the execution of the application program after judgment of a state of use of cells recently made by the full judgment means;

partial judgment means for judging whether each of the cells extracted by the partial extraction means is being used by the execution of the application program;

partial collection means for collecting free cells from the heap based on the judgment result of the partial judgment means;

partial marking garbage collection control means for determining to collect free cells from the heap by either the full collection means or the partial collection means; and notification means for notifying the partial judgment means of a pointer pointing to a cell storing a first pointer if the first pointer that is stored in a cell being used in the heap and that points to another cell in the heap is modified to a second pointer, wherein said partial judgment means newly judges whether a cell pointed to by the second pointer stored in a cell pointed to by the pointer reported by the notification means is being used by the execution of the application program.

10. A memory resource management device for managing a heap that is a memory resource managed in units of cells, which are data strings, and that is used in units of cells by execution of an application program, and performing a garbage collection process in order to collect free cells from the heap, comprising:

full judgment means for judging whether, as to all cells in the heap, each cell is being used or is not being used by the execution of the application program;

full collection means for collecting free cells from the heap based on a judgment result of the full judgment means;

partial extraction means for extracting a cell that has been used by the execution of the application program after judgment of a state of use of cells recently made by the full judgment means;

partial judgment means for judging whether each of the cells extracted by the partial extraction means is being used by the execution of the application program;

partial collection means for collecting free cells from the heap based on the judgment result of the partial judgment means;

partial marking garbage collection control means for determining to collect free cells from the heap by either the full collection means or the partial collection means; and notification means for notifying the partial judgment means of a first pointer if the first pointer that is stored in a cell being used in the heap and that points to another cell in the heap is modified to a second pointer and if a cell pointed to by the first pointer has never been checked by the full judgment means or the partial judgment means, wherein said partial judgment means newly judges whether a cell pointed to by the first pointer reported by the notification means is being used by the execution of the application program.

11. A memory resource management device for managing a heap that is a memory resource managed in units of cells, which are data strings, and that is used in units of cells by execution of an application program, and performing a garbage collection process in order to collect free cells from the heap, comprising:

full judgment means for judging whether, as to all cells in the heap, each cell is being used or is not being used by the execution of the application program;

full collection means for collecting free cells from the heap based on a judgment result of the full judgment means;

partial extraction means for extracting a cell that has been used by the execution of the application program after judgment of a state of use of cells recently made by the full judgment means;

partial judgment means for judging whether each of the cells extracted by the partial extraction means is being used by the execution of the application program;

partial collection means for collecting free cells from the heap based on the judgment result of the partial judgment means;

partial marking garbage collection control means for determining to collect free cells from the heap by either the full collection means or the partial collection means; and notification means for notifying the partial judgment means of a second pointer if a first pointer that is stored in a cell being used in the heap and that points to another cell in the heap is modified to the second pointer and if a cell pointed to by the first pointer has been checked by the full judgment means or the partial judgment means, wherein said partial judgment means newly judges whether a cell pointed to by the second pointer reported by the notification means is being used by the execution of the application program.

12. A memory resource management method for managing a heap that is a memory resource managed in units of cells, which are data strings, and that is used in units of cells by execution of an application program, and performing a garbage collection process in order to collect free cells from the heap, comprising:

a full garbage collection operation of checking a state of use of all cells in the heap during the execution of the application program and collecting free cells from the heap based on a judgment result;

a partial garbage collection operation of extracting a cell that has been used by the execution of the application program after judgment of the state of use of cells recently made by the full garbage collection operation, checking the state of use of cells by the execution of the application program and collecting free cells from the heap based on the judgment result; and a full/partial control operation of determining to perform a subsequent collection of free cells by either the full garbage collection operation or the partial garbage collection operation depending on a collection state of free cells previously made by the full garbage collection operation or the partial garbage collection operation and a ratio between a number of cells in the heap, data of which are modified by the execution of the application program while the state of use of cells is previously checked or collected by said full garbage collection unit or said partial garbage collection unit and the number of cells in the heap that are judged to be being used at time of judgment of the state of use of cells made by said full garbage collection unit or said partial garbage collection unit after judgment on the state of use of cells recently made by said full garbage collection unit.

13. A memory resource management method for managing a heap that is a memory resource managed in units of cells, which are data strings, and that is used in units of cells by execution of an application program, and performing a garbage collection process in order to collect free cells from the heap, comprising:

a full judgment operation of judging whether, as to all cells in the heap, each cell is being used by the execution of the application program;

a full collection operation of collecting free cells from the heap based on a judgment result of the full judgment operation;

a partial extraction operation of extracting a cell that has been used by the execution of the application program after judgment of a state of use of cells recently made by the full judgment operation;

a partial judgment operation of judging whether each of the cells extracted by the partial extraction operation is being used by the execution of the application program;

a partial collection operation of collecting free cells from the heap based on the judgment result of the partial judgment operation; and a partial marking garbage collection control operation of determining to collect free cells from the heap by either the full collection operation or the partial collection operation, wherein said partial collection operation collects a free cell from the heap based on a second judgment result of the partial judgment operation if a cell judged to be free by the partial judgment operation has never been checked before.

14. A memory resource management method for managing a heap that is a memory resource managed in units of cells, which are data strings, and that is used in units of cells by execution of an application program, and performing a garbage collection process in order to collect free cells from the heap, comprising:

a full judgment operation of judging whether, as to all cells in the heap, each cell is being used or is not being used by the execution of the application program;

a full collection operation of collecting free cells from the heap based on a judgment result of the full judgment operation;

a partial extraction operation of extracting a cell that has been used during the execution of the application program after judgment of a state of use of cells recently made by the full judgment operation;

a partial judgment operation of judging whether each of the cells extracted by the partial extraction operation is being used by the execution of the application program;

a partial collection operation of collecting free cells from the heap based on the judgment result of the partial judgment operation;

a partial marking garbage collection control operation of determining to collect free cells from the heap by either the full collection operation or the partial collection operation; and a notification operation of notifying the partial judgment operation of a pointer pointing to a cell storing a first pointer if the first pointer that is stored in a cell being used in the heap and that points to another cell in the heap is modified to a second pointer, wherein said partial judgment operation newly judges whether a cell pointed to by the second pointer stored in a cell pointed to by the pointer reported by the notification operation is being used by the execution of the application program.

15. A memory resource management method for managing a heap that is a memory resource managed in units of cells, which are data strings, and that is used in units of cells by execution of an application program, and performing a garbage collection process in order to collect free cells from the heap, comprising:

- a full judgment operation of judging whether, as to all cells in the heap, each cell is being used by the execution of the application program;
- a full collection operation of collecting free cells from the heap based on a judgment result of the full judgment operation;
- a partial extraction operation of extracting a cell that has been used by the execution of the application program after judgment of a state of use of cells recently made by the full judgment operation;
- partial judgment operation of judging whether each of the cells extracted by the partial extraction operation is being used by the execution of the application program;
- a partial collection operation of collecting free cells from the heap based on the judgment result of the partial judgment operation;
- a partial marking garbage collection control operation of determining to collect free cells from the heap by either the full collection operation or the partial collection operation; and
- a notification operation of notifying the partial judgment operation of a first pointer if the first pointer that is stored in a cell being used in the heap and that points to another cell in the heap is modified to a second pointer and if a cell pointed to by the first pointer has never been checked by the full judgment operation or the partial judgment operation, wherein
- said partial judgment operation newly judges whether a cell pointed to by the first pointer reported by the notification unit is being used by the execution of the application program.

16. A memory resource management method for managing a heap that is a memory resource managed in units of cells, which are data strings, and that is used in units of cells by execution of an application program, and performing a garbage collection process in order to collect free cells from the heap, comprising:

- a full judgment operation of judging whether, as to all cells in the heap, each cell is being used by the execution of the application program;
- a full collection operation of collecting free cells from the heap based on a judgment result of the full judgment operation;
- a partial extraction operation of extracting a cell that has been used by the execution of the application program after judgment of a state of use of cells recently made by the full judgment operation;
- a partial judgment operation of judging whether each of the cells extracted by the partial extraction operation is being used by the execution of the application program;
- a partial collection operation of collecting free cells from the heap based on the judgment result of the partial judgment operation;
- a partial marking garbage collection control operation of determining to collect free cells from the heap by either the full collection operation or the partial collection operation; and
- a notification operation of notifying the partial judgment operation of a second pointer if a first pointer that is stored in a cell being used in the heap and that points to another cell in the heap is modified to the second pointer and if a cell pointed to by the first pointer has been checked by the full judgment operation or the partial judgment operation, wherein
- said partial judgment operation newly judges whether a cell pointed to by the second pointer reported by the notification operation is being used by the execution of the application program.

17. A computer-readable storage medium on which is recorded a memory resource management program for enabling a computer to manage a heap that is a memory resource managed in units of cells, which are data strings, and that is used in units of cells by execution of an application program, and to perform a garbage collection process in order to collect free cells from the heap, said memory resource management program directing the computer to execute:

- a full garbage collection process of checking a state of use of all cells in the heap during the execution of the application program and collecting free cells from the heap based on a checking result;
- a partial garbage collection process of extracting a cell that has been used by the execution of the application program after judgment of the state of use of cells recently made by the full garbage collection process, checking the state of use of cells by the execution of the application program and collecting free cells from the heap based on the checking result; and
- a full/partial control process of determining to perform a subsequent collection of free cells by either the full garbage collection process or the partial garbage collection process depending on a collection state of free cells previously made by the full garbage collection process or the partial garbage collection process and a ratio between a number of cells in the heap, data of which are modified by the execution of the application program while the state of use of cells is previously checked or collected by said full garbage collection unit or said partial garbage collection unit and the number of cells in the heap that are judged to be being used at time of judgment of the state of use of cells made by said full garbage collection unit or said partial garbage collection unit after judgment on the state of use of cells recently made by said full garbage collection unit.

18. A computer-readable storage medium on which is recorded a memory resource management program for enabling a computer to manage a heap that is a memory resource managed in units of cells, which are data strings, and that is used in units of cells by execution of an application program, and to perform a garbage collection process in order to collect free cells from the heap, said memory resource management program directing the computer to execute:

- a full judgment process of judging whether, as to all cells in the heap, each cell is being used by the execution of the application program;
- a full collection process of collecting free cells from the heap based on a judgment result of the full judgment process;
- a partial extraction process of extracting a cell that has been used by the execution of the application program after judgment of a state of use of cells recently made by the full judgment process;

a partial judgment process of judging whether each of the cells extracted by the partial extraction process is being used by the execution of the application program;

a partial collection process of collecting free cells from the heap based on the judgment result of the partial judgment process; and a partial marking garbage collection control process of determining to collect free cells from the heap by either the full collection process or the partial collection process, wherein said partial collection process collects a free cell from the heap based on a second judgment result of the partial judgment process if a cell judged to be free by the partial judgment process has never been checked before.

19. A computer-readable storage medium on which is recorded a memory resource management program for enabling a computer to manage a heap that is a memory resource managed in units of cells, which are data strings, and that is used in units of cells by execution of an application program, and to perform a garbage collection process in order to collect free cells from the heap, said memory resource management program directing the computer to execute:

a full judgment process of judging whether, as to all cells in the heap, each cell is being used by the execution of the application program;

a full collection process of collecting free cells from the heap based on a judgment result of the full judgment process;

a partial extraction process of extracting a cell that has been used by the execution of the application program after judgment of a state of use of cells recently made by the full judgment process;

a partial judgment process of judging whether each of the cells extracted by the partial extraction process is being used by the execution of the application program;

a partial collection process of collecting free cells from the heap based on the judgment result of the partial judgment process;

a partial marking garbage collection control process of determining to collect free cells from the heap by either the full collection process or the partial collection process; and a notification process of notifying the partial judgment process of a pointer pointing to a cell storing a first pointer if the first pointer that is stored in a cell being used in the heap and that points to another cell in the heap is modified to a second pointer, wherein said partial judgment process newly judges whether a cell pointed to by the second pointer stored in a cell pointed to by the pointer reported by the notification process is being used by the execution of the application program.

20. A computer-readable storage medium on which is recorded a memory resource management program for enabling a computer to manage a heap that is a memory resource managed in units of cells, which are data strings, and that is used in units of cells by execution of an application program, and to perform a garbage collection process in order to collect free cells from the heap, said memory resource management program directing the computer to execute:

a full judgment process of judging whether, as to all cells in the heap, each cell is being used by the execution of the application program;

a full collection process of collecting free cells from the heap based on a judgment result of the full judgment process;

a partial extraction process of extracting a cell that has been used by the execution of the application program after judgment of a state of use of cells recently made by the full judgment process;

a partial judgment process of judging whether each of the cells extracted by the partial extraction process is being used by the execution of the application program;

a partial collection process of collecting free cells from the heap based on the judgment result of the partial judgment process;

a partial marking garbage collection control process of determining to collect free cells from the heap by either the full collection process or the partial collection process; and a notification process of notifying the partial judgment process of a first pointer if the first pointer that is stored in a cell being used in the heap and that points to another cell in the heap is modified to a second pointer and if a cell pointed to by the first pointer has never been checked by the full judgment process or the partial judgment process, wherein said partial judgment process newly judges whether a cell pointed to by the first pointer reported by the notification unit is being used by the execution of the application program.

21. A computer-readable storage medium on which is recorded a memory resource management program for enabling a computer to manage a heap that is a memory resource managed in units of cells, which are data strings, and that is used in units of cells by execution of an application program, and to perform a garbage collection process in order to collect free cells from the heap, said memory resource management program directing the computer to execute:

a full judgment process of judging whether, as to all cells in the heap, each cell is being used by the execution of the application program;

a full collection process of collecting free cells from the heap based on a judgment result of the full judgment process;

a partial extraction process of extracting a cell that has been used by the execution of the application program after judgment of a state of use of cells recently made by the full judgment process;

a partial judgment process of judging whether each of the cells extracted by the partial extraction process is being used by the execution of the application program;

a partial collection process of collecting free cells from the heap based on the judgment result of the partial judgment process;

a partial marking garbage collection control process of determining to collect free cells from the heap by either the full collection process or the partial collection process; and a notification process of notifying the partial judgment process of a second pointer if a first pointer that is stored in a cell being used in the heap and that points to another cell in the heap is modified to the second pointer and if a cell pointed to by the first pointer has been checked by the full judgment process or the partial judgment process, wherein said partial judgment process newly judges whether a cell pointed to by the second pointer reported by the notification process is being used by the execution of the application program.

22. A computer data signal embodied in a carrier wave and representing a memory resource management program for enabling a computer to manage a heap that is a memory resource managed in units of cells, which are data strings, and that is used in units of cells by execution of an application program, and to perform a garbage collection process in order to collect free cells from the heap, said memory resource management program directing the computer to execute:

a full garbage collection process of checking a state of use of all cells in the heap by the execution of the application program and collecting free cells from the heap based on a judgment result;

a partial garbage collection process of extracting a cell that has been used by the execution of the application program after judgment of the state of use of cells recently made by the full garbage collection process, checking the state of use of cells by the execution of the application program and collecting free cells from the heap based on the judgment result; and a full/partial control process of determining to perform a subsequent collection of free cells by either the full garbage collection process or the partial garbage collection process depending on a collection state of free cells previously made by the full garbage collection process or the partial garbage collection process and a ratio between a number of cells in the heap, data of which are modified by the execution of the application program while the state of use of cells is previously checked or collected by said full garbage collection unit or said partial garbage collection unit and the number of cells in the heap that are judged to be being used at time of judgment of the state of use of cells made by said full garbage collection unit or said partial garbage collection unit after judgment on the state of use of cells recently made by said full garbage collection unit.

23. A computer data signal embodied in a carrier wave and representing a memory resource management program for enabling a computer to manage a heap that is a memory resource managed in units of cells, which are data strings, and that is used in units of cells by execution of an application program, and to perform a garbage collection process in order to collect free cells from the heap, said memory resource management program directing the computer to execute:

a full judgment process of judging whether, as to all cells in the heap, each cell is being used by the execution of the application program;

a full collection process of collecting free cells from the heap based on a judgment result of the full judgment process;

a partial extraction process of extracting a cell that has been used by the execution of the application program after judgment of a state of use of cells recently made by the full judgment process;

a partial judgment process of judging whether each of the cells extracted by the partial extraction process is being used by the execution of the application program;

a partial collection process of collecting free cells from the heap based on the judgment result of the partial judgment process; and a partial marking garbage collection control process of determining to collect free cells from the heap by either the full collection process or the partial collection process, wherein said partial collection process collects a free cell from the heap based on a second judgment result of the partial judgment process if a cell judged to be free by the partial judgment process has never been checked before.

24. A computer data signal embodied in a carrier wave and representing a memory resource management program for enabling a computer to manage a heap that is a memory resource managed in units of cells, which are data strings, and that is used in units of cells by execution of an application program, and to perform a garbage collection process in order to collect free cells from the heap, said memory resource management program directing the computer to execute:

a full judgment process of judging whether, as to all cells in the heap, each cell is being used by the execution of the application program;

a full collection process of collecting free cells from the heap based on a judgment result of the full judgment process;

a partial extraction process of extracting a cell that has been used during the execution of the application program after judgment of a state of use of cells recently made by the full judgment process;

a partial judgment process of judging whether each of the cells extracted by the partial extraction process is being used by the execution of the application program;

a partial collection process of collecting free cells from the heap based on the judgment result of the partial judgment process;

a partial marking garbage collection control process of determining to collect free cells from the heap by either the full collection process or the partial collection process; and a notification process of notifying the partial judgment process of a pointer pointing to a cell storing a first pointer if the first pointer that is stored in a cell being used in the heap and that points to another cell in the heap is modified to a second pointer, wherein said partial judgment process newly judges whether a cell pointed to by the second pointer stored in a cell pointed to by the pointer reported by the notification process is being used by the execution of the application program.

25. A computer data signal embodied in a carrier wave and representing a memory resource management program for enabling a computer to manage a heap that is a memory resource managed in units of cells, which are data strings, and that is used in units of cells by execution of an application program, and to perform a garbage collection process in order to collect free cells from the heap, said memory resource management program directing the computer to execute:

a full judgment process of judging whether, as to all cells in the heap, each cell is being used by the execution of the application program;

a full collection process of collecting free cells from the heap based on a judgment result of the full judgment process;

a partial extraction process of extracting a cell that has been used by the execution of the application program after judgment of a state of use of cells recently made by the full judgment process;

a partial judgment process of judging whether each of the cells extracted by the partial extraction process is being used by the execution of the application program;

a partial collection process of collecting free cells from the heap based on the judgment result of the partial judgment process;

a partial marking garbage collection control process of determining to collect free cells from the heap by either the full collection process or the partial collection process; and a notification process of notifying the partial judgment process of a first pointer if the first pointer that is stored in a cell being used in the heap and that points to another cell in the heap is modified to a second pointer and if a cell pointed to by the first pointer has never been checked by the full judgment process or the partial judgment process, wherein said partial judgment process newly judges whether a cell pointed to by the first pointer reported by the notification unit is being used by the execution of the application program.

26. A computer data signal embodied in a carrier wave and representing a memory resource management program for enabling a computer to manage a heap that is a memory resource managed in units of cells, which are data strings, and that is used in units of cells by execution of an application program, and to perform a garbage collection process in order to collect free cells from the heap, said memory resource management program directing the computer to execute:

a full judgment process of judging whether, as to all cells in the heap, each cell is being used by the execution of the application program;

a full collection process of collecting free cells from the heap based on a judgment result of the full judgment process;

a partial extraction process of extracting a cell that has been used by the execution of the application program after judgment of a state of use of cells recently made by the full judgment process;

a partial judgment process of judging whether each of the cells extracted by the partial extraction process is being used by the execution of the application program;

a partial collection process of collecting free cells from the heap based on the judgment result of the partial judgment process;

a partial marking garbage collection control process of determining to collect free cells from the heap by either the full collection process or the partial collection process; and a notification process of notifying the partial judgment process of a second pointer if a first pointer that is stored in a cell being used in the heap and that points to another cell in the heap is modified to the second pointer and if a cell pointed to by the first pointer has been checked by the full judgment process or the partial judgment process, wherein said partial judgment process newly judges whether a cell pointed to by the second pointer reported by the notification process is being used by the execution of the application program.

27. A memory resource management device for managing a heap that is a memory resource managed in units of cells, which are data strings, and that is used in units of cells by execution of an application program, and performing a garbage collection process to collect free cells from the heap, comprising:

full garbage collection means for checking a state of use of all cells in the heap by the execution of the application program and collecting free cells from the heap based on a checking result;

partial garbage collection means for extracting a cell that has been used by the execution of the application program after judgment of the state of use of cells recently made by said full garbage collection means, checking the state of use of cells by the execution of the application program to the extracted cell and collecting free cells from the heap based on the checking result; and full/partial control means for determining performance of a subsequent collection of free cells by one of said full garbage collection means and said partial garbage collection means depending on a collection state of free cells previously made by at least one of said full garbage collection means and said partial garbage collection means and a notification indicating a change in state of use of the heap during the execution of the application program.

28. A memory resource management method for managing a heap that is a memory resource managed in units of cells, which are data strings, and that is used in units of cells by execution of an application program, and performing a garbage collection process to collect free cells from the heap, comprising:

a full garbage collection operation of checking a state of use of all cells in the heap by the execution of the application program and collecting free cells from the heap based on a checking result;

a partial garbage collection operation of extracting a cell that has been used by the execution of the application program after judgment of the state of use of cells recently made by said full garbage collection means, checking the state of use of cells by the execution of the application program to the extracted cell and collecting free cells from the heap based on the checking result; and a full/partial control operation of determining performance of a subsequent collection of free cells by one of said full garbage collection means and said partial garbage collection means depending on a collection state of free cells previously made by at least one of said full garbage collection means and said partial garbage collection means and a notification indicating a change in state of use of the heap during the execution of the application program.

29. A computer-readable storage medium on which is recorded a memory resource management program for enabling a computer to perform a method of managing a heap that is a memory resource managed in units of cells, which are data strings, and that is used in units of cells by execution of an application program, and performing a garbage collection process to collect free cells from the heap, the method comprising:

a full garbage collection operation of checking a state of use of all cells in the heap by the execution of the application program and collecting free cells from the heap based on a checking result;

a partial garbage collection operation of extracting a cell that has been used by the execution of the application program after judgment of the state of use of cells recently made by said full garbage collection means, checking the state of use of cells by the execution of the application program to the extracted cell and collecting free cells from the heap based on the checking result; and a full/partial control operation of determining performance of a subsequent collection of free cells by one of said full garbage collection means and said partial garbage collection means depending on a collection state of free cells previously made by at least one of said full garbage collection means and said partial garbage collection means and a notification indicating a change in state of use of the heap during the execution of the application program.

30. A computer data signal embodied in a carrier wave and representing a memory resource management program for enabling a computer to perform a method of managing a heap that is a memory resource managed in units of cells, which are data strings, and that is used in units of cells by execution of an application program, and performing a garbage collection process to collect free cells from the heap, the method comprising:

a full garbage collection operation of checking a state of use of all cells in the heap by the execution of the application program and collecting free cells from the heap based on a checking result;

a partial garbage collection operation of extracting a cell that has been used by the execution of the application program after judgment of the state of use of cells recently made by said full garbage collection means, checking the state of use of cells by the execution of the application program to the extracted cell and collecting free cells from the heap based on the checking result; and a full/partial control operation of determining performance of a subsequent collection of free cells by one of said full garbage collection means and said partial garbage collection means depending on a collection state of free cells previously made by at least one of said full garbage collection means and said partial garbage collection means and a notification indicating a change in state of use of the heap during the execution of the application program.

* * * * *